(12) United States Patent
Yamamoto et al.

(10) Patent No.: US 6,741,482 B2
(45) Date of Patent: May 25, 2004

(54) POWER CONVERSION DEVICE

(75) Inventors: Hajime Yamamoto, Kanagawa-ken (JP); Shigeru Tanaka, Tokyo (JP); Hiroshi Uchino, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 29 days.

(21) Appl. No.: 10/241,560

(22) Filed: Sep. 12, 2002

(65) Prior Publication Data
US 2003/0053324 A1 Mar. 20, 2003

(30) Foreign Application Priority Data

Sep. 14, 2001 (JP) .................................. 2001-279981
Oct. 26, 2001 (JP) .................................. 2001-329405

(51) Int. Cl.⁷ .............................................. H02M 5/45
(52) U.S. Cl. ................................... 363/37; 323/207
(58) Field of Search .................... 363/35, 37, 65, 363/71; 323/205, 207

(56) References Cited

U.S. PATENT DOCUMENTS

| | | | | |
|---|---|---|---|---|
| 4,752,726 A | * | 6/1988 | Aoyama | 323/207 |
| 5,179,510 A | * | 1/1993 | Tokiwa et al. | 363/54 |
| 5,535,113 A | * | 7/1996 | Konishi | 363/35 |
| 5,566,061 A | * | 10/1996 | Uchino | 363/71 |
| 5,946,205 A | * | 8/1999 | Kawakami et al. | 363/65 |
| 6,025,701 A | * | 2/2000 | Weinhold | 323/207 |
| 6,114,841 A | * | 9/2000 | Hasler et al. | 323/210 |
| 6,573,690 B2 | * | 6/2003 | Ogusa et al. | 323/207 |
| 6,611,438 B2 | * | 8/2003 | Kawazoe et al. | 363/37 |

FOREIGN PATENT DOCUMENTS

JP          5-7950          1/1993

* cited by examiner

*Primary Examiner*—Adolf Berhane
(74) *Attorney, Agent, or Firm*—Finnegan, Henderson, Farabow, Garrett & Dunner, L.L.P.

(57) ABSTRACT

The power conversion device of the present invention comprises a power diode rectifier (REC) whose AC terminal is connected through an AC reactor (Ls) with an AC power source; voltage-type self-commutated power converters (CNV) whose AC terminals are connected with the AC terminal of this power diode rectifier through a recovery current suppression reactor (La); and a DC smoothing capacitor (Cd) connected between a DC common terminal of this voltage type self-commutated power converter and the power diode rectifier, with a load device connected in parallel therewith.

37 Claims, 25 Drawing Sheets

POWER CONVERSION DEVICE

CROSS-REFERENCE TO RELATED APPLICATION

This application claims benefit of priority to Japanese Application No. JP 2001-279981 filed Sep. 14, 2001 and JP 2001-329405 filed Oct. 26, 2001, the entire content of which is incorporated by reference herein.

BACKGROUND OF THE INVENTION

1. Field of the Invention

The present invention relates to an economic, but high-efficiency power conversion device consisting of a combination of power diode rectifiers and voltage-type self-commutated power converters and/or a combination of power diode rectifiers and multi-level output self-commutated power converters.

2. Description of the Related Art

For electric railway power generation systems, a system is often adopted in which three-phase AC power is converted to DC power by power diode rectifiers in a three-phase bridge connection. This system has the advantages of excellent ability to withstand overloading and that the converter cost can be kept low. However, there was a problem that when regenerative braking was applied to the vehicle, the power involved in this could not be regenerated on the AC power source side, resulting in repeated absence of regeneration. Another drawback was load current dependence, resulting in considerable fluctuations of the DC generated voltage depending on the load.

FIG. 1A and FIG. 1B illustrate the circuit layout of a prior art PWM converter (pulse width modulation control converter) capable of power regeneration. In PWM converter CNV, the AC terminals are connected with terminals R, S, T of a three-phase AC power source SUP through an AC reactor Ls and the DC terminals are connected with the DC terminals of a DC smoothing capacitor Cd and three-phase output VVVF (variable voltage variable frequency) converter INV. The AC terminal of converter INV is connected with an AC motor M. The PWM converter CNV comprises six arms i.e. six rectifying high-speed diodes D1 to D6 connected in the form of a three-phase bridge and self-turn-off elements S1 to S6 consisting of a switching element for a regenerating inverter connected in anti-parallel with these diodes. Diodes D1 to D3 and self-turn-off elements S1 to S3 are arranged on the positive side and diodes D4 to D6 and self-turn-off elements S4 to S6 are arranged on the negative side. Inverter INV also has the same as circuit layout as converter CNV, so detailed description thereof is here omitted.

PWM converter CNV is equipped with a control device comprising comparators C1, C3, voltage control compensator Gv(S), multiplier ML, current control compensators Gi(S) and pulse width modulation control circuit PWMC. Comparator C1 and voltage control compensator Gv(S) are common to each phase but multiplier ML, comparator C3, current control compensators Gi(S) and pulse width modulation control circuit PWMC are provided for each phase. Only the internal circuit layout of the R phase is described in detail herein, but the layout of the S phase and T phase control circuits is the same. Gate signals g1, g4 for the self-turn-off elements S1, S4 of the R phase are output from the R phase control circuit; gate signals g2, g5 for the self-turn-off elements S2, S5 of the S phase are output from the S phase control circuit; and gate signals g3, g6 for the self-turn-off elements S3, S6 of the T phase are output from the T phase control circuit.

PWM converter CNV uses the control circuit constructed as above to control the input currents Ir, Is, It such that the DC voltage Vd applied to the DC smoothing capacitor Cd matches the voltage instruction value Vd*. In more detail, the deviation between the voltage instruction value Vd* and the voltage detection value Vd is obtained by comparator C1 and amplified by voltage control compensator Gv(S) and is taken as the amplitude instruction value Ism of the input current. Multiplier ML multiplies the amplitude instruction value Ism of the input current with a unit sine wave $\sin \omega t$ synchronized with the voltage of the R phase and this product is taken as the current instruction value Ir* of the R phase. Comparator C3 compares this R phase current instruction value Ir* with the R phase current detection value Ir and the deviation is subjected to inverse amplification by current control compensator Gi(S). Normally proportional amplification is employed, the gain being Gi(S)=−Ki, where Ki is the constant of proportionality (proportional constant).

The voltage instruction value $er^* = -Ki \times (Ir^* - Ir)$, which is the output of current control compensator Gi(S) is input to PWM control circuit PWMC to create the gate signals g1, g4 of self-turn-off elements S1 and S4 of the R phase of converter CNV. PWM converter circuit PWMC compares the voltage instruction value er* and the carrier signal X (for example a 1 kHz triangular wave) and, when er*>X, turns element S1 ON (S4 is OFF) and when er*<X turns element S4 ON (S1 is OFF). As a result, as the R phase voltage VR of the converter there is generated a voltage proportional to the voltage instruction value er*.

Regarding the input current Ir of the R phase, when Ir*>Ir, the voltage instruction value er* has a negative value and Ir is increased. Contrariwise, when Ir*<Ir, the voltage instruction value er* has a positive value and Ir is decreased. In this way, control is performed such that Ir*=Ir. Control is performed in the same way in respect of currents Is and It of the S phase and T phase.

The voltage Vd applied to DC smoothing capacitor Cd is controlled as follows. Specifically, if Vd*>Vd, the amplitude instruction value Ism of the input current is increased. The current instruction value of each phase is in phase with the power source voltage so active power Ps proportional to the current Ism is supplied from the AC power source SUP to the DC smoothing capacitor Cd. As a result, the voltage Vd rises and is controlled such that Vd*=Vd. Contrariwise, if Vd*<Vd, the amplitude instruction value Ism of the input current has a negative value and power Ps is regenerated on the AC power source side. Consequently, the accumulated energy of DC smoothing capacitor Cd is reduced, lowering the voltage Vd and thereby achieving control such that Vd*=Vd.

The VVVF (variable voltage variable frequency) inverter INV and AC motor M are loads whose voltage source is the DC smoothing capacitor Cd; thus during power running operation (motoring operation) they act in a direction such as to consume the accumulated energy of capacitor Cd and to lower voltage Vd. Also, during regeneration operation, this regenerated energy is returned to smoothing capacitor Cd, so they act in a direction such as to raise voltage Vd. Since, as described above, control is performed by the PWM converter CNV such that the DC voltage Vd is constant, matching active power is automatically supplied from the AC power source during power running operation and, during regenerative operation, active power matching the regenerated energy is regenerated on the AC power source side.

Thus, with the conventional PWM converter, the DC voltage Vd can be stabilized and power regeneration achieved, enabling the problem of absence of regeneration in an electric railway DC power-generation system to be solved.

However, a PWM converter has the drawback of considerable switching loss of the switching elements, due to switching being performed at high frequency. Also, the switching elements need to have the ability to interrupt the maximum value of the AC input current, constituting the interruption current. There was therefore the problem that they had to be designed so as to be capable of withstanding interruption current even in the case of overloading for a short time (for example 300% of the rated current); the power converter therefore had to be of large size, resulting in an uneconomic system.

Thus, as described above, although self-commutated converters (called PWM converters) using pulse width modulation control were available as power converters capable of power regeneration, they were subject to the drawbacks that their cost was higher than that of diode rectifiers and that they could not tolerate very large overloading. Also, they had the problems of poor conversion efficiency and the like, owing to the large switching losses involved in PWM control.

SUMMARY OF THE INVENTION

Accordingly, one object of the present invention is to provide a novel power conversion device which is economic and of high converter efficiency, which is capable of power regeneration and which is of excellent ability to withstand overloading.

The above object of the present invention is achieved by the following construction. Specifically, a power conversion device according to the present invention comprises:

- a power diode rectifier whose AC terminal is connected through an AC reactor with an AC power source;
- a voltage-type self-commutated power converter whose AC terminal is connected with the AC terminal of this power diode rectifier through a recovery current suppression reactor; and
- a DC smoothing capacitor connected between DC common terminals of this voltage type self-commutated power converter and the power diode rectifier, with a load device connected in parallel therewith.

With this construction, the interruption current of the voltage type self-commutated power converter can be restricted to a low level by exercising control such that, during power running operation, most of the current flows in the power diode rectifier. The input current is controlled by controlling the phase angle with respect to the power source voltage with a fixed pulse pattern (single pulse, 3-pulse, 5-pulse etc) synchronized with the power source voltage, so that the voltage-type self-commutated power converter is always operated in the vicinity of the input power factor=1. Consequently, the switching of the self-turn-off elements that constitute the self-commutated power converter is performed in the vicinity of the zero point of the input current, thereby making it possible to keep the interruption current of the elements small.

The recovery current suppression reactor performs the function of suppressing inflow of excess recovery current into the diodes of the power diode rectifier when the self-turn-off elements of the voltage type self-commutated power converter are turned ON. Usually, this reactor has an inductance value of a few tens of $\mu H$ i.e. it may be about two orders of magnitude smaller than the AC reactor.

On the other hand, during regeneration operation, most of the current flows in the self-turn-off elements of the voltage type self-commutated power converter. With the device of the present invention, an economic mode of use can be achieved in that for example overloading of 300% is permitted during power running operation and of 100% during regenerative operation. This mode of use is appropriate in that, in an electric railway, even if one train is performing regenerative braking, other trains are usually performing power running. When operating with 100% of regenerated power, likewise, most of the current flows in the self-turn-off elements. However, by controlling the power source power factor to practically 1 even during regenerative operation, switching of the self-turn-off elements is arranged to be performed in the vicinity of the current zero-point. Switching losses are thereby greatly reduced, making it possible to construct the self-turn-off power converter CNV of self-turn-off elements of small interruption current and thereby enabling an economic device to be provided.

BRIEF DESCRIPTION OF THE DRAWINGS

A more complete appreciation of the present invention and many of the intended advantages thereof will be readily obtained as same becomes better understood by reference to the following detailed description when considered in connection with the accompanying drawings, wherein:

FIG. 25 is a layout diagram illustrating an embodiment of a control circuit of the power conversion device of FIG. 24;

FIG. 32 is an operating waveform diagram of the various parts given in explanation of the control action during regenerative operation of the power conversion device of FIG. 26;

FIG. 33 is an operating waveform diagram of the various parts given in explanation of the control action during the steps from power running operation to regenerative operation of the power conversion device of FIG. 26;

DETAILED DESCRIPTION OF THE PREFERRED EMBODIMENTS

Figure 1:
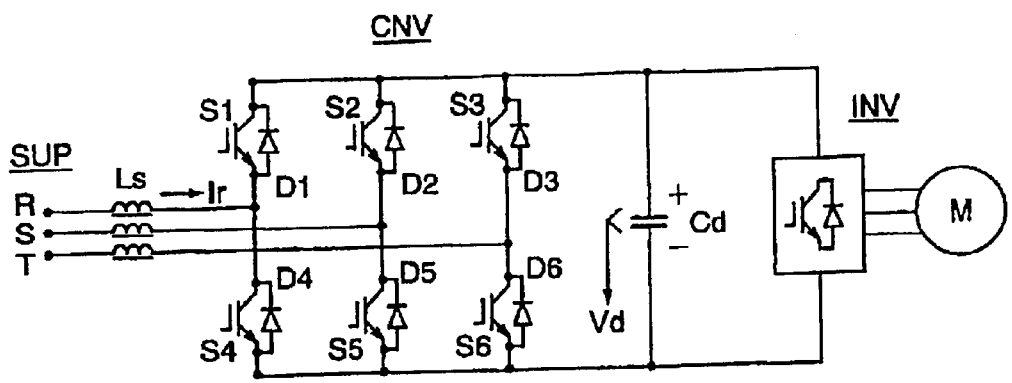
FIG. 1 is a layout diagram of a prior art PWM converter (pulse width modulation controlled converter) capable of power regeneration.
Figure 1:
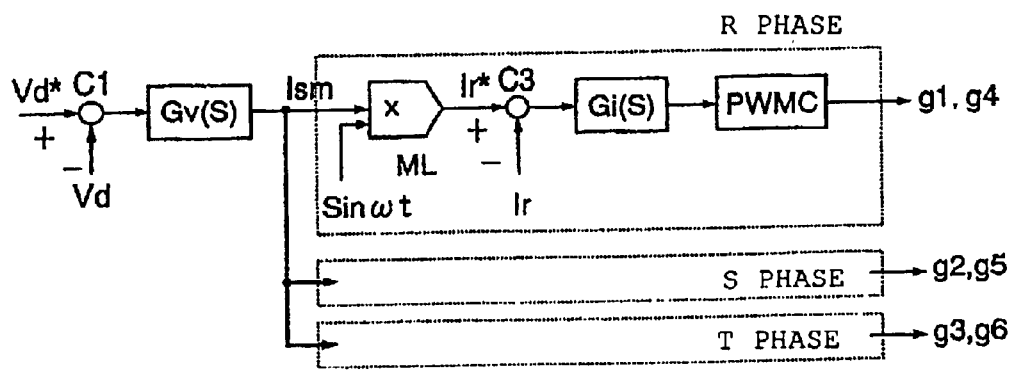

Referring now to the drawings, wherein like reference numerals designate identical or corresponding parts throughout the several views, and more particularly to FIG. 2 thereof, one embodiment of the present invention will be described.

Figure 2:
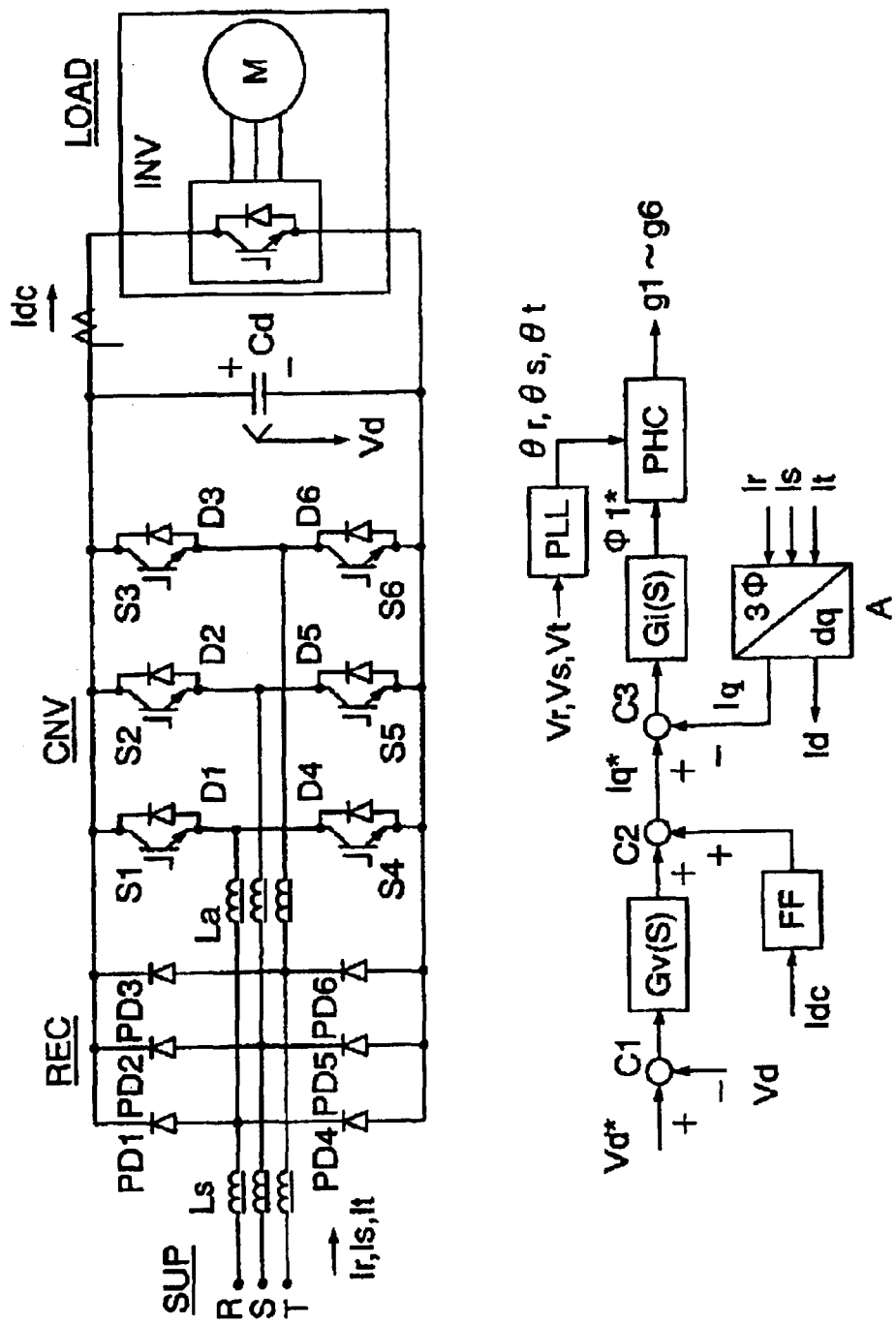
FIG. 2 is a layout diagram illustrating an embodiment of a power conversion device according to the present invention of FIG. 1.

FIG. 2 is a block diagram illustrating an embodiment of a power conversion device according to the present invention. Circuit elements having the same or similar function as in FIG. 1 are given the same reference symbols and further detailed description thereof is omitted. In the main circuit of FIG. 2, a power diode rectifier REC and recovery current suppression reactor La are additionally provided between AC reactor Ls and voltage type self-commutated converter CNV in the main circuit of FIG. 1. Rectifier REC comprises three-phase bridge connected power diodes PD1 to PD6, their AC terminals being connected with incoming terminals R, S, T of three-phase AC power source SUP through AC reactor Ls and their DC terminals being connected with the DC terminal of converter CNV. Recovery current suppression reactor La is connected between the AC terminal of rectifier REC and the AC terminal of voltage type self-commutated converter CNV. In this case, the load device LOAD is constituted by the VVVF inverter INV and the AC motor M.

Recovery current suppression reactor La serves to suppress entry of excess recovery current to the diodes of rectifier REC when the self-turn-off elements of the power converter CNV are operated by being turned ON and is normally designed to have an inductance value of a few tens of $\mu H$ i.e. about two orders of magnitude smaller than that of the AC reactor Ls. Also, by making recovery current suppression reactor La a saturable reactor, the time required for commutation from the high-speed diodes D1 to D6 to the power diodes PD1 to PD6 can be shortened and the loss thereby diminished to that extent.

As the control device, there are provided comparators C1, C3, adder C2, voltage control compensation circuit Gv(S), current control compensation circuit Gi(S), feed forward compensator FF, co-ordinate conversion circuit A, power source synchronization phase detection circuit PLL and phase control circuit PHC. The voltage Vd applied to DC smoothing capacitor Cd is detected and this is compared with the voltage instruction value Vd* by comparator C1. The deviation $\epsilon v(=Vd*-Vd)$ thereof is subjected to integration or proportional amplification by the voltage control compensation circuit Gv(S) and the output value of this is input to the first input terminal of adder C2. In addition, the DC current Idc consumed by the load LOAD is detected and input to the second input terminal of adder C2 through feed forward compensator FF. The output Iq* of adder C2 is the instruction value of the active current supplied from power source SUP. Co-ordinate converter A converts the detected values of three-phase input currents Ir, Is and It that are supplied to the power converter from power source SUP to the dq coordinate axes (DC amounts). The q axis current Iq obtained by co-ordinate conversion expresses the detected value of the active current and the d axis current Id expresses the detected value of the reactive current.

Phase angle instruction value ø* is obtained by comparing the active current instruction value Iq* with the active current detection value Iq using comparator C3 and amplifying the deviation value $\epsilon i(=Iq*-Iq)$ using the current control compensation circuit Gi(S). Power source synchronization phase detection circuit PLL creates phase signals θr, θs, θt synchronized with the three-phase AC power source voltages and inputs these to phase control circuit PHC. Phase control circuit PHC generates gate signals g1 to g6 of self-turn-off elements S1 to S6 of power converter CNV using the phase angle instruction value ø* and phase signals θr, θs, θt for each phase. In voltage type self-commutated power converter CNV the input current is controlled by controlling the phase angle ø with respect to the power source voltage with a fixed pulse pattern (single pulse, 3-pulse, 5-pulse etc) synchronized with the power source voltage, by means of gate signals g1 to g6.

Figure 3:
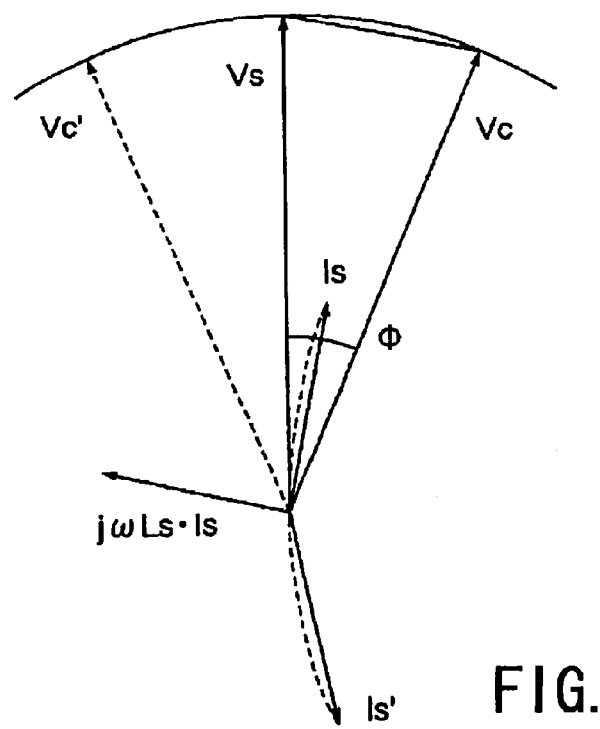
FIG. 3 is an AC side voltage/current vector diagram given in explanation of the control action of the power conversion device of the present invention of FIG. 2.

FIG. 3 illustrates a voltage/current vector diagram given in explanation of the control action of the device of FIG. 2. In the Figure, Vs is the power source voltage, Vc is the AC output voltage of the self-commutated power converter CNV, Is is the input current and jωLs·Is is the amount of voltage drop produced by the AC reactor Ls (where the resistance of the reactor Ls is neglected as being very small).

The vector relationship Vs=Vc+jωLs·Is holds. Although Vs, and Vc and Is etc should in fact be represented as vector quantities, in this specification, for convenience of notation, they are represented as scalar quantities.

The crest value (peak value) of power source voltage Vs and the fundamental crest value of AC output voltage Vc of self-commutating power converter CNV are matched so as practically (substantially) coincide. The DC voltage Vd is usually determined by demand from the load side; if the pulse pattern is determined, this determines the fundamental crest value of the AC output voltage Vc. Accordingly, the crest values are matched by arranging a transformer on the power source side and taking the secondary voltage of this as Vs.

The input current Is can be controlled by adjusting the phase angle ø of the AC output voltage Vc of the power converter CNV with respect to the power source voltage Vs. Specifically, if the phase angle ø=0, the voltage jωLs·Is that is applied to the AC reactor Ls becomes zero and the input current Is also becomes zero. If the phase angle ø (lag) is increased, the voltage jωLs·Is increases and the input current Is also increases in proportion to this value. The input current vector Is lags the voltage jωLs·Is by 90° and is a vector lagging the power source voltage Vs by ø/2. The input power factor seen from the power source side is therefore cos(ø/2).

On the other hand, if the AC output voltage of power converter CNV is increased in the direction of advancing phase angle ø as Vc' in FIG. 3, the voltage jωLs·Is that is applied to AC reactor Ls becomes negative, resulting in a phase angle of (π−ø/2) with respect to power source voltage Vs where the input current is Is'. That is, the power Ps=Vs·Is becomes negative, making it possible for power to be regenerated to the power source. When the AC output voltage Vc is shifted in the direction of Vc' along the broken line in the Figure, taking the power source voltage Vs as standard, the input current vector Is changes in the direction of Is' along the broken line.

In FIG. 2, the active current Iq is controlled as follows.

When Iq*>Iq, the output ø* of the current control compensation circuit Gi(S) increases, causing the input current Is to increase. Since the input power factor is practically 1, the active current Iq increases and soon settles down at Iq*=Iq. Contrariwise, if Iq*<Iq, the output ø* of the current control compensation circuit Gi(S) decreases or becomes a negative value, causing the input current Is to decrease. Since the input power factor≈1, the active current Iq decreases, until it likewise settles down at Iq*=Iq.

Also, the voltage Vd of DC smoothing capacitor Cd is controlled as follows.

When Vd*>Vd, the output Iq* of adder C2 on the output side of voltage control compensation circuit Gv(S) increases and is controlled as described above to Iq*=Iq, so active power Ps is supplied from the AC power source SUP to DC smoothing capacitor Cd. As a result, the DC voltage Vd increases, and is controlled such that Vd*=Vd.

Contrariwise, when Vd*<Vd, the output Iq* of adder C2 decreases, or becomes a negative value, causing active power Ps to be regenerated on the side of AC power source SUP from DC smoothing capacitor Cd. As a result, control is exercised whereby DC voltage Vd is decreased until Vd*=Vd.

In the device of FIG. 2, the DC current Idc taken by the load is detected and a compensation amount IqFF=k1·Idc is calculated by feed-forward compensator FF such that active current matching this amount is supplied, and this compensation amount is input to adder C2. In this way, if there is an abrupt change in the load, an input current (active current) Iq matching this is supplied, suppressing fluctuation of the applied voltage Vd of DC smoothing capacitor Cd.

<Second Embodiment>

In this embodiment, in the power conversion device of FIG. 2, the recovery current suppression reactor La is constituted by a saturable reactor.

The arms of self-commutating power converter CNV are constituted of self-turn-off elements S1 to S6 and high-speed diodes D1 to D6 connected in anti-parallel therewith: for example, when current flows in a self-turn-off element of an upper arm and this element is turned OFF, the current shifts to the high-speed diode in the lower arm. The forward voltage drop of high-speed diodes D1 to D6 is larger than that of power diodes PD1 to PD6 so this current gradually shifts to the corresponding power diodes of power diode rectifier REC. The commutation time is inversely proportional to the inductance value of recovery current suppression reactor La. By making reactor La a saturable reactor, its inductance value is decreased, due to saturation, when the current flowing therein is large, causing the current that was flowing in high-speed diodes D1 to D6 to shift more rapidly to power diodes PD1 to PD6 and so enabling the converter loss to be reduced.

<Third Embodiment>

Figure 4:
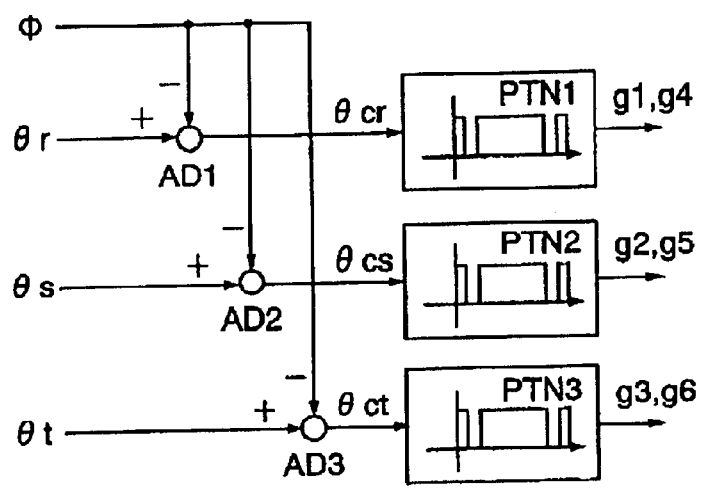
FIG. 4 is a control block diagram given in explanation of the phase control action of the power conversion device according to the present invention of FIG. 2.

FIG. 4 shows an embodiment of a phase control circuit PHC in FIG. 2. In FIG. 4, AD1 to AD3 indicate adders (subtracters) separately provided for each phase and PTN1 to PTN3 likewise indicate pulse pattern generators that are separately provided for each phase. Adders AD1 to AD3 subtract the phase angle instruction value ø* from phase signals θr, θs, θt to create new phase signals θcr, θcs, θct. These new phase signals θcr, θcs, θct are periodic functions of 0 to 2π and change synchronously with the power source frequency. Pulse pattern generators PTN1 to PTN3 generate gate signals g1 to g6 for each phase for the new phase signals θcr, θcs, θct such as to produce a fixed pulse pattern.

Figure 5:
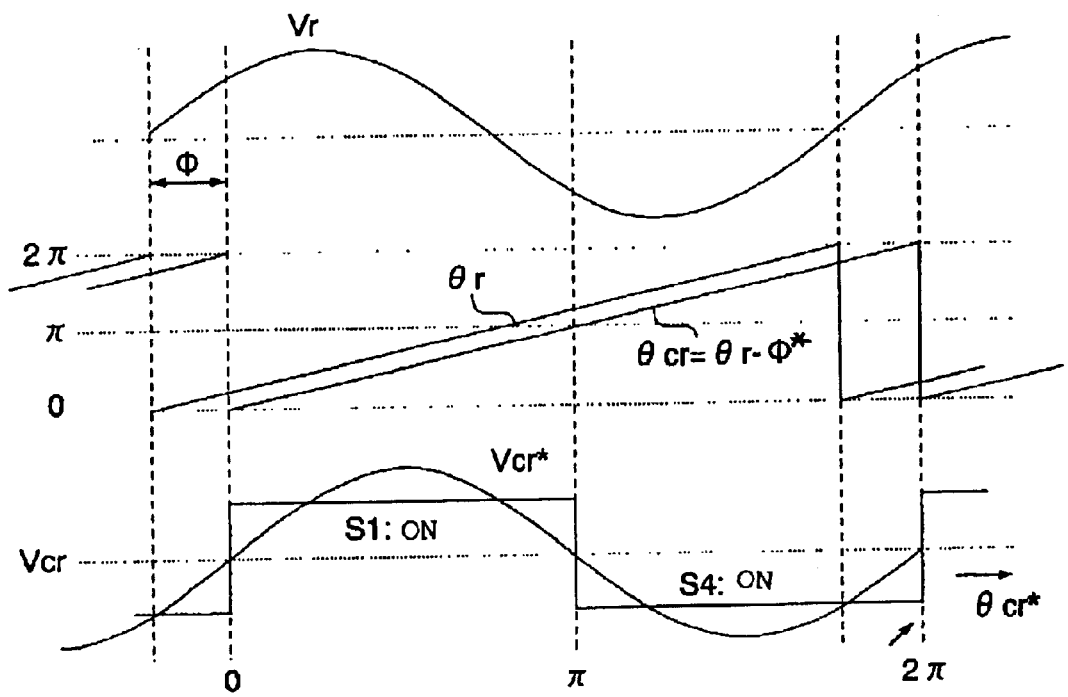
FIG. 5 is a time chart given in explanation of the phase control action of the power conversion device according to the present invention of FIG. 2.

Taking the R phase as a typical example, pulse pattern generator PTN1 stores the pulse patterns of the R phase elements S1 to S4 with respect to the phase signal θcr as a table function; the waveform during single-pulse operation is shown in FIG. 5. In this Figure, Vr indicates the R phase power source voltage, θr indicates a phase signal that is synchronized with the power source voltage Vr; this is a periodic function that changes between 0 and 2π. The new phase signal θcr=θr−ø* is a periodic function that changes between 0 and 2π and is given by a signal that lags signal θr by ø*. Specifically, for input θcr, a gate signal g1 (or g4) is output as follows. Specifically, in the range $0 \leq \theta_{cr} < \pi$, g1=1, g4=0 (S1 ON, S4 OFF)

in the range $\pi \leq \theta_{cr} < 2\pi$, g1=0, g4=1 (S1 OFF, S4 ON)

The AC side output voltage (R phase) Vcr of the self-commutating converter CNV is Vcr=+Vd/2 when S1 is ON (S4 OFF) and Vcr=−Vd/2 when S1 is OFF (S4 ON).

If DC voltage Vd is fixed, the amplitude value of AC output voltage Vcr is fixed. The phase of the fundamental wave Vcr* of the AC output voltage Vcr lags the power source voltage Vs by a phase angle ø. The S phase and T phase are supplied in the same way but respectively offset by 120° and 240° from the R phase.

Figure 6:
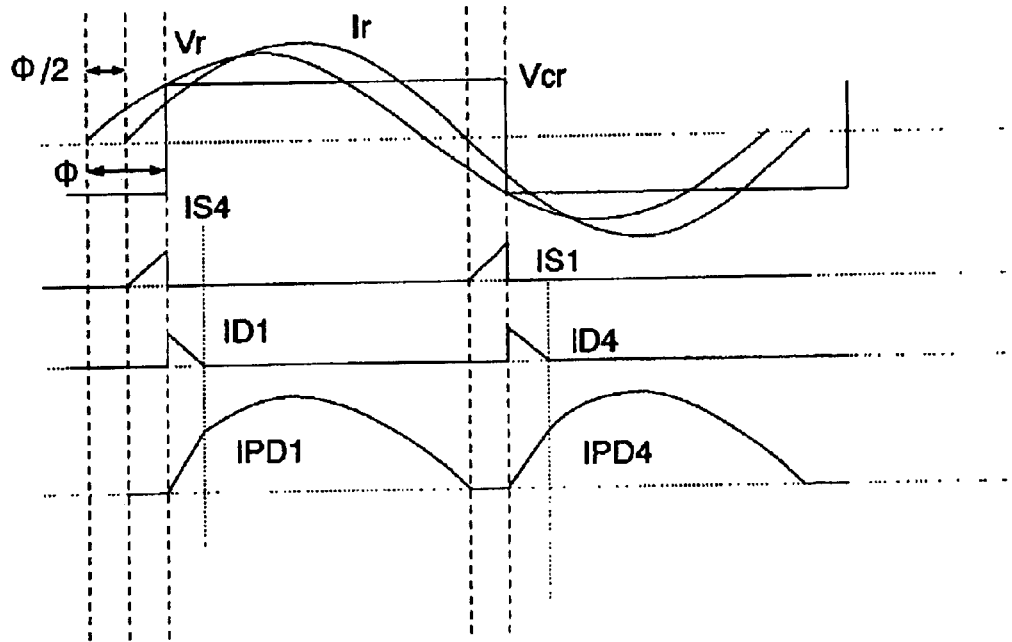
FIG. 6 is an operating waveform diagram of the various parts given in explanation of the control action during power running operation of the power conversion device according to the present invention of FIG. 2.

FIG. 6 shows the operational waveforms of various parts in the R phase, in the case where self-commutating power converter CNV is operated with the pulse pattern of FIG. 5. For convenience in description, the input current Ir is shown as a sine wave and the ripple portion is not shown. FIG. 6 shows the operational waveforms during power running operation; the phase of the fundamental wave Vcr* of the AC output voltage Vcr of the converter lags the power source voltage Vr by a phase angle ø. Also, input current Ir lags the power source voltage Vr by a phase angle (ø/2). IS1 and IS4 represent the currents of the self-turn-off elements S1, S4 of the R phase; ID1, ID4 represent the currents of the high-speed diodes D1, D4; and IPD1, IPD4 represent the currents of the power diodes PD1, PD4 respectively. Their operation at this point is described hereinbelow using FIG. 1.

Current flows through power diode PD4 until input current Ir changes from negative to positive. When, from this condition, the direction of current Ir changes, element S4 is in an ON condition, so input current Ir becomes able to flow through recovery current suppression reactor La and element S4. Next, when element S4 is turned OFF, by the action of recovery current suppression reactor La, current Ir first of all flows through high-speed diode D1. The forward drop voltage VFPD1 of power diode PD1 is lower than the forward drop voltage VFD1 of high-speed diode D1, so, due to this voltage difference, the current flowing in recovery current suppression reactor La gradually becomes smaller, so the input current Ir shifts from high-speed diode D1 to power diode PD1. The commutation time is inversely proportional to the inductance value of recovery current suppression reactor La. By making reactor La a saturable reactor, its inductance value when the current flowing therein is large is decreased, causing the current that was flowing in high-speed diode D1 to shift more rapidly to power diode PD1 and so enabling loss to be reduced.

This current flows in power diode PD1 until the polarity of input current Ir is again inverted. After input current Ir is inverted, the same operation as described above is performed between element S1 and high-speed diode D4 and power diode PD4.

Thus, with this embodiment, since the major part of the input current Ir during power running operation flows in power diodes PD1, PD4, loss is small and a power conversion device of high ability to withstand overloading can be provided.

If the crest value of the input current is taken as Ism, the maximum current Imax that can be interrupted by the self-turn-off elements S1 to S6 of the self-commutated converter is $$Imax = Ism \times \sin(\phi/2)$$

where θ2<90°. For example, if ø=20°, Imax=0.174×Ism. That is, self-turn-off elements of small interruption current can be employed, making it possible to provide a power conversion device of low cost.

Figure 7:
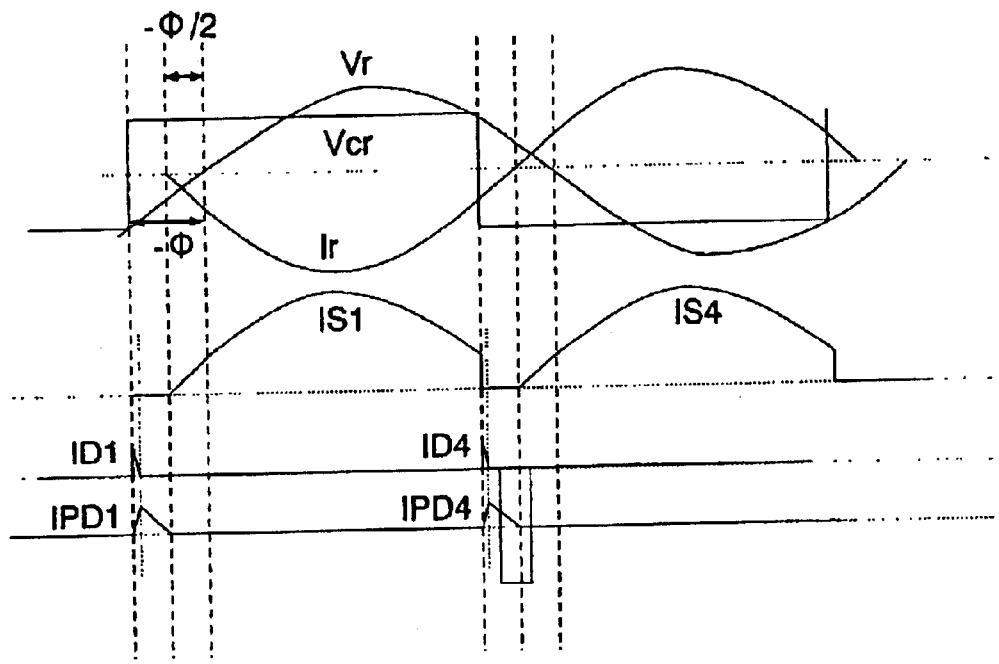
FIG. 7 is an operating waveform diagram of the various parts given in explanation of the control action during regenerative operation of the power conversion device according to the present invention of FIG. 2.

FIG. 7 shows the operating waveform during regenerative operation. IS1 and IS4 represent the currents of the self-turn-off elements S1, S4 of the R phase; ID1, ID4 represent the currents of the high-speed diodes D1, D4; and IPD1, IPD4 represent the currents of the power diodes PD1, PD4 respectively. The phase of the fundamental wave of the AC output voltage Vcr of the converter leads the power source voltage Vr by a phase angle ø. Also, input current Ir leads the inverted value −Vr of the power source voltage by a phase angle (ø/2).

When input current Ir is negative and element S1 is ON (S4 is OFF), input current Ir flows through element La and recovery current suppression reactor La. When element S1 is OFF (S4 is ON), by the action of recovery current suppression reactor La, current Ir first of all flows through high-speed diode D4. The forward drop voltage VFPD4 of power diode PD4 is lower than the forward drop voltage VFD4 of high-speed diode D4, so, due to this voltage difference, the current flowing in recovery current suppression reactor La gradually becomes smaller, so the input current Ir shifts from high-speed diode D4 to power diode PD4. If input current Ir is inverted, current flows in element S4 and in the same way as described above element S4 is turned OFF thereby first of all causing the current to shift to high-speed diode D1 and then to shift to power diode PD1.

During regenerative operation, if the crest value of the input current is taken as Ism, the maximum current Imax that can be interrupted by self-turn-off elements S1 to S6 is $$I\max = Ism \times \sin(\emptyset/2)$$

where $\theta 2 < 90°$. For example, if $\emptyset = 20°$, Imax=0.174×Ism.

Thus, most of the input current Ir during regenerative operation flows in the self-turn-off elements, but the interruption currents of elements S1 to S6 can be made small, making it possible to provide a power conversion device of low cost.

In the case of electric railways, power supply is effected to a plurality of vehicles from a single substation (transforming station), so typically the load during power running operation is large and the regenerated power is small. For example, the overload withstanding ability in the case of power running operation is required to be 300% of the rated output, but, usually, a 100% rating in respect of regenerated power is satisfactory. The present power conversion device can be applied in such cases where large overloading withstanding ability during power running operation is required.

Figure 8:
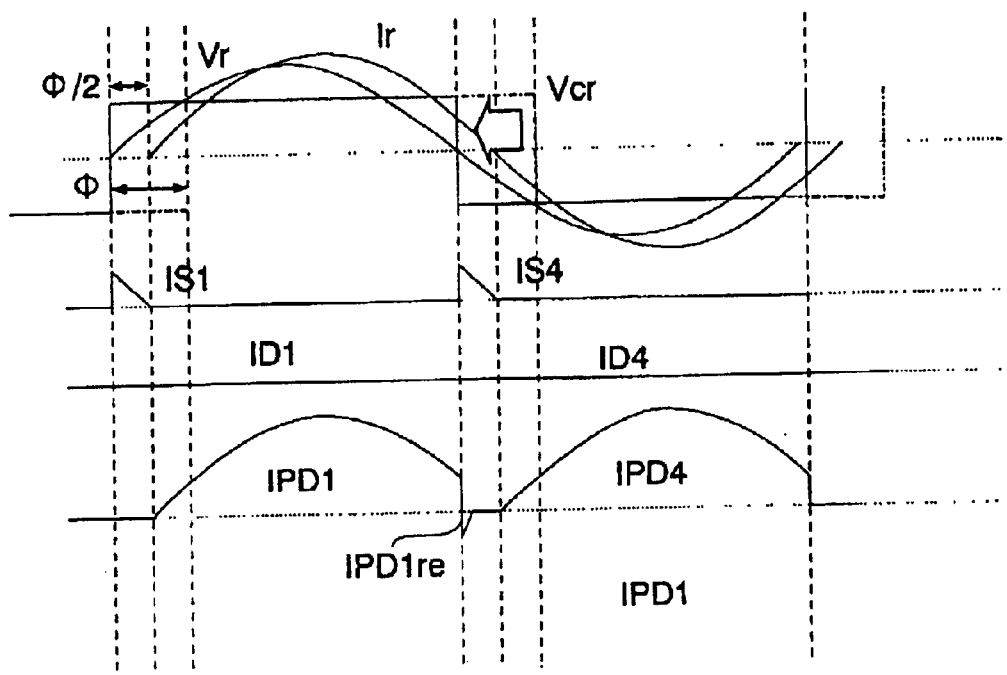
FIG. 8 is an operating waveform diagram of the various parts given in explanation of the control action during the steps from power running operation to regenerative operation of the power conversion device according to the present invention of FIG. 2.

FIG. 8 shows the transitional operating waveform when shifting from power running operation to regenerative operation; the phase angle ø of the AC output voltage Vcr of the power converter with respect to power source voltage Vr changes from lagging phase to zero. When the input current Ir is positive, self-turn-off element S4 is turned ON (S1 is turned OFF) and the input current Ir that was flowing in the power diode PD1 is commutated to element S4. During this process, the recovery current IPD1re flowing in power diode PD1 is suppressed by the action of recovery current suppression reactor La. If this recovery current suppression reactor La were absent, an excessive recovery current would flow in power diode PD1; not only would this increase loss but also it might destroy the diode PD1 or self-turn-ooff element S4. If the input current Ir is negative, self-turn-off element S1 is turned ON (S4 is turned OFF) and the input current Ir that was flowing in the power diode PD4 is commutated to element S1 in the same way.

The number of times of switching can be minimized and the conversion efficiency further improved by operating the self-commutated converter CNV with a single pulse. Also, the fundamental component of the AC side output voltage Vc becomes large and the voltage utilization efficiency of the self-commutated converter is improved. Also, since operation is effected with a converter power factor of practically 1, switching is performed only once in the vicinity of the zero point of the input current Is, so the interruption current of the self-turn-off elements is extremely small both in the case of power running operation and regenerative operation. A high-efficiency, low-cost power conversion device can therefore be provided. Also, switching approximating to "soft switching" can be achieved in that interruption of large currents does not take place. The EMI noise is therefore small and a power conversion device which is environment-friendly can be provided.

<Fourth Embodiment>

Figure 9:
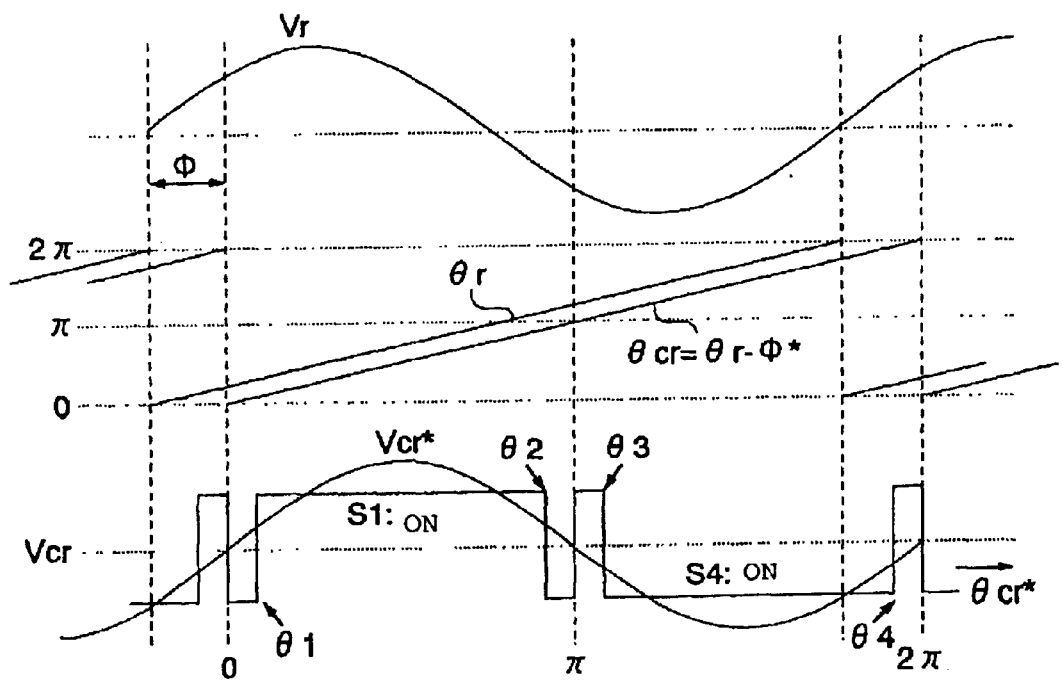
FIG. 9 is a further time chart given in explanation of the phase control action of the power conversion device of the present invention of FIG. 2.

FIG. 9 shows the operating waveform when 3-pulse output is obtained using a pulse pattern generator PTN1: the R phase is depicted. In the Figure, Vr is the R phase power source voltage and θr is the phase signal synchronized with the power source voltage Vr, being a periodic function that changes between 0 and 2π. The new phase signal θcr=θr−ø* is a periodic function that changes between 0 and 2π and is provided by a signal that lags the phase signal θr by ø*. Also, the pulse pattern of the R phase elements S1, S4 with respect to the phase signal θcr is:

in the range $0 \leq \theta cr < \theta 1$, g1=0, g4=1 (S1 OFF, S4 ON)
in the range $\theta 1 \leq \theta cr < \theta 2$, g1=0, g4=1 (S1 ON, S4 OFF)
in the range $\theta 2 \leq \theta cr < \pi$, g1=0, g4=1 (S1 OFF, S4 ON)
in the range $\pi \leq \theta cr < \theta 3$, g1=1, g4=0 (S1 ON, S4 OFF)
in the range $\theta 3 \leq \theta cr < \theta 4$, g1=0, g4=1 (S1 OFF, S4 ON)
in the range $\theta 4 \leq \theta cr < 2\pi$, g1=1, g4 =0 (S1 ON, S4 OFF)

The AC side output voltage (R phase) Vcr of the self-commutated converter CNV is then:

when S1 is ON (S4 is OFF), Vcr=+Vd/2
when S1 is OFF (S4 is ON), Vcr=Vd/2

The phase of the fundamental wave Vcr of the output voltage Vcr lags the power source voltage Vr by a phase angle ø. The S phase and T phase are supplied in the same way.

In this case also when the pulse pattern is fixed and the DC voltage Vd is fixed, the crest value of the fundamental wave of the AC output voltage of the self-commutated converter CNV is fixed.

Figure 10:
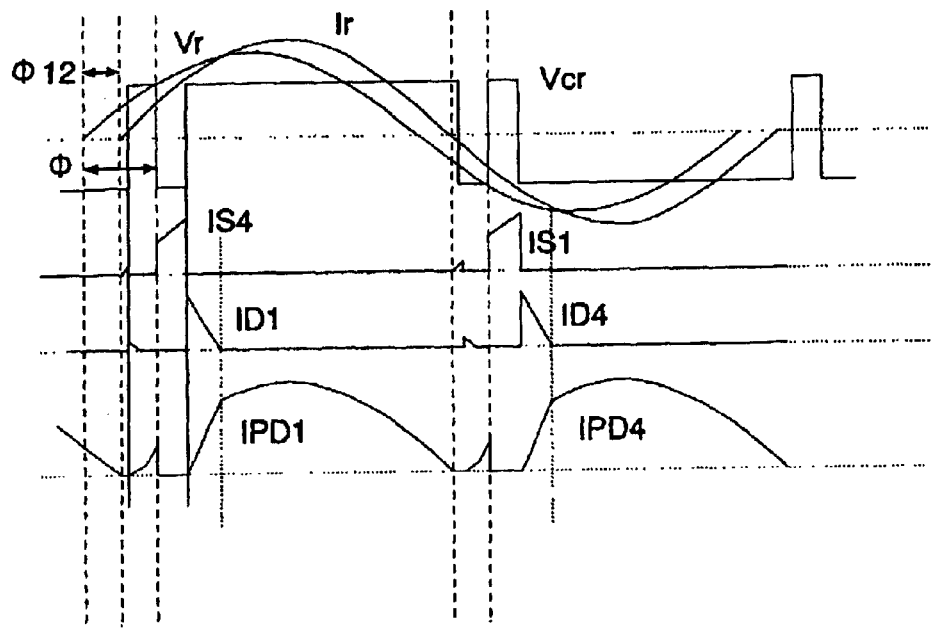
FIG. 10 is an operating waveform diagram of the various parts given in explanation of a further control action during power running operation of the power conversion device according to the present invention of FIG. 2.

FIG. 10 shows the operational waveforms of various parts in the R phase, in the case where the self-commutating power converter is operated with the pulse pattern of FIG. 9. For convenience in description, the input current Ir is shown as a sine wave and the ripple portion is not shown. FIG. 10 shows form of the operational waveforms during power running operation; the phase of the fundamental wave Vcr of the AC output voltage Vcr of the converter lags the power source voltage Vs by a phase angle ø. Also, input current Is lags the power source voltage Vs by a phase angle (ø/2). IS1 and IS4 represent the currents of the self-turn-off elements S1, S4 of the R phase; ID1, ID4 represent the currents of the high-speed diodes D1, D4; and IPD1, IPD4 represent the currents of the power diodes PD1, PD4 respectively. Their operation at this point is described hereinbelow.

Current flows through power diode PD4 until input current Ir changes from negative to positive. When, from this condition, the direction of current Ir changes, element S4 is in an ON condition, so input current Ir becomes able to flow through recovery current suppression reactor La and element S4. Next, when element S4 is turned OFF, by the action of recovery current suppression reactor La, current Ir first of all flows through high-speed diode D1. The forward drop voltage VFPD1 of power diode PD1 is lower than the forward drop voltage VFD1 of high-speed diode D1, so, due to this voltage difference, the current flowing in recovery current suppression reactor La gradually becomes smaller, so the input current Ir shifts from high-speed diode D1 to power diode PD1. The commutation time is inversely proportional to the inductance value of recovery current suppression reactor La. By making reactor La a saturable reactor, its inductance value when the current flowing therein is large is decreased, causing the current that was flowing in the high-speed diode to shift more rapidly to the power diode and so enabling loss to be reduced.

Next, when element S4 is again turned ON, input current Ir flows through recovery current suppression reactor La and element S4, causing the current of the power diode PD1 and high-speed diode D1 to become zero. Furthermore, at θ1 of FIG. 10, when element S4 is turned OFF, as described above, first of all current flows in high-speed diode D1, then current shifts to the power diode PD1, and this current flows in power diode PD1 until input current Ir is again inverted. After input current Ir is inverted, the same operation as described above is performed between element S1 and high-speed diode D4 and power diode PD4.

As the pulse pattern of FIG. 10, a 3-pulse pattern is shown. If the crest value of the input current is taken as Ism, the maximum current Imax that can be interrupted by the self-turn-off elements S1 to S6 is $$I\max = Ism \times \sin(\phi/2 + \theta 1)$$

where θ2<90°. For example, if ø=20°, and θ2=10° is taken, $$I\max = 0.342 \times Ism.$$

Thus, with the power conversion device of the present invention, most of the current during power running flows through power diodes PD1 to PD6 whose ON voltage is small; thus, the current flowing in high-speed diodes D1 to D6 is very slight, making it possible to achieve a conversion device of high efficiency. Also, the interruption current of self-turn-off elements S1 to S6 can be made small, making it possible to achieve a considerable reduction in the overall cost of the device.

Figure 11:
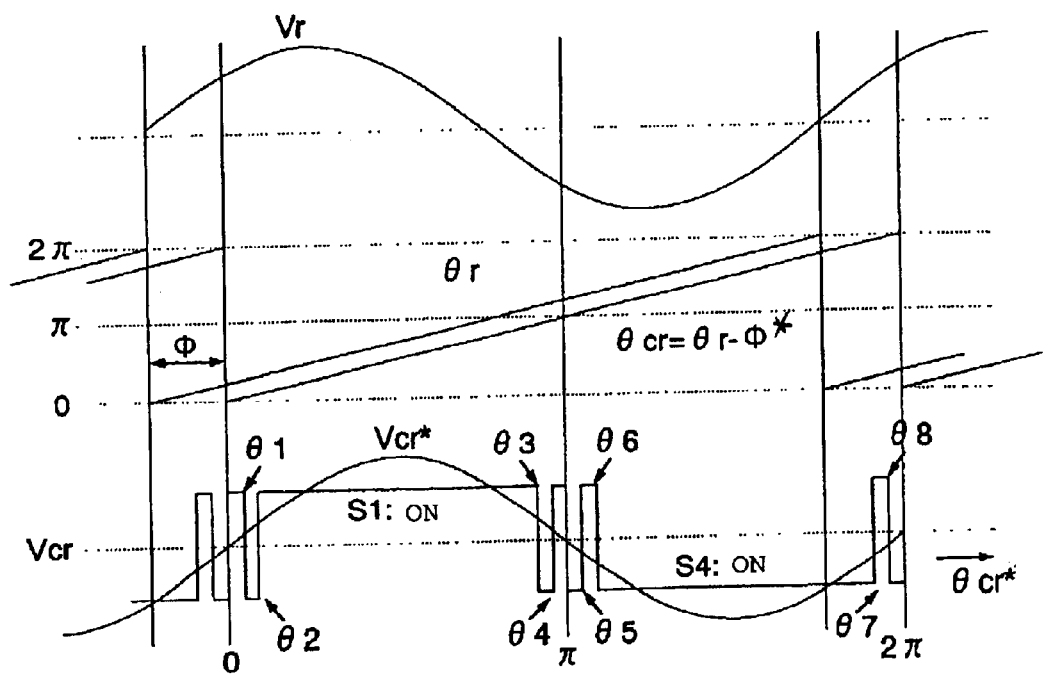
FIG. 11 is yet a further time chart given in explanation of the phase control action of the power conversion device according to the present invention of FIG. 2.

FIG. 11 shows the operating waveform in the case of 5-pulse output operation of a pulse pattern generator PTN1, depicting the R phase. In this Figure, Vr is the R phase power source voltage and θr is the phase signal synchronized with power source voltage Vr, this being a periodic function that changes between 0 and 2π. Also, the new phase signal θcr=θr−ø* is a periodic function that changes between 0 and 2π and is supplied by a signal lagging the signal θr by ø*. Also, the pulse patterns of the R phase elements S1, S4 with respect to the phase signal θr are as follows.

in the range 0≦θcr<θ1, g1=1, g4=0 (S1 ON, S4 OFF)
in the range θ1≦θcr<θ2, g1=0, g4=1 (S1 OFF, S4 ON)
in the range θ2≦θcr<θ3, g1=1, g4=0 (S1 ON, S4 OFF)
in the range θ3≦θcr<θ4, g1=0, g4=1 (S1 OFF, S4 ON)
in the range θ4≦θcr<π, g1=1, g4=0 (S1 ON, S4 OFF)
in the range π≦θcr<θ5, g1=0, g4=1 (S1 OFF, S4 ON)
in the range θ5≦θcr<θ6, g1=1, g4=0 (S1 ON, S4 OFF)
in the range θ6≦θcr<θ7, g1=0, g4=1 (S1 OFF, S4 ON)
in the range θ7≦θcr<θ8, g1=1, g4=0 (S1 ON, S4 OFF)
in the range θ8≦θcr<2π, g1=0, g4=1 (S1 OFF, S4 ON)

The AC side output voltage (R phase) Vcr of the self-commutated converter CNV is then:

when S1 is ON (S4 is OFF), Vcr=+Vd/2
when S1 is OFF (S4 is ON), Vcr=−Vd/2

If the DC voltage Vd is fixed, the amplitude value of the AC output voltage Vr is fixed. The phase of the fundamental wave Vcr* of Vcr lags the power source voltage Vr by a phase angle ø. The S phase and T phase are supplied in the same way.

Figure 12:
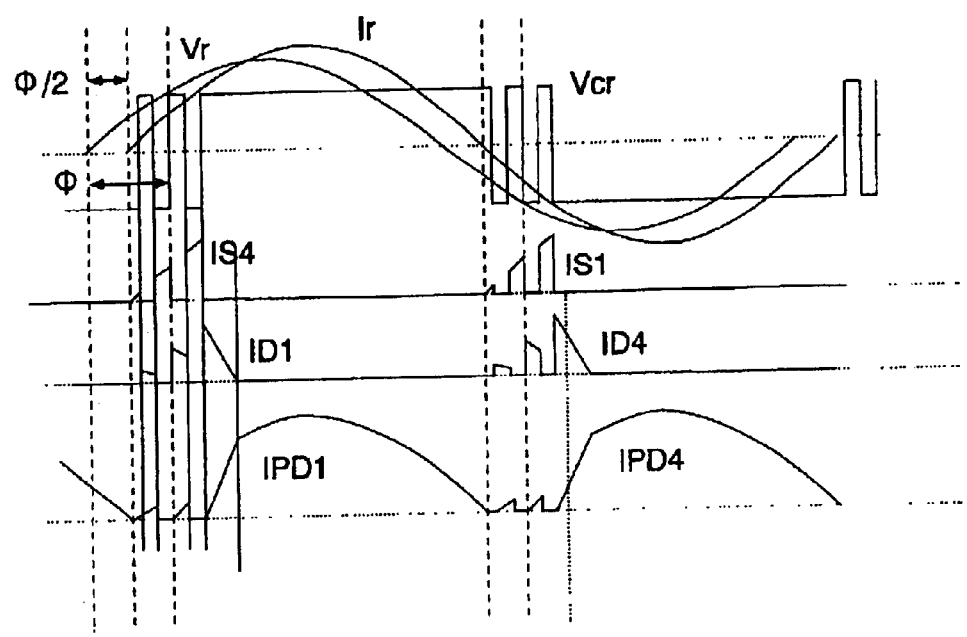
FIG. 12 is an operating waveform diagram of the various parts given in explanation of yet a further control action during power running operation of the power conversion device according to the present invention of FIG. 2.

FIG. 12 shows the operational waveforms of various parts in respect of the R phase, in the case where the self-commutating power converter is operated with the pulse pattern of FIG. 11. For convenience in description, the input current Ir is shown as a sine wave and the ripple portion is not shown.

In FIG. 12, the phase of the fundamental wave Vcr of the AC output voltage of the converter lags the power source voltage Vs by a phase angle ø. Consequently, the power conversion device is in power running operation and the input current Is lags the power source voltage Vs by a phase angle (ø/2). IS1 and IS4 represent the currents of the self-turn-off elements S1, S4 of the R phase; ID1, ID4 represent the currents of the high-speed diodes D1, D4; and IPD1, IPD4 represent the current waveforms of the power diodes PD1, PD4 respectively. Their operation will described hereinbelow using the device of FIG. 1.

Current flows through power diode PD4 until input current Ir changes from negative to positive. When, from this condition, the direction of current Ir changes, element S4 is in an ON condition, so input current Ir becomes able to flow through recovery current suppression reactor La and element S4. Next, when element S4 is turned OFF, by the action of recovery current suppression reactor La, current Ir first of all flows through high-speed diode D1. The forward drop voltage VFPD1 of power diode PD1 is lower than the forward drop voltage VFD1 of high-speed diode D1, so, due to this voltage difference, the current flowing in recovery current suppression reactor La gradually becomes smaller, so the input current Ir shifts from high-speed diode D1 to power diode PD1. The commutation time is inversely proportional to the inductance value of recovery current suppression reactor La. By making reactor La a saturable reactor, its inductance value when the current flowing therein is large is decreased, causing the current that was flowing in the high-speed diode to shift more rapidly to the power diode and so enabling loss to be reduced.

Next, when element S4 is again turned ON, input current Ir flows through recovery current suppression reactor La and element S4, causing the current of the power diode PD1 and high-speed diode D1 to become zero. Furthermore, when element S4 is turned OFF, as described above, first of all current flows in high-speed diode D1, then current shifts to the power diode PD1. The above operation is repeated in accordance with the pulse pattern shown in FIG. 4 but at θ2 in FIG. 4, after element S4 is turned OFF (element SI is turned ON), in the same way as described above, current flows first of all to high-speed diode D1 and the current then shifts to power diode PD1; this current flows in power diode PD1 until input current Ir is again inverted. After input current Ir is inverted, the same operation as described above is performed between element S1 and high-speed diode D4 and power diode PD4.

As the pulse pattern of FIG. 12, a 5-pulse pattern is shown. If the crest value of the input current is taken as Ism, the maximum current Imax that can be interrupted by the self-turn-off elements S1 to S6 is $$I\max = Ism \times \sin(\phi/2 + \theta 2)$$

where θ2<0°. For example, if ø=20°, and θ2=15° is taken, $$I\max = 0.42 \times Ism.$$

By increasing the number of pulses, harmonic components of the input current Ir can be decreased and current pulsation reduced, but, on the other hand, there is the drawback that the maximum value Imax of the interruption current of the self-turn-off elements increases. As will be described later, it is desirable to decrease the input current harmonics and perform operation with a number of pulses that it is as low as possible, by employing multiple power converters etc.

If the self-commutating converter CNV is controlled with a fixed pulse pattern, a switching pattern may be determined such that the harmonic components of input current Is are minimized, but since, as described above, operation is performed with a converter power factor close to 1, switching is performed in the vicinity of the zero-point of the current Is, and the interruption current of the self-turn-off elements constituting self-commutating converter CNV can be kept small. In this way, a low-cost power conversion device can be provided which is capable of power regeneration and which is of high power factor and high efficiency.

<Fifth Embodiment>

Figure 13:
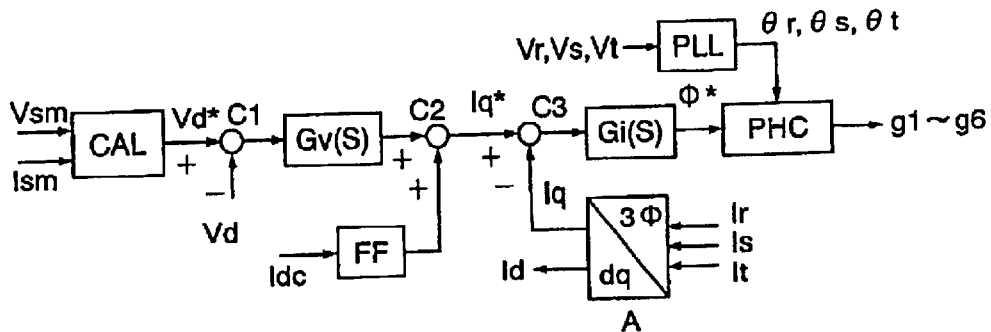
FIG. 13 is a layout diagram illustrating an embodiment of a further control circuit according to the present invention.

FIG. 13 shows a further embodiment of a control device of the power conversion device of the present invention. In this embodiment, the voltage instruction value Vd* in the control device of FIG. 2 is changed in accordance with the crest value Vsm of the power source voltage or the crest value Ism of the input current, by a calculating circuit CAL. In one control mode, calculating circuit CAL supplies a DC voltage instruction value Vd* proportional to the power source voltage crest value Vsm.

Figures 14A, 14B, 14C:
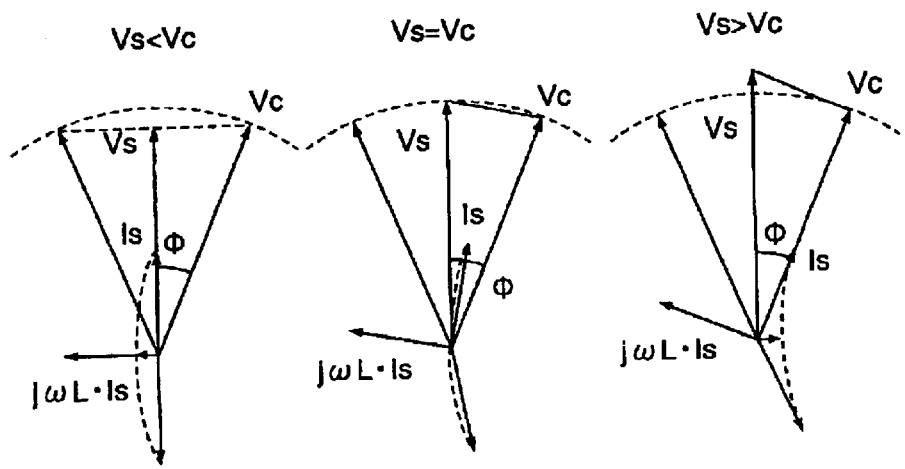
FIG. 14A, FIG. 14B and FIG. 14C are AC side voltage/current vector diagrams given in explanation of the action of a power conversion device according to the present invention.

FIG. 14A, FIG. 14B and FIG. 14C show voltage/current vector diagrams of the AC power source side when the amplitude value of the power source voltage Vs fluctuates with the DC voltage Vd controlled to be constant. At Vs=Vc, the phase angle ø=0 and the input current Is is zero. In contrast, if Vs<Vc, a leading current flows when ø=0. Contrariwise, when Vs>Vc, a lagging current flows when ø=0. When the power source voltage Vs fluctuates, the crest value of the fundamental of the converter output voltage Vc can always be matched with the crest value of the power source voltage Vs by adjusting the DC voltage Vd so as to match this.

In this way, ineffective reactive current can be prevented from being abstracted from the power source when the phase angle ø=0.

<Sixth Embodiment>

In the control device of FIG. 13 it will be assumed that the calculating circuit CAL supplies the DC voltage instruction value Vd*:

$$Vd^* = k \cdot \sqrt{\{Vsm^2 + (\omega Ls \cdot Ism)^2\}}$$

where Vsm is the power source voltage crest value, ω is the power source angular frequency, Ls is the inductance value of the AC reactor Ls, and Ism is the crest value of the input current Is.

In this control system, the DC voltage instruction value Vd* is not only changed by the magnitude of the power source voltage Vs but Vd* is also adjusted in a manner related to the input current crest value Ism.

Figure 15:
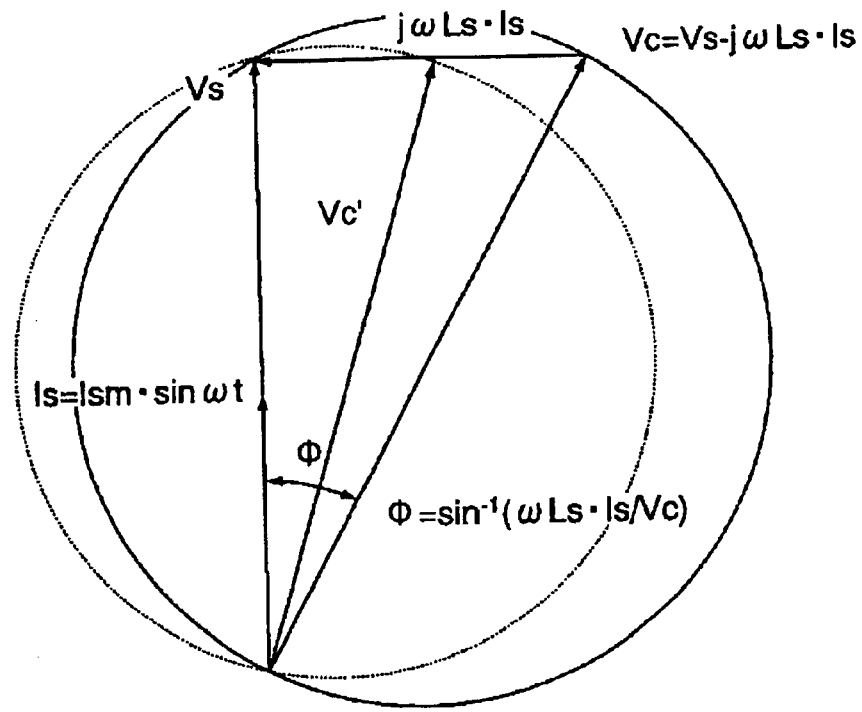
FIG. 15 is an AC side voltage/current vector diagram given in explanation of the control action of the power conversion device according to the present invention.

FIG. 15 shows a voltage/current vector diagram of the AC side at this point; the converter output voltage is maintained in the relationship:

$$Vc = \sqrt{\{Vs^2 + (\omega Ls \cdot Is)^2\}}$$

As a result, the power source voltage vector Vs and the applied voltage(=jωLs·Is) of the AC reactor Ls are always kept in an orthogonal relationship, the input current Is is in phase (or anti-phase) with the power source voltage Vs, and the input power factor=1.

Figure 16:
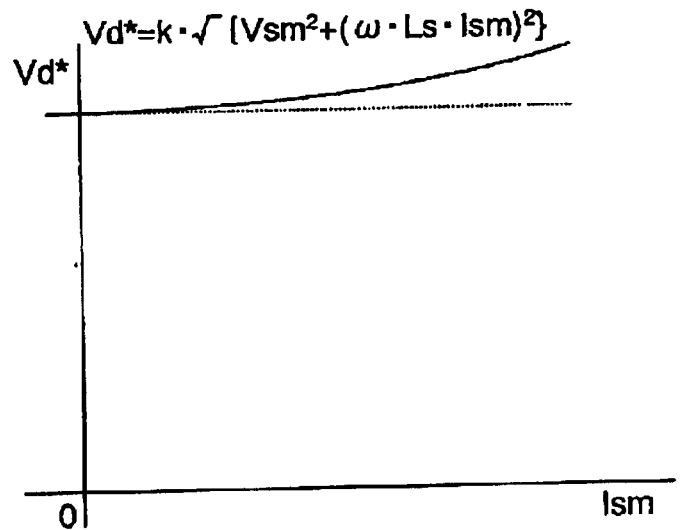
FIG. 16 is a characteristic given in explanation of the control action of the power conversion device according to the present invention.

FIG. 16 shows the relationship of the DC voltage instruction value Vd* with respect to the input current crest value Ism; it can be seen that the DC voltage instruction value Vd* is increased with increase in the current Ism.

<Seventh Embodiment>

In the control circuit of FIG. 13 it will be assumed that the calculating circuit CAL supplies the DC voltage instruction value Vd*:

$$Vd^* = k \cdot \sqrt{\{Vsm^2 - (\omega Ls \cdot Ism)^2\}}$$

where Vsm is the power source voltage crest value, ω is the power source angular frequency, Ls is the inductance value of the AC reactor, and Ism is the crest value of the input current.

In this control system, the DC voltage instruction value Vd* is not only changed by the magnitude of the power source voltage Vs but Vd* is also adjusted in a manner related to the input current crest value Ism.

Figure 17:
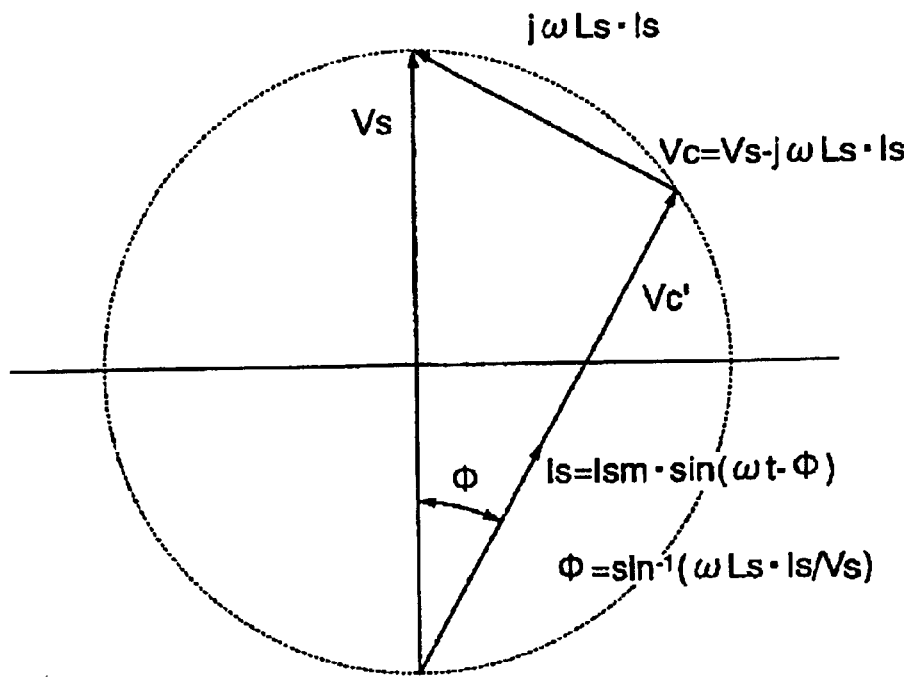
FIG. 17 is an AC side voltage/current vector diagram given in explanation of a further control action of the power conversion device according to the present invention.

FIG. 17 shows a voltage/current vector diagram of the AC side at this point; the converter output voltage maintains the relationship:

$$Vc = \sqrt{\{Vs^2 - (\omega Ls \cdot Is)^2\}}$$

As a result, the converter output voltage vector Vc and the applied voltage(=jωLs·Is) of the AC reactor Ls are always kept in an orthogonal relationship, the input current Is is in phase (or anti-phase) with the converter output voltage Vc, and the converter power factor=1.

Figure 18:
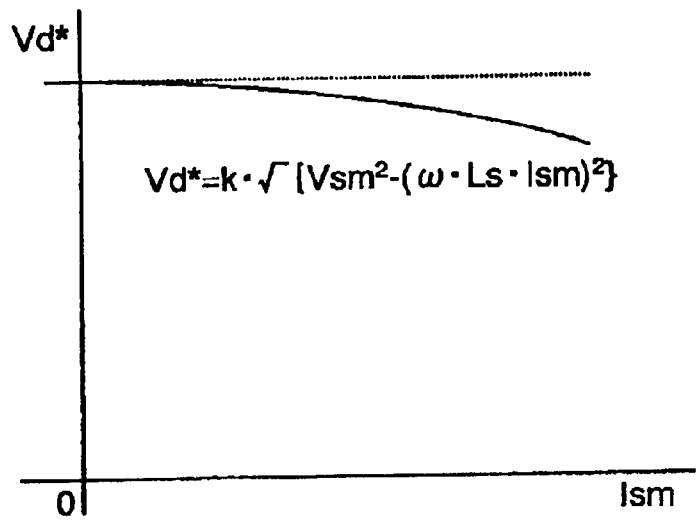
FIG. 18 is a characteristic given in explanation of a further control action of the power conversion device according to the present invention.

FIG. 18 shows the relationship of the DC voltage instruction value Vd* with respect to the input current crest value Ism; it shows that the DC voltage instruction value Vd* decreases with increase in the current Ism.

Figure 19:
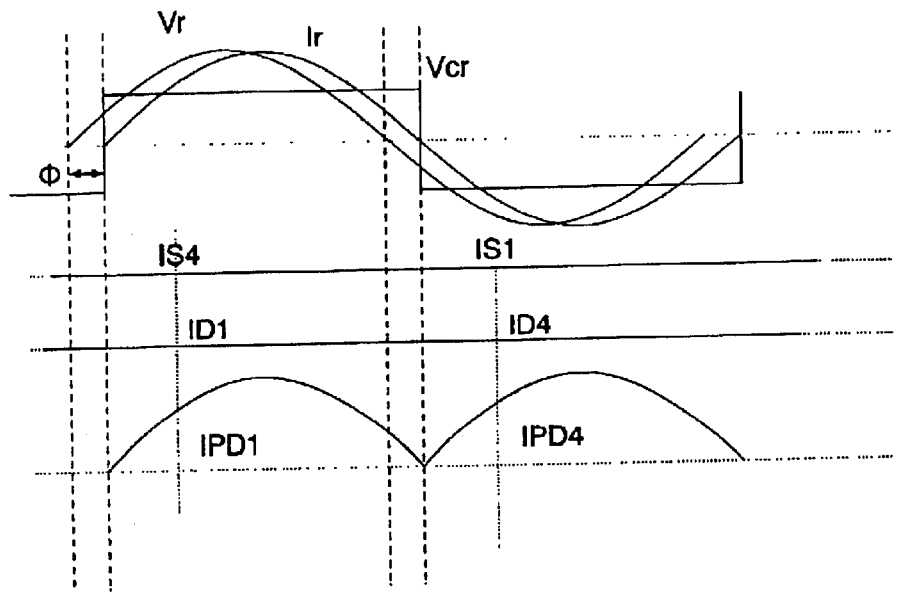
FIG. 19 is an operational waveform diagram given in explanation of a further control action of the power conversion device according to the present invention.

FIG. 19 shows the operating waveform when operation is conducted with the converter power factor at 1 in single pulse mode. This is shown for the R phase; for convenience in description, the input current Ir is depicted as a sine wave and the ripple component is omitted. In the Figure, IS1 and IS4 represent the currents of the self-turn-off elements S1, S4 of the R phase; ID1, ID4 represent the currents of the high-speed diodes D1, D4; and IPD1, IPD4 represent the current waveforms of the power diodes PD1, PD4 respectively.

FIG. 19 shows the waveform during power running operation; the fundamental wave of the AC output voltage Vcr of the converter lags the power source voltage Vs by a phase angle ø. The input current Ir is in phase with the AC output voltage Vcr of the converter and lags the power source voltage Vr with a phase angle ø.

In single pulse mode, self-turn-off element S1 or S4 performs on/off operation when the input current Ir is zero, so the interruption current of the element is zero. The same applies in the case of regenerative operation. That is, by operating with a converter power factor=1, it becomes possible to perform operation with the interruption current of the self-turn-off elements that constitute the self-commutating converter made zero, and it thus becomes possible to greatly reduce the cost of the converter. Also, since zero current switching i.e. soft switching becomes possible, the problem of EMI noise or induction faults, which creates problems with the currently employed hard switching, can be solved.

<Eighth Embodiment>

Figure 20:
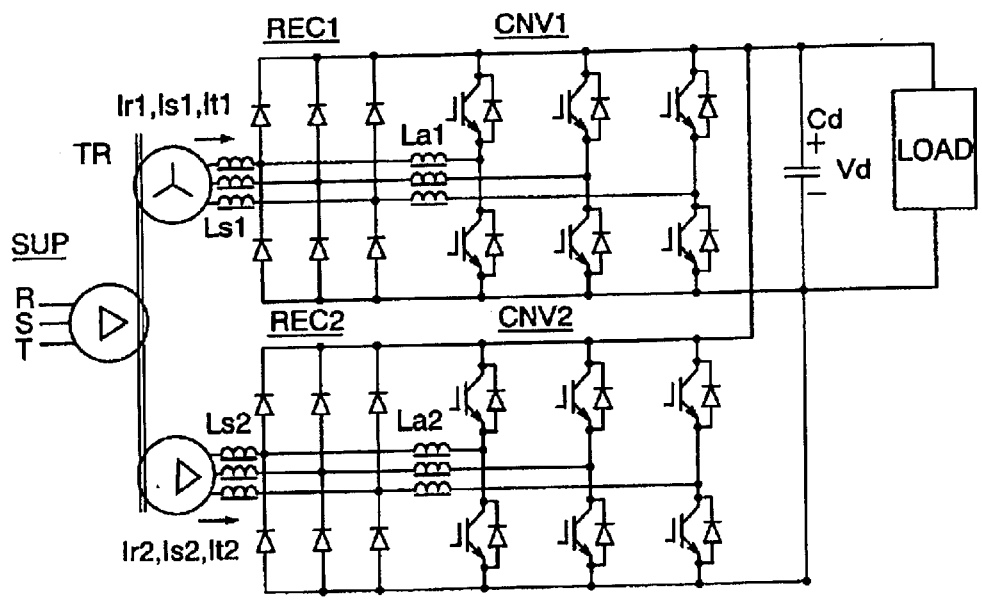
FIG. 20 is a main circuit layout diagram illustrating a further embodiment of the power conversion device according to the present invention.

FIG. 20 shows a further embodiment of the power conversion device of the present invention. In this embodiment, two power conversion devices each consisting of a combination of power diode rectifier REC and voltage-type self-commutated power converter CNV are provided, the arrangement being such that parallel multiple operation on the AC side of the power conversion device is performed and parallel connection is effected on the DC side, using a three-phase transformer TR having two sets of secondary windings given a mutual phase difference of 30°. Whether the diode rectifiers REC, voltage type self-commutating power converters CNV, AC reactors Ls and recovery current suppression reactors La described in FIG. 2 belong to the first or second group is indicated by adding 1 or 2 respectively as a suffix thereto. The transformers TR interposed between the AC power source terminals R, S, T and AC reactors LS1, LS2 comprise two sets of secondary windings, one of these secondary windings being a star connection (Y connection) while the other secondary winding is of a triangular connection (Δ connection), a phase difference of 30° being provided in the output voltages of these two. The one secondary winding of transformer TR supplies the power conversion device of the first group and the other secondary winding thereof supplies the power conversion device of the second group. Both power converters CNV1, CNV2 are connected in parallel on the DC side, their DC terminals being connected with a common DC smoothing capacitor Cd and load device LOAD. Load device LOAD represents inverter INV and AC motor M en bloc.

Figure 21:
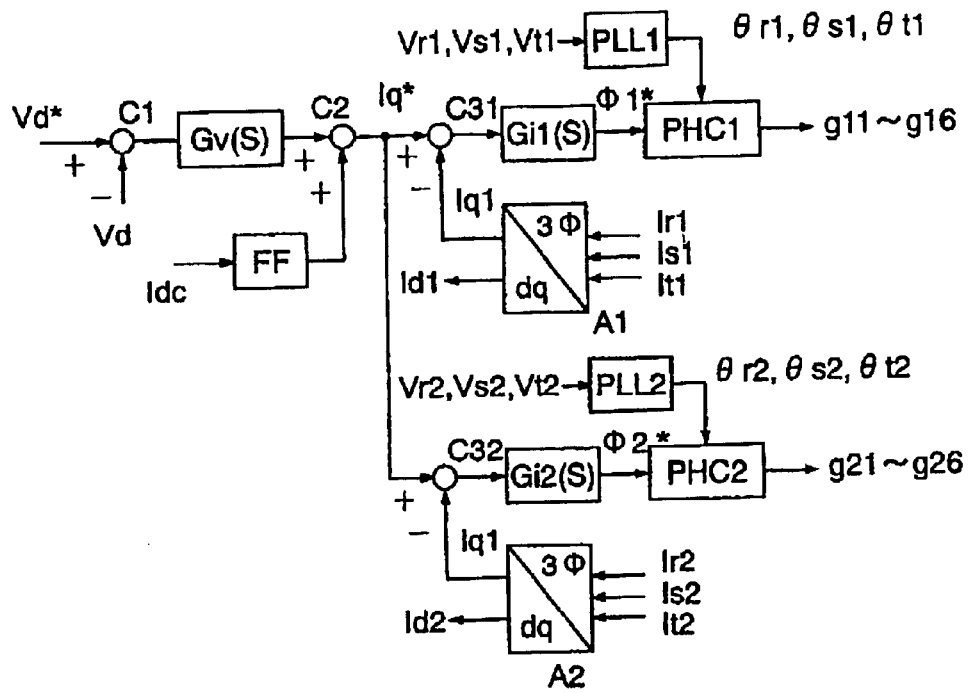
FIG. 21 is a layout diagram illustrating an embodiment of a control circuit of the power conversion device of FIG. 20.

FIG. 21 shows an embodiment of a control device for controlling the power conversion device of FIG. 20; this is employed in common for the two groups up to the point where the active current instruction value Iq* is created; after this point, it is divided into two groups. Just as in the case of FIG. 2, structural elements of each group distinguished by the addition of suffix symbols 1 or 2 for the elements of the first group and the second group. Finally, the first control device outputs gate signals g11 to g16 for the self-turn-off elements of first power converter CNV1 while the second control device outputs gate signals g21 to g26 for the self-turn-off elements of the second power converter CNV2.

Although the input currents (secondary currents of transformers TR) Ir1 and Ir2 of for example the R phase of the two sets of power conversion device are independently controlled, since the instruction values Iq* of these two are the same, they are controlled to practically the same values. As a result, the harmonics of the primary currents of the transformers TR cancel each other out, so operation with little ripple can be achieved. If parallel multiple operation is performed with a combination of three or more sets of power conversion devices, the primary current ripple of the transformers TR can be further reduced.

With the present device, increased capacity of the conversion device and reduction of the harmonic components of the input current Is that is supplied from the AC power source can be achieved; in this way, a large capacity power conversion device can be provided which is of high efficiency and low cost and which has excellent ability to withstand overloading and which is capable of power regeneration.

<Ninth Embodiment>

In this embodiment, in the power conversion device of the eighth embodiment, voltage-type self-commutated power converters CNV1 to CNVn are operated with a fixed pulse pattern and the AC input current Is is controlled by adjusting the phase angle ø with respect to the AC power source voltage Vs, thereby controlling the voltage Vd of the DC smoothing capacitor Cd. Switching synchronized with the AC power source voltage Vs is performed by operating the voltage-type self-commutated power converters CNV1 to CNVn with a fixed pulse pattern. If the DC voltage Vd is fixed, the amplitudes of the AC output voltages Vc1 to Vcn of self-commutated power converters CNV1 to CNVn are fixed. In this condition, the voltage applied to the AC reactors Ls1 to Lsn is changed by changing the phase angle ø of the output voltages Vc1 to Vcn with respect to the power source voltage Vs, thereby making it possible to adjust the input current Is. The active power Ps supplied from the AC power source is increased by increasing the phase angle ø of output voltages Vc1 to Vcn of the converters with respect to the power source voltage Vs in the lagging direction. Contrariwise, if the phase angle ø is increased in the leading direction, active power Ps is regenerated to the AC power source.

Although, if the self-commutated converters CNV1 to CNVn are controlled with a fixed pulse pattern, the switching pattern is determined so as to minimize the harmonic components of the input current Is, since the converter power factor is close to 1, switching is performed in the vicinity of the zero-point of current Is, so that the interruption current of the self-turn-off elements constituting self-commutating converters CNV1 to CNVn need only be small. In this way, a low-cost power conversion device can be provided which is of high power factor and high efficiency with little harmonic component content of the input current Is and which is capable of power regeneration.

<Tenth Embodiment>

In this embodiment, in the power conversion device of the eighth embodiment, voltage-type self-commutating power converters CNV1 to CNVn are operated in single pulse mode synchronized with the frequency of AC power source SUP and the AC input current Is is controlled by adjusting the phase angle ø with respect to the AC power source voltage Vs, thereby controlling the voltage Vd of the DC smoothing capacitor Cd.

By operating the voltage-type self-commutating power converters CNV1 to CNVn in single pulse mode, switching losses are reduced and the rate of voltage utilization of the self-commutating converters can be improved. Also, since the self-commutating converters are switched in the vicinity of the zero-point of the input current Is, the interruption current of the self-turn-off elements can be made small. In this way, a low-cost power conversion device can be provided which is of high efficiency and large capacity with excellent ability to withstand overloading.

<Eleventh Embodiment>

Figure 22:
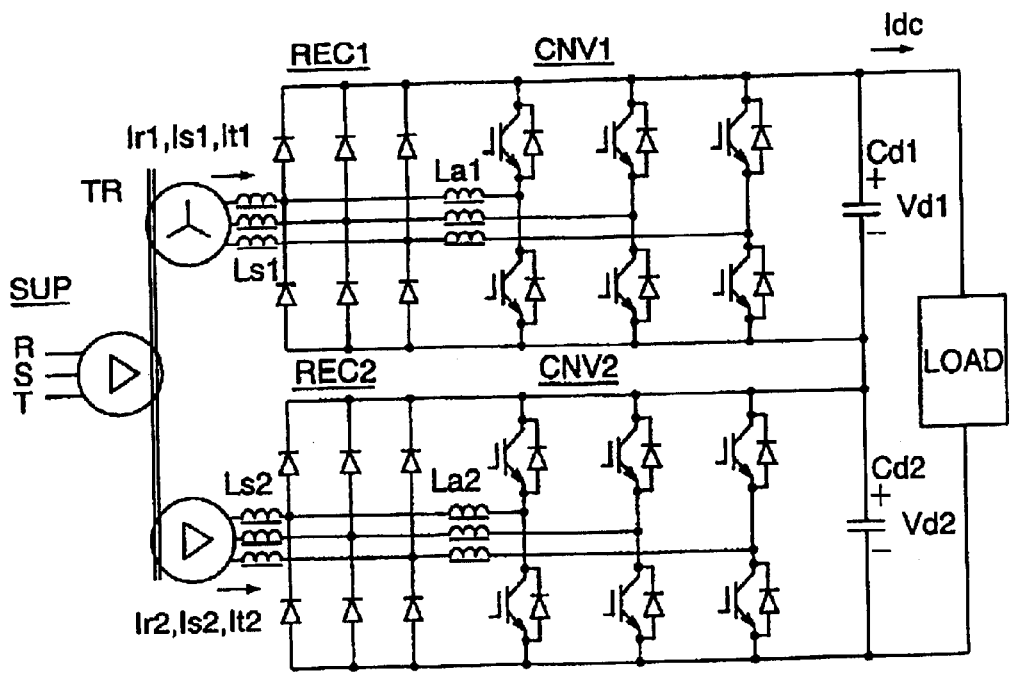
FIG. 22 is a main circuit layout diagram illustrating yet a further embodiment of the power conversion device according to the present invention.

FIG. 22 shows yet a further embodiment of a device according to the present invention. The characteristic feature of this embodiment is that the DC sides of the first and second voltage type self-commutated power converters CNV1, CNV2 are connected in series to supply a common load device LOAD. The rest of the construction is the same as in the case of FIG. 20.

Figure 23:
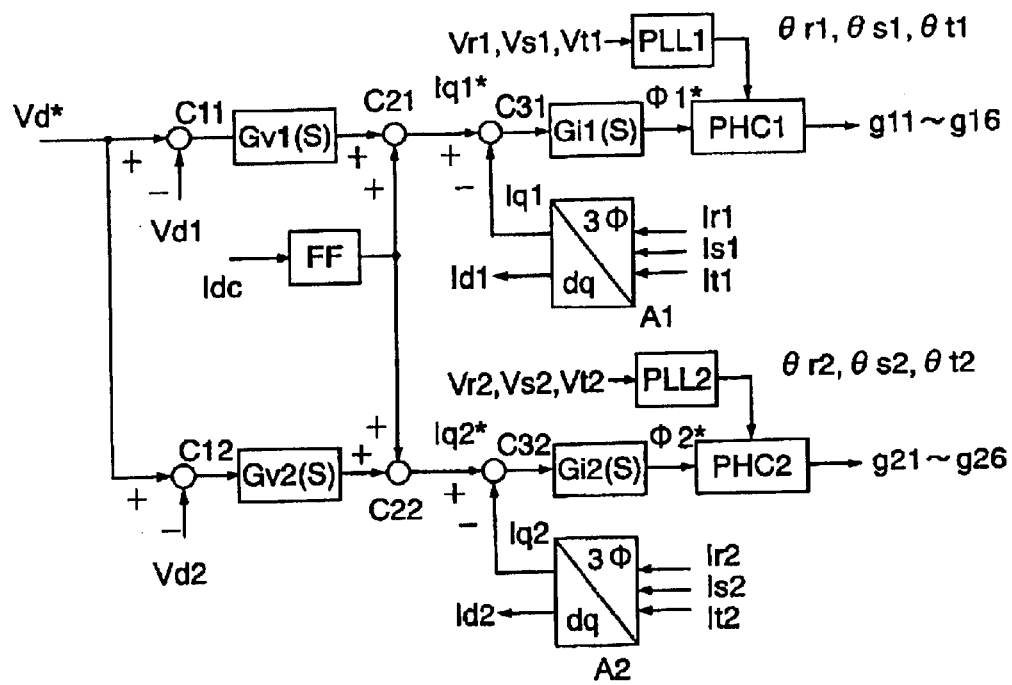
FIG. 23 is a layout diagram illustrating an embodiment of a control circuit of the power conversion device of FIG. 22.

FIG. 23 shows an embodiment of the control device of the device of FIG. 22. Self-commutating power converters CNV1 and CNV2 perform control operation such that the voltages Vd1 and Vd2 of the DC smoothing capacitors Cd1 and Cd2 respectively coincide with the instruction value Vd*.

Comparator C11 compares the voltage detection value Vd1 with the voltage instruction value Vd* and subjects the deviation εv1 to integration or proportional amplification by means of voltage control compensation circuit Gv1(S) and it delivers input to one input terminal of adder C21. Likewise, comparator C12 compares the voltage detection value Vd2 with the voltage instruction value Vd* and subjects their deviation εv2 to integration or proportional amplification by means of voltage controlled compensation circuit Gv2(S); this is then input to one input terminal of adder C22 while the DC current Idv that is consumed by load LOAD it is detected and is input to the other input terminals of adders C21 and C22 through a common feed forward compensator FF. The output of adder C21 provides the instruction value Iq1* of the active current supplied to first power conversion device (REC1+CNV1) from power source SUP. The output of adder C22 provides the instruction value Iq2* of the active current supplied to second power conversion device (REC2+CNV2) from power source SUP. Other details are the same as in the case of FIG. 21.

The input current is controlled by voltage type self-commutation power converters CNV1, CNV2 controlling the phase angles ø1, ø2 with respect to the power source voltage with a fixed pulse pattern (single pulse, 3-pulse or 5-pulse etc) synchronized with the power source voltage.

Although the input currents (secondary currents of transformer TR) Ir1 and Ir2 (R phase) of the two sets of power conversion device are independently controlled, in the steady condition, the DC voltages Vd1 and Vd2 are practically the same and the active current instruction values Iq1*, Iq2* of these two are practically same, so the input current Is1, Is2 are controlled to practically the same values. As a result, the harmonics of the primary currents of the transformers cancel each other out, so operation with little current ripple can be achieved. If parallel multiple operation is performed with a combination of three or more sets of power conversion devices, the primary current ripple of the transformers TR can be further reduced.

With the present device, increase of the capacity of the power conversion device, increase of the voltage of the DC output voltages Vd and reduction in the harmonic components of the input current Is supplied from the AC power source can be achieved, making it possible to provide a large capacity power conversion device of high efficiency and low cost capable of power regeneration and of excellent ability to withstand overloading.

<Twelfth Embodiment>

In this embodiment, in the power conversion device of the eleventh embodiment, n voltage-type self-commutated power converters CNV1 to CNVn are operated with a fixed pulse pattern and the AC input current Is is controlled by adjusting the phase angle ø with respect to the AC power source voltage Vs, thereby controlling the voltages Vd1 to Vdn applied to the DC smoothing capacitors Cd1 to Cdn.

Switching synchronized with the AC power source voltage Vs is performed by operating the voltage-type self-commutated power converters CNV1 to CNVn with a fixed pulse pattern. If the DC voltage Vd is fixed, the amplitudes of the AC output voltages Vc1 to Vcn of self-commutated power converters CNV1 to CNVn are fixed. In this condition, the voltage applied to the AC reactors Ls1 to Lsn is changed by changing the phase angle ø of the output voltages Vc1 to Vcn with respect to the power source voltage Vs, thereby making it possible to adjust the input current of the voltage-type self-commutated power converters CNV1 to CNVn. If the self-commutated power converters CNV1 to CNVn are controlled with a fixed pulse pattern, the switching pattern can be determined so as to make the harmonic components of the input current Is small, but, since operation is performed with the converter power factor close to 1, switching is performed in the vicinity of the zero-point of the current Is, so the interruption current of the self-turn-off elements constituting self-commutating converter CNV1 and CNV2 can be made small.

The active power Ps supplied from the AC power source is increased by increasing the phase angle ø of output voltages Vc1 to Vcn of the converters with respect to the power source voltage Vs in the lagging direction. Contrariwise, if the phase angle ø is increased in the leading direction, active power Ps is regenerated to the AC power source. Self-commutated converters CNV1 to CNVn are controlled so as to make the voltages Vd1 to Vdn of the DC smoothing capacitors Cd1 to Cdn practically fixed. As a result, their total voltage Vd0=Vd1+Vd2+ . . . +Vdn is controlled to be fixed. In this way, the DC output voltage can be increased and a low-cost power conversion device can be provided which is of high power factor and high efficiency with little harmonic component content of the input current Is and which is capable of power regeneration.

<Thirteenth Embodiment>

In this embodiment, in the power conversion device of the eleventh embodiment, n voltage-type self-commutated power converters CNV1 to CNVn are operated in single-pulse mode synchronized with the frequency of the AC power source SUP and the input currents of voltage-type self-commutated power converters CNV1 to CNVn are controlled by adjusting the phase angle ø with respect to the AC power source voltage Vs, thereby controlling the voltages Vd1 to Vdn applied to the DC smoothing capacitors Cd1 to Cdn.

Since the voltage type self-commutated power converters CNV1 to CNV2 are operated in single pulse mode, switching loss is reduced and the voltage utilization factor of the self-commutated converters can be improved. Also, since switching of the self-commutated converters is performed in the vicinity of the zero-point of the input current Is, the interruption current of the self-turn-off elements can be made small. In this way, a power conversion device can be provided which is of low cost, high efficiency and high capacity and of excellent ability to withstand overloading.

<Fourteenth Embodiment>

Figure 24:
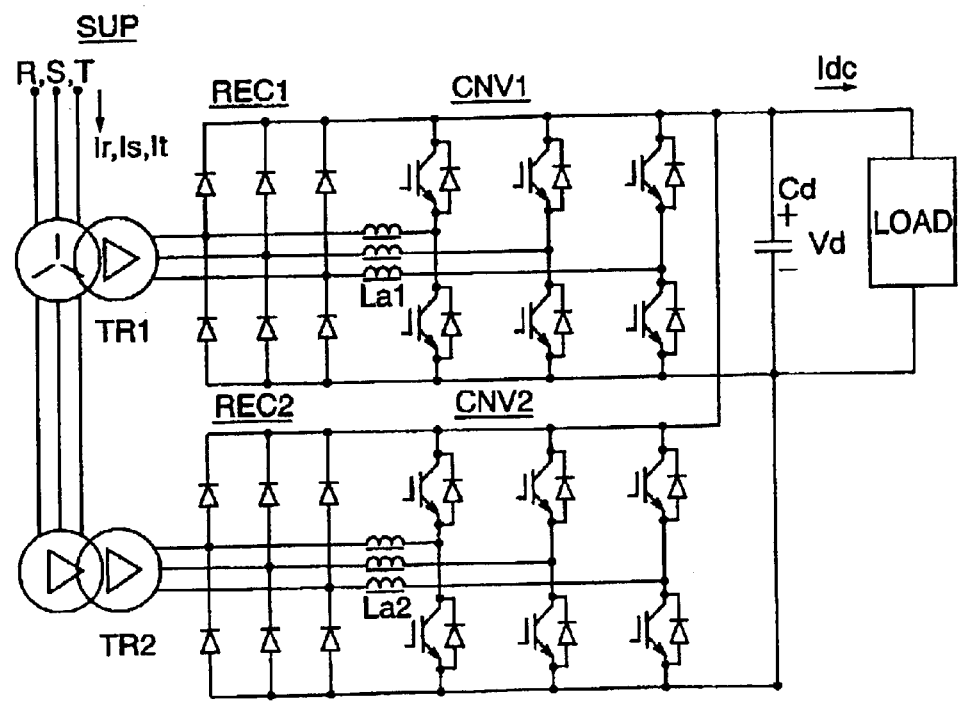
FIG. 24 is a main circuit layout diagram illustrating yet a further embodiment of the power conversion device according to the present invention.
Figure 2:
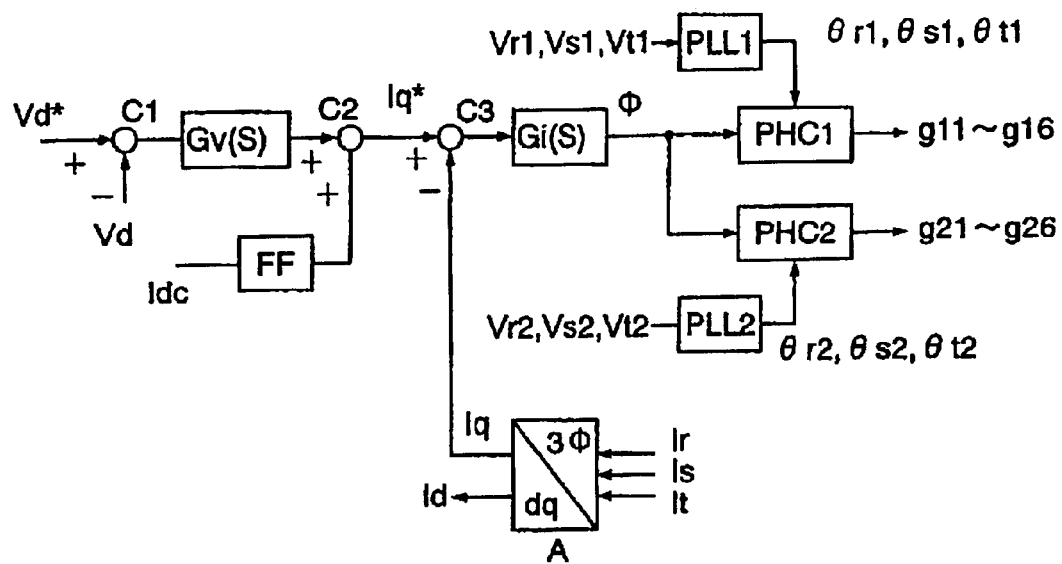

FIG. 24 illustrates yet a further embodiment of the present invention. The characteristic feature of this embodiment is that, in the device of FIG. 20, series multiple operation is arranged to be performed by employing, instead of the single transformer TR comprising two sets of secondary windings, two sets of three-phase transformers TR1, TR2 with their primary windings connected in series, their output voltages having a mutual phase difference of 30°; in addition, the AC reactors Ls1, Ls2 shown in FIG. 20 are dispensed with by making use of the leakage inductance of the two transformers. Of course, this is in principle the same as if AC reactors Ls1, Ls2 were provided externally in the same way as in the case of FIG. 20.

FIG. 25 shows an embodiment of the control device of the device of FIG. 24. In this case, from adder C1 up to current control compensation circuit Gi(S) is the same as in the case of FIG. 2; branching into two groups takes place from the phase control circuits PHC1 and PHC2 onwards. Phase control circuits PHC1 and PHC2 generate gate signals g11 to g16 and g21 to g26 for the two power converters CNV1, CNV2 using the common phase angle instruction value ø* as already described.

The input currents Ir, Is and It of the voltage type self-commutating power converters CNV1, CNV2 are controlled by controlling the phase angle ø with respect to the power source voltage with a fixed pulse pattern (single pulse, 3-pulse or 5-pulse etc) synchronized with the power source voltage. In this device, since the two transformers TR1, TR2 are connected in series on their primary sides, the input currents of the two power conversion devices (REC1+CNV1 and REC2+CNV2) are the same, resulting in a current with little harmonics.

Although an example in which two power conversion devices were employed was described above, it would of course be possible to perform series multiple connection operation using three or more power conversion devices.

With the present device, increase in capacity of the conversion device and reduction in the amount of harmonic components of input current Is supplied from the AC power source can be achieved. In particular, by series multiple operation, there is the advantage that harmonic components of the AC side input current flowing to each converter can be reduced and the number of control pulses of the self-commutating power converters CNV1 to CNVn can be reduced. Also, by utilizing the leakage inductance component of the three-phase transformers, the AC reactors that were conventionally employed can be dispensed with. In this way, a power conversion device can be provided which is of high efficiency, low cost and a large capacity, which is capable of power regeneration and has excellent ability to withstand overloading.

<Fifteenth Embodiment>

In this embodiment, in the power conversion device of the fourteenth embodiment, n voltage-type self-commutated power converters CNV1 to CNVn are operated with a fixed pulse pattern and the AC input current Is is controlled by adjusting the phase angle ø with respect to the AC power source voltage Vs, thereby controlling the voltage Vd applied to the DC smoothing capacitor Cd.

Since the voltage type self-commutated power converters CNV1 to CNV2 are operated with a fixed pulse pattern, switching is performed synchronized with the AC power source voltage Vs. If the DC voltage Vd is fixed, the amplitude value of the AC output voltages Vc1 to Vcn of the self-commutated converters CNV1 to CNVn is fixed. In this condition, the voltage applied to the leakage inductance component of the transformers is changed by changing the phase angle ø of the output voltages Vc1 to Vcn with respect to the power source voltage Vs, so the input current Is can thereby be adjusted. If the self-commutated converters CNV1 to CNVn are controlled with a fixed pulse pattern, a switching pattern can be determined such as to make the harmonic components of the input current Is small, but, by performing operation in the vicinity of a converter power factor of 1, switching is performed in the vicinity of the zero-point of the current Is, making it possible to make the interruption current of the self-turn-off elements constituting the self-commutated converters CNV1 to CNVn small.

The active power Ps supplied from the AC power source is increased by increasing the phase angle ø of output voltages Vc1 to Vcn of the converters with respect to the power source voltage Vs in the lagging direction. Contrariwise, if the phase angle ø is increased in the leading direction, active power Ps is regenerated to the AC power source.

The input current Is of the self-commutated converters CNV1 to CNVn is controlled so as to make the voltage Vd applied to the DC smoothing capacitor Cd practically fixed. In this way, a power conversion device can be provided which is of high power factor and high efficiency and low cost and in which power regeneration is possible and wherein the harmonic components of the input current can be made small.

<Sixteenth Embodiment>

In this embodiment, in the power conversion device of the fourteenth embodiment, n voltage-type self-commutated power converters CNV1 to CNVn are operated in single-pulse mode synchronized with the frequency of the AC power source SUP and their AC input currents Is are controlled by adjusting the phase angle ø with respect to the AC power source voltage Vs, thereby controlling the voltage Vd applied to the DC smoothing capacitor Cd.

In this embodiment, the self-commutated converters CNV1–CNVn are operated with a fixed pulse pattern in the same way as in the case of the fifteenth embodiment, but the number of pulses is made a single pulse. Of course, if the DC voltage Vd is fixed, the amplitude values of the AC side output voltages Vc1 to Vcn of the self-commutated converters CNV1 to CNVn are fixed. The input current Is is controlled by adjusting the phase angle ø of the total voltage of the AC side output voltages Vc1 to Vcn of the self-commutated converters CNV1 to CNVn with respect to the power source voltage Vs, but in order to make Is=0 when ø=0, it is necessary that the crest value of the power source voltage Vs and the fundamental crest value of the total voltage of the converter output voltages Vc1 to Vcn should be made the same. Since the DC voltage Vd is determined by demand etc on the load side, the secondary side voltage of the three-phase transformers TR1 to TRn is matched in value so as to be for same as the fundamental component of the AC side output voltages Vc1 to Vcn of the self-commutated converters CNV1 to CNVn.

By operating self-commutating converters CNV1 to CNVn with a single pulse, the number of times of switching can be minimized and converter efficiency even further increased. Also, the fundamental component of AC side output voltages Vc1 to Vcn becomes large and the voltage utilization rate of self-commutating converters CNV1 to CNVn is improved. Also, since operation is performed with a converter power factor of practically 1, switching is performed once only, in the vicinity of the zero-point of the input current Is; thus, whether during power running operation or during regenerative operation, the interruption current of the self-turn-off elements becomes very small. As a result, a power conversion device of low cost and high efficiency can be provided. This therefore approximates to soft switching in that no large current is interrupted; thus EMI noise is small and a power conversion device can be provided that is environment-friendly.

<Seventeenth Embodiment>

In the power conversion device of the eighth to sixteenth embodiments, the present embodiment comprises a saturable reactor wherein the recovery current suppression reactors La1 to Lan are saturated.

In the self-commutating power converters CNV1 to CNVn, each arm is constituted by a self-turn-off element and a high-speed diode connected in anti-parallel; for example when current flows in the self-turn-off element of the upper arm and this element is turned OFF, the current shifts to the high-speed diode of the lower arm. Since the forward voltage drop of the high-speed diode is larger than that of the power diode, this current gradually shifts to the power diode corresponding to power diode rectifiers REC1 to RECn. This commutation time is inversely proportional to the inductance value of recovery current suppression reactors La1 to Lan. By making La1 to La saturable reactors, the inductance value thereof becomes small when the current flowing therein is large, with the result that the current that was flowing in high-speed diodes D1 to D6 shifts more rapidly to the power diodes PD1 to PD6, decreasing losses.

<Eighteenth Embodiment>

In this embodiment, in the power conversion device of the eighth to the seventeenth embodiments, when the voltage Vs of the AC power source of n voltage type self-commutating power converters CNV1 to CNVn fluctuates, control is performed by altering the instruction value of the voltage Vd applied to the DC smoothing capacitor Cd, matching the change of this power source voltage Vs.

When the n voltage type self-commutating power converters CNV1 to CNVn are operated with a single pulse or a fixed pulse pattern, the amplitude value of the AC side output voltage Vc of these power converters CNV1 to CNVn is fixed; if the power source voltage Vs becomes high, converters CNV1 to CNVn assume an operating condition with lagging power factor and if the power source voltage Vs becomes low, converters CNV1 to CNVn assume an operating condition with leading power factor. Also, with a fall in the power factor, the phase difference between the AC side output voltage Vc of the self-commutated power converters CNV1 to CNVn and the input current Is becomes large, causing the interruption current of the self-turn-off elements that make up the self-commutated power converters to become large. Control is therefore performed such that |Vs| always=|Vc|, by adjusting the voltage Vd that is applied to the DC smoothing capacitor Cd so as to match the amplitude value of the power source voltage Vs. In this way, it is possible to prevent extreme drops of the power source power factor or converter power factor and so prevent increase of the interruption current of the self-turn-off elements.

<Nineteenth Embodiment>

In this embodiment, in the power conversion device of the eighth to eighteenth embodiment, control of the voltage Vd that is applied to the DC smoothing capacitor Cd by the n voltage type self-commutating power converters CNV1 to CNVn is performed such that:

$$Vd = k \cdot \sqrt{\{Vs^2 + (\omega \cdot Ls \cdot Is)^2\}}$$

where the angular frequency of the AC power source SUP is $\omega$, the power source voltage is Vs, the input current is Is, the inductance value of the AC reactor is Ls and the constant of proportionality is k.

By approximate adjustment of the voltage Vd that is applied to the DC smoothing capacitor Cd by the n voltage type self-commutating power converters CNV1 to CNVn such that:

$$Vd = k \cdot \sqrt{\{Vs^2 + (\omega \cdot Ls \cdot Is)^2\}}$$

the phase of the input current Is can be made to match the phase of the power source voltage Vs so operation with a power source power factor=1 can be achieved. This benefit also applies likewise to regenerative operation. In this way, a power conversion device of excellent ability to withstand overloading and of low cost and high power factor can be provided.

<Twentieth Embodiment>

In this embodiment, in the power conversion device of the eighth to eighteenth embodiment, control of the voltage Vd that is applied to the DC smoothing capacitor Cd by the n voltage type self-commutating power converters CNV1 to CNVn is performed such that:

$$Vd = k \cdot \sqrt{\{Vs^2 - (\omega \cdot Ls \cdot Is)^2\}}$$

where the angular frequency of the AC power source SUP is $\omega$, the power source voltage is Vs, the input current is Is, the inductance value of the AC reactor is Ls and the constant of proportionality is k.

By approximate adjustment of the voltage Vd that is applied to the DC smoothing capacitor Cd by the n voltage type self-commutating power converters CNV1 to CNVn such that:

$$Vd = k \cdot \sqrt{\{Vs^2 - (\omega \cdot Ls \cdot Is)^2\}}$$

the phase angle ø of the input current Is with respect to the power source voltage Vs can be made to practically match the phase angle ø of the AC side output voltage Vc of the self-commutating power converters CNV1 to CNVn. That is, by matching the phases of the input current Is and the converter output voltage Vc, operation with converter power factor=1 can be achieved. As a result, the interruption current of the self-turn-off elements constituting the self-commutating converters CNV can be made small and the converter capacity can be reduced. This benefit also applies in the same way in the case of regenerative operation. In this way, a power conversion device of high efficiency and low cost with excellent ability to withstand overloading can be provided.

Next, an embodiment of a power conversion device using multi-level output self-commutated power converters will be described.

<Twenty-First Embodiment>

Figure 26:
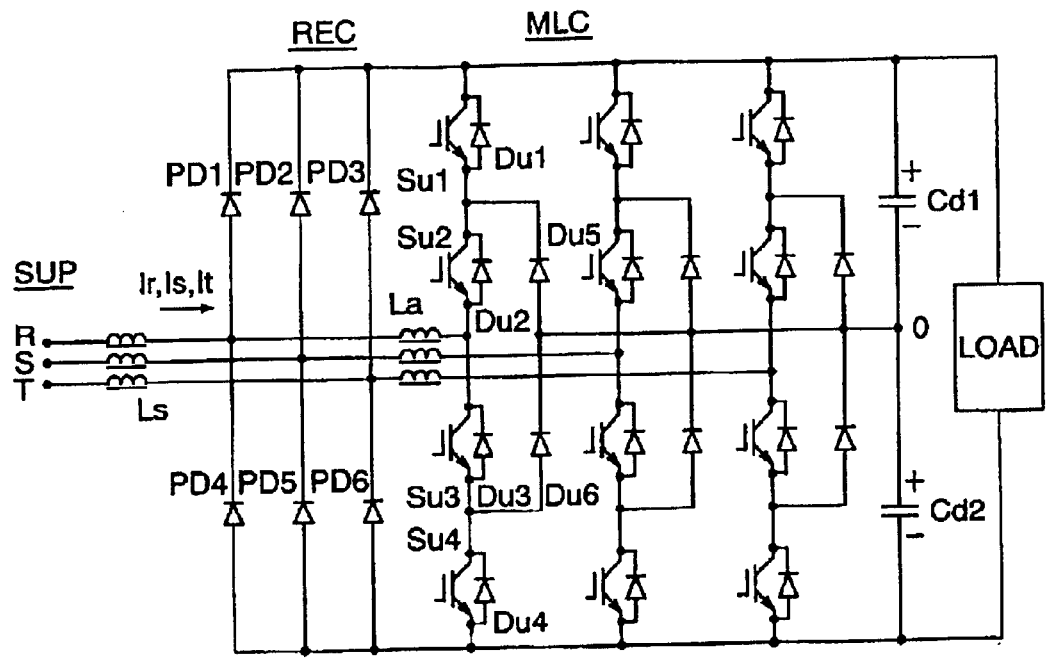
FIG. 26 is a connection diagram illustrating an embodiment of the power conversion device according to the present invention.

FIG. 26 is a block diagram illustrating an embodiment of the main circuit layout of a power conversion device according to the present invention. The power conversion device shown in FIG. 26 comprises a power diode rectifier REC whose AC terminal is connected with incoming terminals R, S, T of three-phase AC power source SUP through AC reactor Ls, a three-level output self-commutated power converter MLC whose AC terminal is connected with rectifier REC through recovery current suppression reactor La and whose DC terminal is connected with the DC terminal of rectifier REC, and a smoothing capacitor circuit comprising two series-connected DC smoothing capacitors Cd1 and Cd2, both of whose terminals are connected with the DC terminal of self-commutated power converter MLC; load device LOAD is connected with the smoothing capacitor circuit, using this as voltage source. Load device LOAD comprises for example a VVVF inverter and AC electric motor.

Power diode rectifier REC comprises six power diodes PD1 to PD6 in a three-phase bridge connection; the power diodes PD1 to PD3 constitute positive arms and power diodes PD4 to PD6 constitute negative arms. The three-level output self-commutating power converter MLC is a neutral point clamping type converter (NPC converter) each phase of which has the same construction. Describing the R phase, the positive and negative arms comprise respectively two series-connected high-speed diodes Du1, Du2 and Du3, Du4, and self-turn-off elements Su1, Su2 and Su3, Su4 connected in anti-parallel with these high-speed diodes. Two series-connected clamping high-speed diodes Du5, Du6 are connected between the connection point of high-speed diodes Du1 and Du2 and the connection point of high-speed diodes Du3 and Du4, the series connection point thereof being connected with the series connection point of DC smoothing capacitors Cd1, Cd2 i.e. the DC neutral point. In the following description, it will be assumed that the voltages of the DC smoothing capacitors Cd1, Cd2 are respectively Vd1, VD2 and that Vd1=Vd2=Vd/2 i.e. that Vd1+Vd2=Vd.

In an NPC converter, four self-commutating elements Su1 to Su4 for each phase are ignited combined in groups of two. That is, when self-turn-off elements Su1, Su2 are turned ON, a voltage Vr=+Vd/2 is generated at the output terminal of the R phase; when self-turn-off elements Su2, Su3 are turned ON, the voltage is clamped at the DC neutral point, producing Vcr=0. Also, when self-turn-off elements Su3, Su4 are turned ON, the voltage Vcr=−Vd/2 is output. Thus, three-level voltage output: +Vd/2, 0, −Vd/2 can be obtained.

Self-turn-off elements Su1 and Su3 perform mutually inverted ON/OFF operation: when element Su1 is ON, element Su3 is OFF and when element Su3 is ON, element Su1 is OFF. Likewise, self-turn-off elements Su2 and Su4 perform mutually inverted ON/OFF operation: when element Su2 is ON, element Su4 is OFF and when element Su4 is ON, element Su2 is OFF. In addition, a mode might be considered wherein self-turn-off elements Su1 and Su4 are ON and elements Su2 and Su3 are OFF; however, in this case, the DC total voltage Vd would be applied to the element Su2 or Su3, which would result in breakdown of this element; this mode is therefore forbidden.

Clamping diodes Du5, Du6 clamp the output voltage Vcr at the DC neutral point potential "O" when elements Su2 and Su3 are ON. When input current Ir is flowing in the direction of the arrows in the Figure i.e. from the power source side to the power conversion device side, current Ir flows along the path R→Ls→La→Su3→Du6→neutral point O in the Figure. When input current Ir is flowing in the opposite direction of the arrows, current Ir flows along the path neutral point O→Du5→Su2→La→Ls→R.

A characteristic feature in this embodiment is that power diode rectifier REC is connected in parallel with NPC converter MLC. That is, the AC terminals of NPC converter MLC and power diode rectifier REC are connected through recovery current suppression reactor La.

Recovery current suppression reactor La has the function of suppressing inflow of excessive recovery current to the diodes of the power diode rectifier when the self-turn-off elements of the three-level output self-commutating power converter MLC perform ON operation. Normally, it is designed to have an inductance value of several tens of $\mu$H; thus, it may be about two orders of magnitude smaller than the AC reactor Ls. Also, by making the recovery current suppression reactor La a saturable reactor, the time required for commutation from high-speed diodes Du1 to Du6 to power diodes PD1 to PD6 can be shortened and losses therefore reduced by a corresponding amount.

For example, when R phase current Ir is flowing in the direction of the arrows, if self-turn-off elements Su3, Su4 are OFF (Su1 and Su2 are ON), current Ir flows through power diode PD1. If, in this condition, element Su1 is turned OFF and Su3 is turned ON, the input current Ir shifts to Ls→La→Su3→Du6, but, since accumulated carriers remain in power diode PD1, diode PD1 cannot immediately be turned OFF, so the voltage Vd1 of DC smoothing capacitor Cd1 is short-circuited by the path Cd1(+)→PD1→La→Su3→Du6→Cd1(−). The current which then flows is recovery current. If recovery current suppression reactor La is absent, excessive short-circuit current may flow, destroying the constituent elements (self-turn-off elements and diodes).

Next, when element Su3 is again turned OFF and element Su1 is turned ON, input current Ir first of all flows through high-speed diodes Du2, Du1 on the path: Ls→La→Du2→Du1→(+). Since the forward voltage drop VFD of high-speed diodes Du1, Du2 is larger than the forward voltage drop VFPD of power diode PD1, this current gradually shifts to power diode PD1. The time required for commutation from high-speed diodes Du1, Du2 to power diode PD1 depends on the difference voltage (VFD-VFPD) of the forward voltage drop referred to above and the inductance value of the recovery suppression reactor La. By operating the three-level output self-commutated power converter (NPC converter) with fixed pulse pattern (single pulse, 3-pulse or 5-pulse etc, the time for which the current flows in the power diode can be lengthened and the time for which the current flows in the high-speed diodes can be shortened. As a result, it can be arranged that the current flows in a circuit with a smaller forward voltage drop, thereby increasing the efficiency of the conversion device. The same applies in the other modes.

Figure 27:
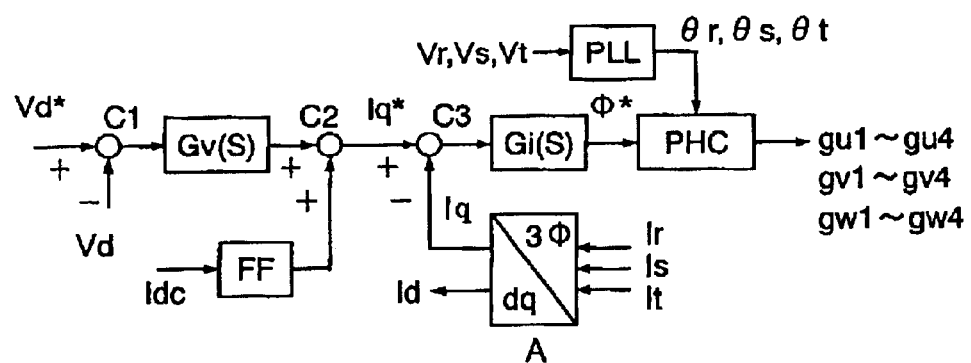
FIG. 27 is a block diagram illustrating an embodiment of a control circuit of the power conversion device of FIG. 26.

FIG. 27 shows a control device that controls the self-turn-off elements of the NPC converter MLC (Multi-Level-Converter) associated with the power conversion device of FIG. 26. This control device comprises comparators C1, C3, adder C2, and voltage controlled compensation circuit Gv(S), current control compensation circuit Gi(S), feed forward compensator FF, co-ordinate conversion circuit A, power source synchronization phase detection circuit PLL and phase control circuit PHC. The voltage Vd(=Vd1+Vd2) corresponding to the sum of voltages Vd1 and Vd2 applied to the DC smoothing capacitors Cd1, Cd2 is compared with the voltage instruction value Vd* by comparator C1. The deviation $\epsilon v$(=Vd*−Vd) thereof is subjected to integration or proportional amplification by the voltage control compensation circuit Gv(S) and the output value of this is input to the first input terminal of adder C2 as an uncompensated DC current instruction. In addition, the DC current Idc consumed by the load LOAD is detected and input to the second input terminal of adder C2 through feed forward compensator FF. The output Iq* of adder C2 is the instruction value of the active current supplied from power source SUP. Co-ordinate converter A converts the detected values of three-phase input currents Ir, Is and It that are supplied to the power converter from power source SUP to the dq coordinate axes (DC amounts). The q axis current Iq obtained by co-ordinate conversion expresses the detected value of the active current and the d axis current Id expresses the detected value of the reactive current.

Phase angle instruction value $\phi$* is obtained by comparing the active current instruction value Iq* and the active current detection value Iq using comparator C3 and amplifying the deviation value $\epsilon i$(=Iq*−Iq) using the current control compensation circuit Gi(S). Power source synchronization phase detection circuit PLL creates phase signals $\theta r$, $\theta s$, $\theta t$ synchronized with the three-phase AC power source voltages Vr, Vs and Vt and inputs these to phase control circuit PHC. Phase control circuit PHC generates gate signals gu1 to gu4 for the U phase self-turn-off elements Su1 to Su4 of NPC converter MLC and, in addition, generates gate signals gv1 to gv4 for the S phase self-turn-off elements Sv1 to Sv4 and gate signals gw1 to gw4 for the T phase self-turn-off elements Sw1 to Sw4 using the phase angle instruction value $\phi$* and phase signals $\theta r$, $\theta s$, $\theta t$ for each phase. In NPC converter MLC the input currents Ir, Is and It are controlled by controlling the phase angle $\phi$ with respect to the power source voltage with a fixed pulse pattern (single pulse, 3-pulse, 5-pulse etc) synchronized with the power source voltage, by means of gate signals gu1 to gu4, gv1 to gv4 and gw1 to gw4.

Figure 28:
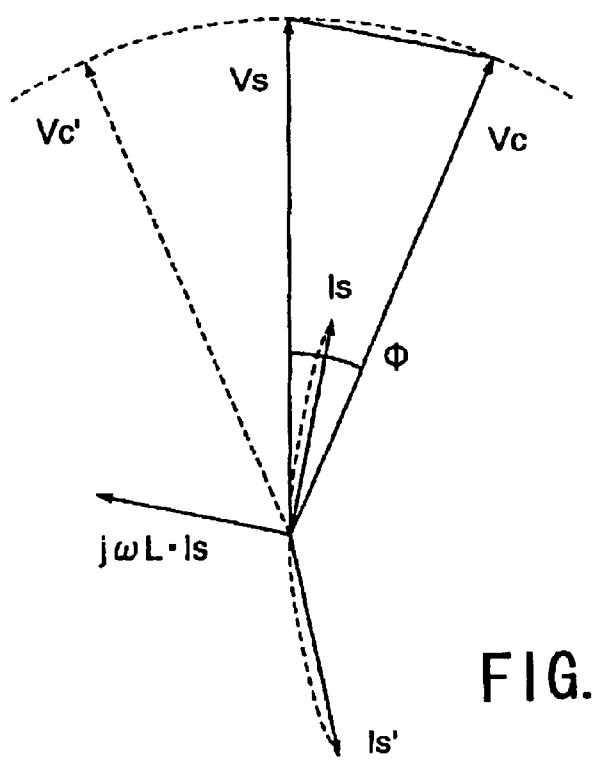
FIG. 28 is an AC side voltage/current vector diagram given in explanation of the control action of the power conversion device according to FIG. 26.

FIG. 28 illustrates a voltage/current vector diagram given in explanation of the control action of a device according to the present invention. In the Figure, Vs is the power source voltage, Vc is the AC output voltage of the NPC converter, Is is the input current and j$\omega$Ls·Is is the amount of voltage drop produced by the AC reactor Ls (where the resistance of the reactor Ls is neglected as being very small). The vector relationship Vs=Vc+j$\omega$Ls·Is holds.

The crest value of power source voltage Vs and the fundamental crest value of AC output voltage Vc of NPC converter MLC are matched so as practically coincide. The DC voltage Vd is usually determined by demand from the load side; if the pulse pattern is determined, this determines the fundamental crest value of the AC output voltage Vc. Accordingly, the crest values are matched by arranging a transformer on the power source side and taking the secondary voltage of this as Vs.

The input current Is can be controlled by adjusting the phase angle ø of the AC output voltage Vc of the NPC converter with respect to the power source voltage Vs. Specifically, if the phase angle ø=0, the voltage jωLs·Is that is applied to the AC reactor Ls becomes zero and the input current Is also becomes zero. If the phase angle ø (lag) is increased, the voltage jωLs·Is increases and the input current Is also increases in proportion to this value. The input current vector Is lags the voltage jωLs·Is by 90° and is a vector lagging the power source voltage Vs by ø/2. The input power factor seen from the power source side is therefore cos(ø/2).

On the other hand, if the AC output voltage of the NPC converter is increased in the direction of advancing phase angle ø as Vc' in FIG. 28, the voltage jωLs·Is that is applied to AC reactor Ls becomes negative, resulting in a phase angle of (π−ø/2) with respect to power source voltage Vs where the input current is Is'. That is, the power Ps=Vs·Is becomes negative, making it possible for power to be regenerated to the power source. When the AC output voltage Vc is shifted in the direction of Vc' along the broken line in the Figure, taking the power source voltage Vs as standard, the input current vector Is changes in the direction of Is' along the broken line.

In FIG. 27, the active current Iq is controlled as follows.

When Iq*>Iq, the output ø* of the current control compensation circuit Gi(S) increases, causing the input current Is to increase. Since the input power factor≈1, the active current Iq increases and soon settles down at Iq*=Iq. Contrariwise, if Iq*<Iq, the output ø* of the current control compensation circuit Gi(S) decreases or becomes a negative value, causing the input current Is to decrease. Since the input power factor≈1, the active current Iq decreases, until it likewise settles down at Iq*=Iq.

Also, the voltage Vd=Vd1+Vd2 of DC smoothing capacitors Cd1, Cd2 is controlled as follows.

When Vd*>Vd, the output Iq* of adder C2 on the output side of voltage control compensation circuit Gv(S) increases and is controlled as described above to Iq*=Iq, so active power Ps is supplied from the AC power source SUP to DC smoothing capacitors Cd1, Cd2. As a result, the DC voltage Vd increases, and is controlled such that Vd*=Vd.

Contrariwise, when Vd*<Vd, the output Iq* of adder C2 decreases, or becomes a negative value, causing active power Ps to be regenerated on the side of AC power source SUP from DC smoothing capacitors Cd1, Cd2. As a result, control is exercised whereby DC voltage Vd is decreased until Vd*=Vd.

In the devices of FIG. 26 and FIG. 27, the DC current Idc taken by the load LOAD is detected and a compensation amount IqFF=k1·Idc is calculated by feed-forward compensator FF such that active current matching this amount is supplied, and is input to adder C2. In this way, if there is an abrupt change in the load, an input current (active current) Iq matching this is supplied, suppressing fluctuation of the applied voltage Vd of DC smoothing capacitors Cd1, Cd2.

<Twenty-Second Embodiment>

In this embodiment, in the power conversion device of FIG. 26, the recovery current suppression reactor La is constituted by a saturable reactor.

The R phase arm of NPC converter MLC is constituted by self-turn-off elements Su1 to Su4, high-speed diodes Du1 to Du4 connected in anti-parallel therewith and clamping diodes Du5 to Du6. For example when current flows in self-turn-off elements Su2, Su3 of the middle two arms, if the input current Ir is taken as flowing in the direction of the arrows, current flows along the path Ls→La→Su3→Du6. If, in this condition, element Su3 is turned OFF (element Su1 is turned ON), due to the action of the recovery current suppression reactor La, first of all, current shifts to the high-speed diodes Du2, Du1. Next, since the forward voltage drop VFD of the high-speed diode is larger than the forward drop voltage VFPD of power diode PD1, this current gradually shifts to power diode PD1. The commutation time is inversely proportional to the inductance value of recovery current suppression reactor La. By making reactor La a saturable reactor, its inductance value when the current flowing therein is large is decreased, causing the current that was flowing in the high-speed diode to shift more rapidly to power diodes PD1 to PD6 and so enabling converter loss to be reduced.

<Twenty-Third Embodiment>

Figure 29:
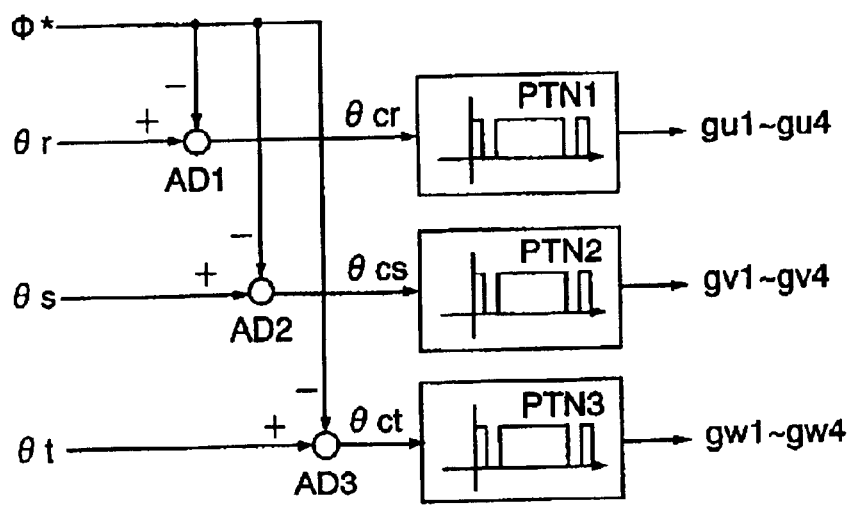
FIG. 29 is a block diagram given in explanation of the phase control action of a power conversion device according to FIG. 26.

FIG. 29 shows an embodiment of a phase control circuit PHC in FIG. 27. In FIG. 29, AD1 to AD3 indicate adders separately provided for each phase and PTN1 to PTN3 likewise indicate pulse pattern generators that are separately provided for each phase. Adders AD1 to AD3 subtract the phase angle instruction value ø* from phase signals θr, θs, θt to create new phase signals θcr, θcs, θct. These new phase signals θcr, θcs, θct are periodic functions of 0 to 2π and change synchronously with the power source frequency. Pulse pattern generators PTN1 to PTN3 generate gate signals gu1 to gu4, gv1 to gv4 and gw1 to gw4 for each phase for the new phase signals θcr, θcs, θct such as to produce a fixed pulse pattern.

Figure 30:
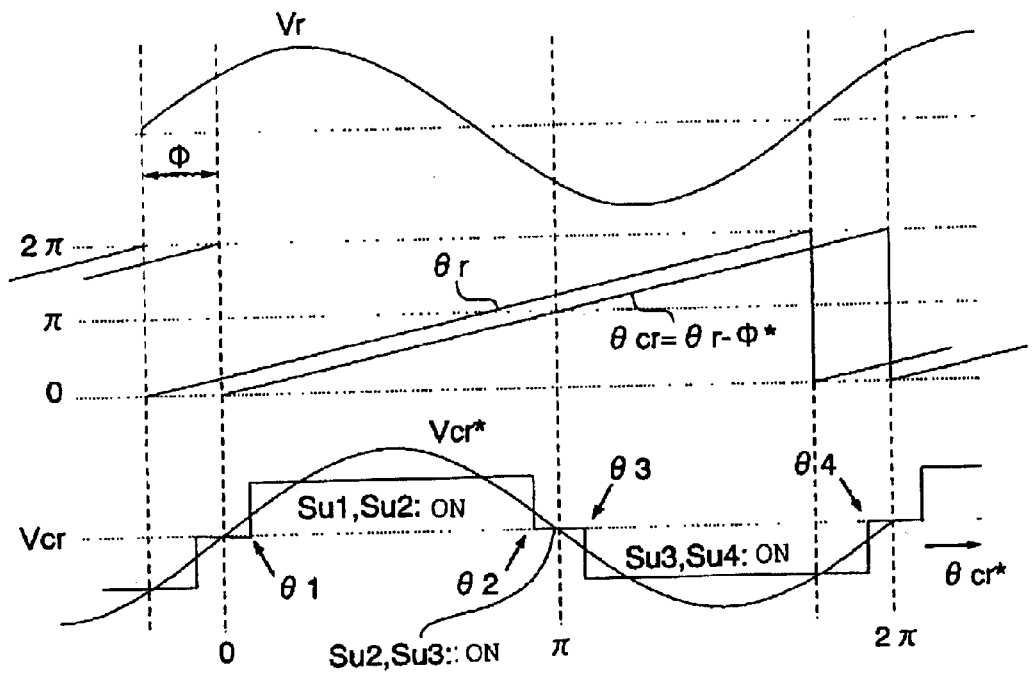
FIG. 30 is a time chart given in explanation of the phase control action of the power conversion device according to FIG. 26.

Taking the R phase as a typical example, pulse pattern generator PTN1 of pulse pattern generators PTN1 to PTN3 stores the pulse patterns of the R phase elements Su1 to Su4 with respect to the phase signal θcr as a table function; the waveform during single-pulse operation is shown in FIG. 30. In FIG. 30, Vr indicates the R phase power source voltage, θr indicates a phase signal that is synchronized with the power source voltage Vr; this is a periodic function that changes between 0 and 2π. Phase signal θcr=θr−ø* is a periodic function that changes between 0 and 2π and is given by a signal that lags phase signal θr by phase angle ø*. Specifically, for input θcr, gate signals gu1 to gu4 are output as follows.

In the range
0≦θcr<θ1, gu1=0, gu2=1, gu3=1, g4=0 (Su2, Su3: ON, Su1, Su4: OFF), Vcr=0.

In the range
θ1≦θcr<θ2, gu1=1, gu2=1, gu3=0, g4 0 (Su1, Su2: ON, Su3, Su4: OFF), Vcr=+Vd/2.

In the range
θ2≦θcr<θ3, gu1=0, gu2=1, gu3=1, g4=0 (Su2, Su3: ON, Su1, Su4: OFF), Vcr=0.

In the range
θ3≦θcr<θ4, gu1=0, gu2=0, gu3=1, g4=1 (Su1, Su2: OFF, Su3, Su4: ON), Vcr=−Vd/2.

In the range
θ4≦θcr<2π, gu1=0, gu2=1, gu3=1, g4=0 (Su2, Su3: ON, Su1, Su4: OFF), Vcr=0.

In this way, a three-level output voltage is obtained.

If the pattern is fixed, and if DC voltage Vd is fixed, the amplitude value of AC output voltage Vcr is fixed. The phase of the fundamental wave Vcr* of the AC output voltage Vcr lags the power source voltage Vr by a phase angle ø. While the above represents the R phase signal, the S phase and T phase are supplied in the same way.

Figure 31:
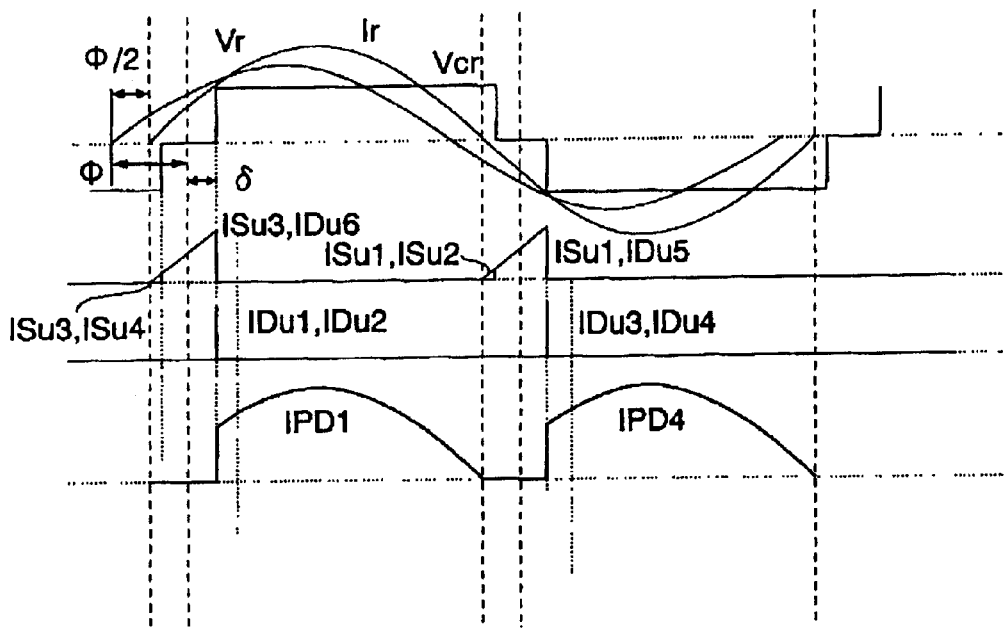
FIG. 31 is an operating waveform diagram of the various parts given in explanation of the control action during power running operation of the power conversion device of FIG. 26.
Figure 3:
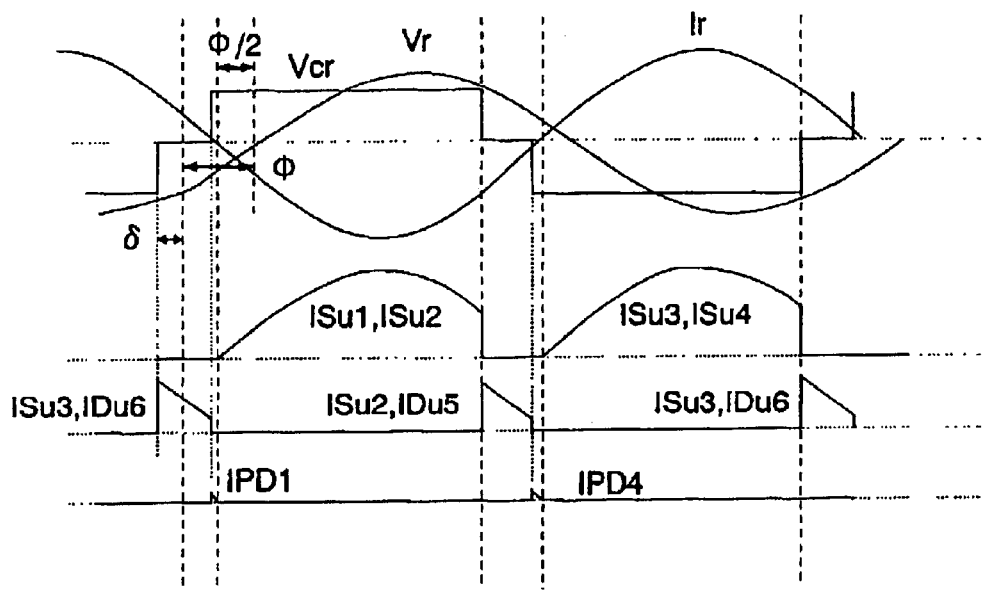
Figure 3:
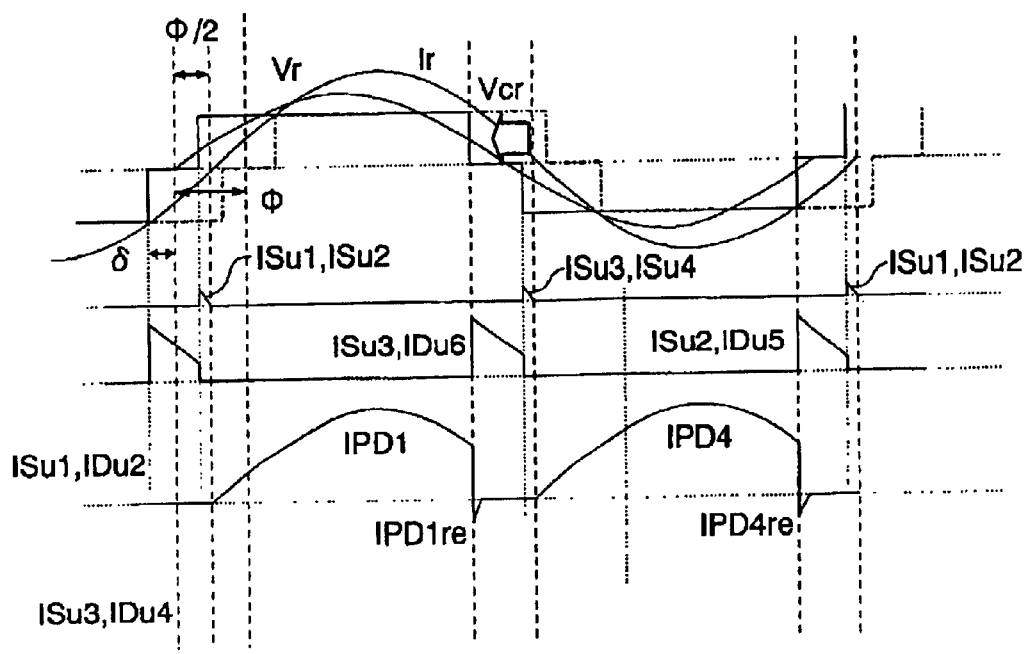

FIG. 31 shows the operational waveforms of various parts in the R phase, in the case where the NPC converter MLC is operated with the pulse pattern of FIG. 30. For convenience in description, the input current Ir is shown as a sine wave and the ripple portion is not shown. FIG. 31 shows the operational waveforms during power running operation; the phase of the fundamental wave of the AC output voltage Vcr of the converter lags the power source voltage Vr by a phase angle ø. Also, input current Ir lags the power source voltage Vr by a phase angle (ø/2). Isu1 to Isu4 represent the currents of the self-turn-off elements Su1 to Su4 of the R phase; IDu1 to IDu4 represent the currents of the high-speed diodes Du1 to Du4; and IPD1, IPD4 represent the currents of the power diodes PD1, PD4 respectively. Their operation at this point is described hereinbelow using FIG. 26.

Current flows through power diode PD4 until input current Ir changes from negative to positive. When, from this condition, the direction of current Ir changes to positive, elements Su3 and Su4 are in an ON condition, so input current Ir becomes able to flow through recovery current suppression reactor La and elements Su3 and Su4. Next, when element Su4 is turned OFF and element Su2 is turned ON, input current Ir flows along the path Ls→La→Su3→Du6→O. Furthermore, when element Su3 is turned OFF and element Su1 is turned ON at phase angle θ1, due to the action of recovery current suppression reactor La, current Ir first of all flows through high-speed diodes Du2, Du1. The forward drop voltage VFPD of power diode PD1 is lower than the forward drop voltage VFD of high-speed diodes Du1, Du2, so, due to this voltage difference, the current flowing in recovery current suppression reactor La gradually becomes smaller, so the input current Ir shifts from high-speed diodes Du2, Du1 to power diode PD1. The commutation time is inversely proportional to the inductance value of recovery current suppression reactor La. By making reactor La a saturable reactor, its inductance value when the current flowing therein is large is decreased, causing the current that was flowing in high-speed diodes Du2, Du1 to shift more rapidly to power diode PD1 and so enabling loss to be reduced. This current flows in power diode PD1 until the polarity of input current Ir is again inverted. After input current Ir is inverted, the same operation as described above is performed between elements Su1, Su2 and high-speed diodes Du3, Du4, Du5 and power diode PD4.

Thus, with this embodiment, since the major part of the input current Ir during power running operation flows in power diodes PD1, PD4, loss is small and a power conversion device of high ability to withstand overloading can be provided.

If the crest value of the input current is Ism, the maximum current Imax that can be interrupted by self-turn-off elements Su1 to Su4 of NPC converter MLC is $$Imax = Ism \times \sin(ø/2 + δ)$$

If for example ø=20° and δ=θ1=10°, $$Imax = 0.342 \times Ism$$

The significance of this is that self-turn-off elements of small capacity in regard to interruption current can be employed, making it possible to provide a power conversion device of low cost.

FIG. 32 shows the operating waveform during regenerative operation. Isu1 to Isu4 represent the currents of the self-turn-off elements Su1 to Su4 of the R phase; IDu1 to IDu6 represent the currents of the high-speed diodes Du1 to Du6; and IPD1, IPD4 represent the current waveforms of the power diodes PD1, PD4 respectively. The fundamental wave of the AC output voltage Vcr of the converter leads the power source voltage Vr by a phase angle ø. Also, input current Ir leads the inverted value −Vr of the power source voltage by a phase angle (ø/2).

When the input current Ir is negative and elements Su1, Su2 are ON (elements Su3, Su4 are OFF), the input current Ir flows through elements Su1, Su2 and recovery current suppression reactor La. Next, when element Su1 is turned OFF and element Su3 is turned ON, current Ir flows along the path Du5→Su2→La→Ls. Furthermore, when element Su2 is turned OFF and element Su4 is turned ON, by the action of recovery current suppression reactor La, current Ir first of all flows through high-speed diodes Du4 and Du3. The forward drop voltage VFPD of power diode PD4 is lower than the forward drop voltage VFD of high-speed diodes Du4, Du3, so, due to this voltage difference, the current flowing in recovery current suppression reactor La gradually becomes smaller, so the input current Ir shifts from high-speed diodes Du4, Du3 to power diode PD4. During regenerative operation, the current flowing in the power diodes is very slight.

When input current Ir is inverted to positive, current flows in elements Su3 and Su4 and element Su4 is turned OFF in the same way as described above, current Ir thereby flows through the path Ls→La→Su3→Du5→O and, furthermore, when element Su3 is turned OFF, first of all the current shifts to high-speed diodes Du2, Du1 and finally the current shifts to power diode PD1. The same applies in respect of the S phase and T phase.

During regenerative operation, if the crest value of the input current is Ism, the maximum current Imax that can be interrupted by self-turn-off elements Su1 to Su4 is $$Imax = Ism \times \sin(ø/2 + δ)$$

If for example ø=20° and δ=10°, $$Imax = 0.342 \times Ism.$$

Thus, most of the input current Ir during regenerative operation flows in the self-turn-off elements Su1 to Su4, but the interruption currents of elements Su1 to Su4 can be made small, making it possible to provide a power conversion device of low cost.

In the case of electric railways, power supply is effected to a plurality of vehicles from a single substation, so typically the load during power running operation is large and the regenerated power is small. For example, the overload withstanding ability in the case of power running operation is required to be 300% of the rated output, but, usually, a 100% rating in respect of regenerated power is satisfactory. The present power conversion device can be applied in such cases where large overloading withstanding ability during power running operation is required.

FIG. 33 shows the transitional operating waveform when shifting from power running operation to regenerative operation; the phase angle ø of the AC output voltage Vcr of the power converter with respect to power source voltage Vr changes from lagging phase to zero. In this condition, the fundamental wave of the AC output voltage Vcr of the NPC converter leads the current Ir by a phase angle of (ø/2).

When the input current Ir is positive, when self-turn-off element Su1 is turned OFF and element Su3 is turned ON, the input current Ir entering power diode PD1 flows along the path Ls→La→Su3→Du6→O. At this point, the accumulated carriers have not been dissipated from power diode PD1, so diode PD1 is in conductive condition, so the voltage Vd1 of DC smoothing capacitor Cd1 is short-circuited by the path Cd1(+)→PD1→La→Su3→Du6→Cd1(−). The current IPD1re which then flows in the opposite direction in diode PD1 is recovery current. Recovery current suppression reactor La suppresses the recovery current IPD1re flowing in the power diode PD1. If this recovery current suppression reactor La is absent, excessive recovery current may flow in power diode PD1; this not only increases loss but also may destroy the diodes and/or the self-turn-off elements. The same applies when the input current Ir is negative, self-turn-off element Su4 is turned OFF and element Su2 is turned ON, causing the input current Ir that was flowing in power diode PD4 to be commutated to the elements Su2, Du5.

By operating NPC converter MLC with a single pulse, the number of times of switching can be minimized and converter efficiency even further increased. Also, the fundamental component of AC side output voltage Vc becomes large and the voltage utilization rate of NPC converter MLC is further improved. Also, since operation is performed with a converter power factor of practically 1, switching is performed once only, in the vicinity of the zero-point of the input current Is; thus, whether during power running operation or during regenerative operation, the interruption current of the self-turn-off elements becomes very small. As a result, a power conversion device of low cost and high efficiency can be provided. This therefore approximates to soft switching in that no large current is interrupted; thus EMI noise is small and a power conversion device can be provided that is environment-friendly.

<Twenty-Fourth Embodiment>

Figure 34:
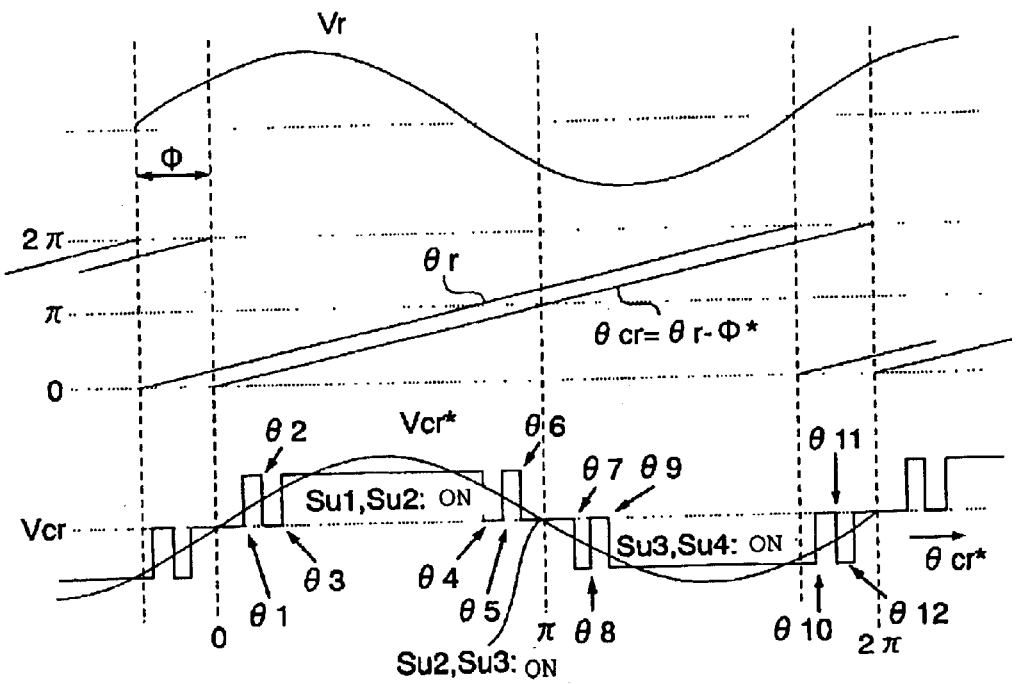
FIG. 34 is a further time chart given in explanation of the phase control action of the power conversion device of FIG. 26.

FIG. 34 shows the operating waveform when 3-pulse output is obtained using a pulse pattern generator PTN1 with an NPC converter: the R phase is depicted. In the Figure, Vr is the R phase power source voltage and θr is the phase signal synchronized with the power source voltage Vr, being a periodic function that changes between 0 and 2π. The new phase signal θcr=θr−ø* is a periodic function that changes between 0 and 2π and is provided by a signal that lags the phase signal θr by ø*. Also, the pulse pattern of the R phase elements Su1 to Su4 with respect to the phase signal θcr is:

In the range
0≦θcr<θ1, gu1=0, gu2=1, gu3=1, g4=0 (Su2, Su3: ON, Su1, Su4: OFF), Vcr=0.
In the range
θ1≦θcr<θ2, gu1=1, gu2=1, gu3=0, g4=0 (Su1, Su2: ON, Su3, Su4: OFF), Vcr=+Vd/2.
In the range
θ2≦θcr<θ3, gu1=0, gu2=1, gu3=1, g4=0 (Su2, Su3: ON, Su1, Su4: OFF), Vcr=0.
In the range
θ3≦θcr<θ4, gu1=1, gu2=1, gu3=0, g4=0 (Su1, Su2: ON, Su3, Su4: OFF), Vcr=+Vd/2.
In the range
θ4≦θcr<θ5, gu1=0, gu2=1, gu3=1, g4=0 (Su2, Su3: ON, Su1, Su4: OFF), Vcr=0.
In the range
θ5≦θcr<θ6, gu1=1, gu2=1, gu3=0, g4=0 (Su1, Su2: ON, Su3, Su4: OFF), Vcr=+Vd/2.
In the range
θ6≦θcr<θ7, gu1=0, gu2=1, gu3=1, g4=0 (Su2, Su3: ON, Su1, Su4: OFF), Vcr=0.
In the range
θ7≦θcr<θ8, gu1=0, gu2=0, gu3=1, g4=1 (Su3, Su4: ON, Su1, Su2: OFF), Vcr=−Vd/2.
In the range
θ8≦θcr<θ9, gu1=0, gu2=1, gu3=1, g4=0 (Su2, Su3: ON, Su1, Su4: OFF), Vcr=0.
In the range
θ9≦θcr<θ10, gu1=0, gu2=0, gu3=1, g4=1 (Su3, Su4: ON, Su1, Su2: OFF), Vcr=−Vd/2.
In the range
θ10≦θcr<θ11, gu1=0, gu2=1, gu3=1, g4=0 (Su2, Su3: ON, Su1, Su4: OFF), Vcr=0.
In the range
θ11≦θcr<θ12, gu1=0, gu2=0, gu3=1, g4=1 (Su3, Su4: ON, Su1, Su2: OFF), Vcr=−Vd/2.
In the range
θ12≦θcr<2, gu1=0, gu2=1, gu3=1, g4=0 (Su2, Su3: ON, Su1, Su4: OFF), Vcr=0.

In this way, a three-level output voltage is obtained.

The phase of the fundamental wave Vcr* of the output voltage Vcr lags the power source voltage Vr by a phase angle ø. The S phase and T phase are supplied in the same way. In this case also, if the pulse pattern is fixed and the DC voltage Vd is fixed, the crest value of the fundamental of the AC output voltage of the NPC converter MLC is fixed.

Figure 35:
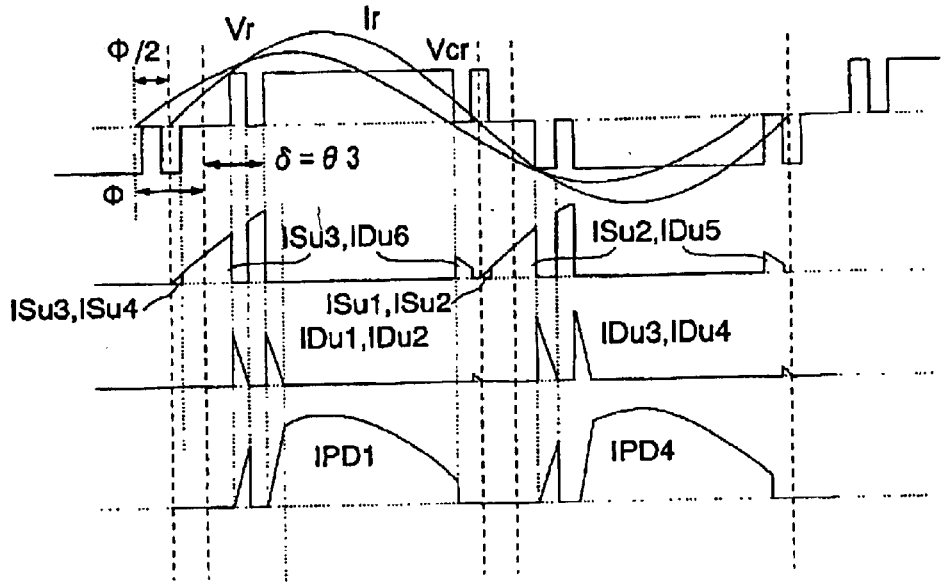
FIG. 35 is an operating waveform diagram of the various parts given in explanation of a further control action during power running operation of the power conversion device of FIG. 26.

FIG. 35 shows the operational waveforms of various parts in the R phase, in the case where the NPC converter MLC is operated with the pulse pattern of FIG. 34. For convenience in description, the input current Ir is shown as a sine wave and the ripple portion is not shown. FIG. 35 shows the operational waveforms during power running operation; the phase of the fundamental wave of the AC output voltage Vcr of the converter lags the power source voltage Vs by a phase angle ø. Also, input current Is lags the power source voltage Vs by a phase angle (ø/2). Isu1 to Isu4 represent the currents of the self-turn-off elements Su1 to Su4 of the R phase; IDu1 to IDu4 represent the currents of the high-speed diodes Du1 to Du6; and IPD1, IPD4 represent the currents of the power diodes PD1, PD4 respectively. Their operation at this point is described hereinbelow.

Current flows through power diode PD4 until input current Ir changes from negative to positive. When, from this condition, the direction of current Ir changes to positive, elements Su3 and Su4 are in an ON condition, so currents Isu3, Isu4 flow. Next, when element Su4 is turned OFF and element Su2 is turned ON, input current Ir flows along the path Ls→La→Su3→Du6. Furthermore, when element Su3 is turned OFF and element Su1 is turned ON, due to the action of recovery current suppression reactor La, current Ir first of all flows through high-speed diodes Du2, Du1. The forward drop voltage VFPD of power diode PD1 is lower than the forward drop voltage VFD of high-speed diodes Du1, Du2, so, due to this voltage difference (potential difference), the current flowing in recovery current suppression reactor La gradually becomes smaller, so the input current Ir shifts from high-speed diodes Du2, Du1 to power diode PD1. The commutation time is inversely proportional to the inductance value of recovery current suppression reactor La. By making reactor La a saturable reactor, its inductance value when the current flowing therein is large is decreased, causing the current that was flowing in the high-speed diodes to shift more rapidly to the power diode and so enabling loss to be reduced.

When element Su1 is again turned OFF and element Su3 is turned ON, the input current Ir flows through the path Ls→La→Su3→Du6 and the current of power diode PD1 and high-speed diodes Du2, Du1 becomes zero. Furthermore, at the phase θ3 of FIG. 34, when element Su3 is turned OFF, in the same way as described above, first of all, current flows in the high-speed diodes Du2, Du1, the current then shifts to power diode PD1 and this current flows in power diode PD1 until the input current Ir is again inverted.

After the input current Ir is inverted, the same operation as described above is performed between elements Su1, Su2 and high-speed diodes Du3, Du4, Du5 and power diode PD4.

FIG. 34 shows the case where a 3-pulse pulse pattern is adopted. If the crest value of the input current is Ism, the maximum current Imax that can be interrupted by self-turn-off elements Su1 to Su4 is $$Imax = Ism \times \sin(\emptyset/2 + \delta)$$

In the case of the pattern of FIG. 34, $\delta = \theta 3$. If we take for example $\emptyset = 20°$ and $\theta 3 = 20°$, $$Imax = 0.5 \times Ism$$

By increasing the number of pulses, harmonic components of the input current Ir can be decreased and current pulsation reduced, but, on the other hand, there is the drawback that the maximum value of the interruption current of the self-turn-off elements increases. As will be described later, it is desirable to decrease the input current harmonics and perform operation with a number of pulses that it is as low as possible, by employing multiple power converters etc.

If the NPC converter MLC is controlled with a fixed pulse pattern, a switching pattern may be determined such that the harmonic components of input current Is are minimized, but since, as described above, operation is performed with a converter power factor close to 1, switching is performed in the vicinity of the zero-point of the current Is, and the interruption current of the self-turn-off elements constituting NPC converter MLC can be kept small.

Thus, with the power conversion device of the present invention, most of the current during power running flows through power diodes PD1, PD4 whose ON voltage is small; thus, the current flowing in high-speed diodes Du1 to Du6 is very slight, making it possible to achieve a conversion device of high efficiency. Also, the interruption current of self-turn-off elements Su1 to Su4 can be made small, making it possible to achieve a considerable reduction in the overall cost of the device.

<Twenty-Fifth Embodiment>

Figure 36:
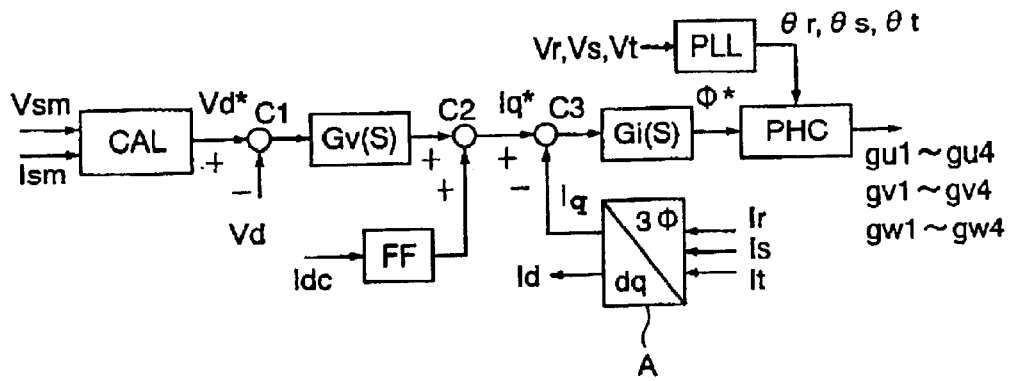
FIG. 36 is yet a further time chart given in explanation of the phase control action of the power conversion device of FIG. 26.

FIG. 36 shows a further embodiment of a control device of the power conversion device of the present invention. In this embodiment, the voltage instruction value Vd* in the control device of FIG. 27 is changed in accordance with the crest value Vsm of the power source voltage or the crest value Ism of the input current, by a calculating circuit CAL. In one embodiment, calculating circuit CAL supplies a DC voltage instruction value Vd* proportional to the power source voltage crest value Vsm.

The control device of FIG. 36 comprises calculating circuit CAL, comparators C1, C3, adder C2, voltage control compensation circuit Gv(S), current control compensation circuit Gi(S), feed forward compensator FF, co-ordinate conversion circuit A, power source synchronization phase detection circuit PLL and phase control circuit PHC.

Figures 37A, 37B, 37C:
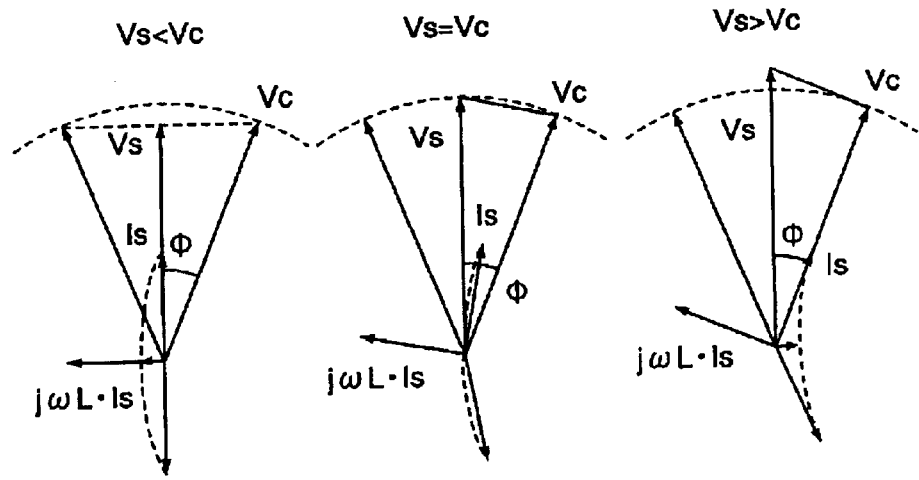
FIG. 37A, FIG. 37B and FIG. 37C are AC side voltage/current vector diagrams given in explanation of the action of a power conversion device according to the present invention.

FIG. 37A, FIG. 37B and FIG. 37C show voltage/current vector diagrams of the AC power source side when the amplitude value of the power source voltage Vs fluctuates with the DC voltage Vd controlled to be constant. At Vs=Vc, the phase angle $\emptyset = 0$ and the input current Is is zero. In contrast, if Vs<Vc, a leading current flows when $\emptyset = 0$. Contrariwise, when Vs>Vc, a lagging current flows when $\emptyset = 0$. When the power source voltage Vs fluctuates, the crest value of the fundamental of the converter output voltage Vc can always be matched with the crest value of the power source voltage Vs by adjusting the DC voltage Vd so as to match this. In this way, ineffective reactive current can be prevented from being abstracted from the power source when the phase angle $\emptyset = 0$.

<Twenty-Sixth Embodiment>

In the control device of FIG. 36 it will be assumed that the calculating circuit CAL supplies the DC voltage instruction value Vd*:

$$Vd^* = k \cdot \sqrt{\{Vsm^2 + (\omega Ls \cdot Ism)^2\}}$$

where Vsm is the power source voltage crest value, $\omega$ is the power source angular frequency, Ls is the inductance value of the AC reactor Ls, and Ism is the crest value of the input current Is.

In this control system, the DC voltage instruction value Vd* is not only changed by the magnitude of the power source voltage Vs but Vd* is also adjusted in a manner related to the input current crest value Ism.

Figure 38:
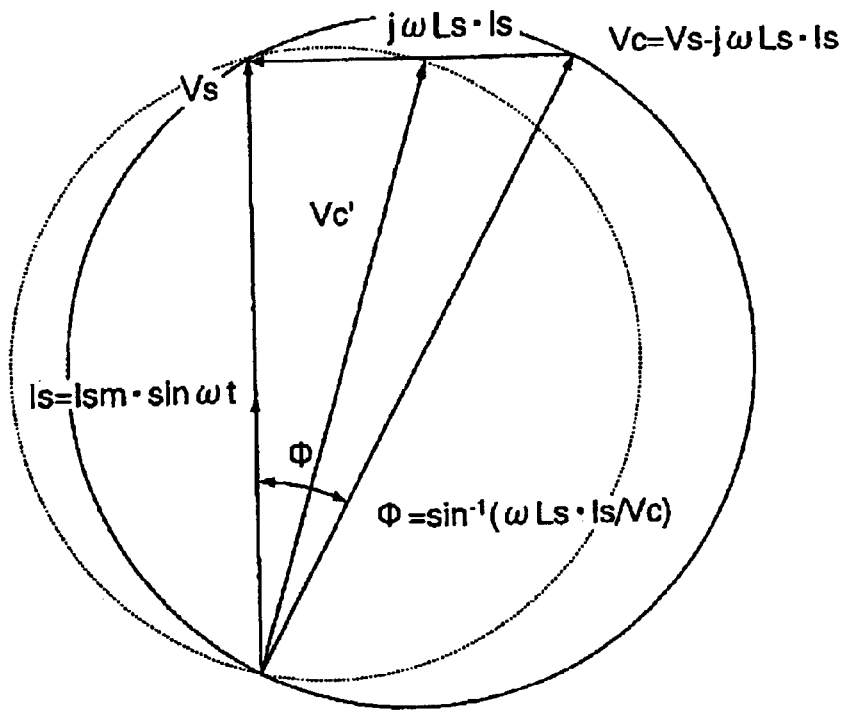
FIG. 38 is an AC side voltage/current vector diagram given in explanation of the control action of the power conversion device according to the present invention.

FIG. 38 shows a voltage/current vector diagram of the AC side at this point; the converter output voltage is maintained in the relationship:

$$Vc^* = \sqrt{\{Vs^2 + (\omega Ls \cdot Is)^2\}}$$

As a result, the power source voltage vector Vs and the applied voltage(=j$\omega$Ls·Is) of the AC reactor Ls are always kept in an orthogonal relationship, the input current Is is in phase (or anti-phase) with the power source voltage Vs, and the input power factor=1.

Figure 39:
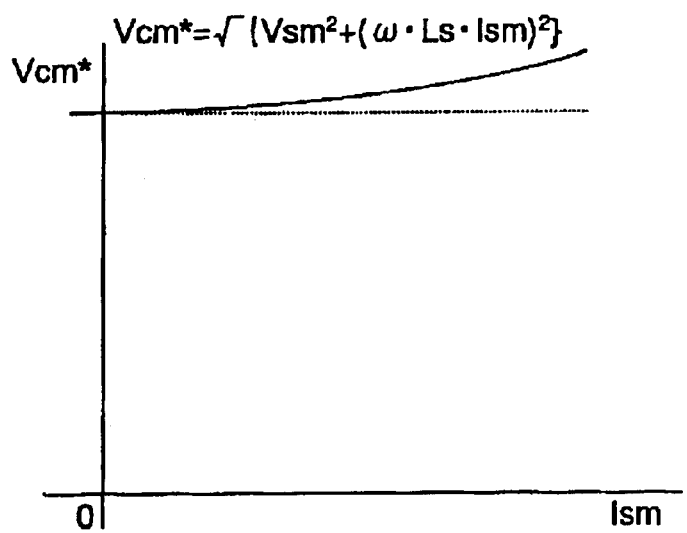
FIG. 39 is a characteristic given in explanation of the control action of the power conversion device according to the present invention.

FIG. 39 shows the relationship of the DC voltage instruction value Vd* with respect to the input current crest value Ism; it can be seen that the DC voltage instruction value Vd* is increased with increase in the current Ism.

<Twenty-Seventh Embodiment>

In the control circuit of FIG. 36 it will be assumed that the calculating circuit CAL supplies the DC voltage instruction value Vd*:

$$Vd^* = k \cdot \sqrt{\{Vsm^2 - (\omega Ls \cdot Ism)^2\}}$$

where Vsm is the power source voltage crest value, $\omega$ is the power source angular frequency, Ls is the inductance value of the AC reactor, and Ism is the crest value of the input current.

In this control system, the DC voltage instruction value Vd* is not only changed by the magnitude of the power source voltage Vs but Vd* is also adjusted in a manner related to the input current crest value Ism.

Figure 40:
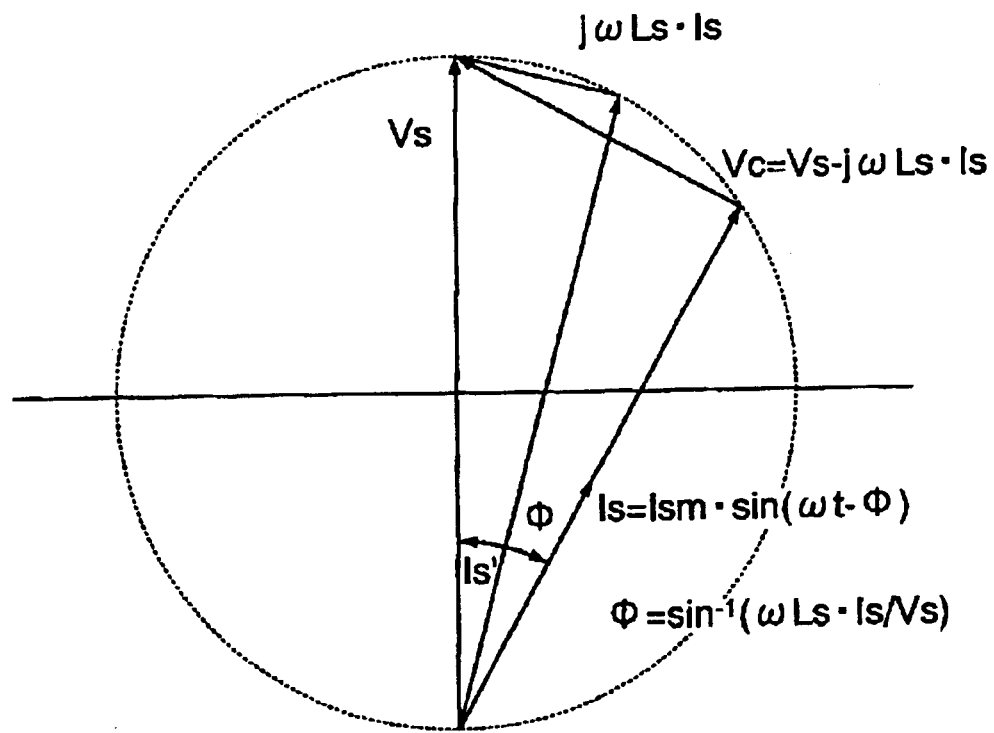
FIG. 40 is an AC side voltage/current vector diagram given in explanation of a further control action of the power conversion device according to the present invention.

FIG. 40 shows a voltage/current vector diagram of the AC side at this point; the converter output voltage maintains the relationship:

$$Vc^* = \sqrt{\{Vs^2 - (\omega Ls \cdot Is)^2\}}$$

As a result, the converter output voltage vector Vc and the applied voltage(=j$\omega$Ls·Is) of the AC reactor Ls are always kept in an orthogonal relationship, the input current Is is in phase (or anti-phase) with the converter output voltage Vc, and the converter power factor=1.

Figure 41:
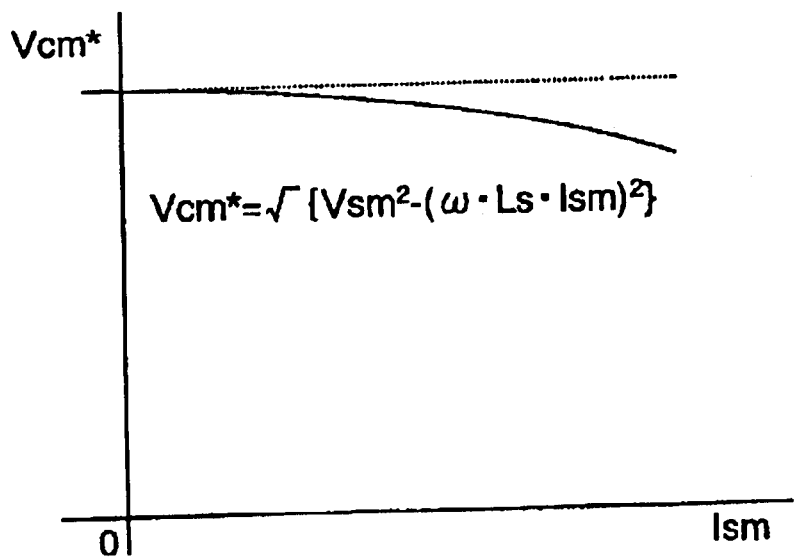
FIG. 41 is a characteristic given in explanation of a further control action of the power conversion device according to the present invention.

FIG. 41 shows the relationship of the DC voltage instruction value Vd* with respect to the input current crest value Ism; it shows that the DC voltage instruction value Vd* decreases with increase in the current Ism.

Figure 42:
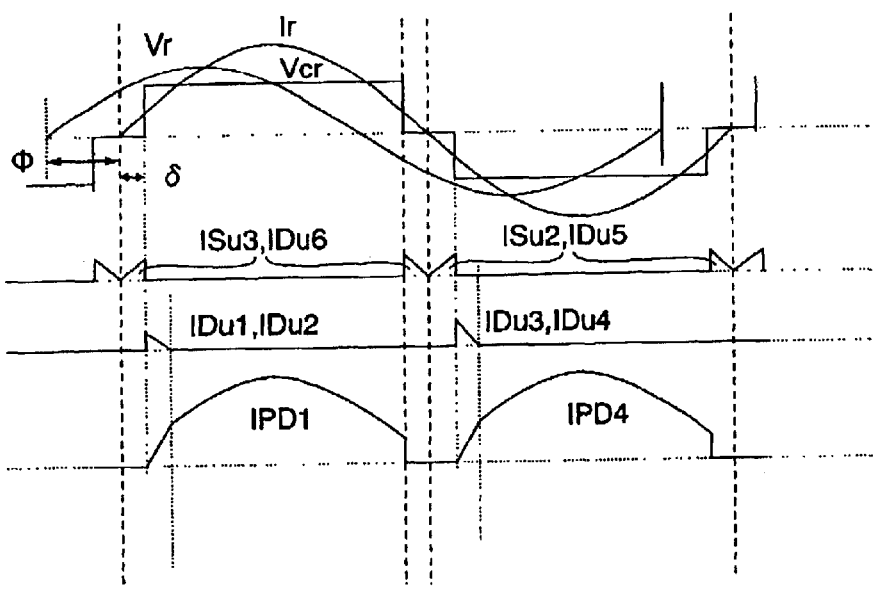
FIG. 42 is an operational waveform diagram given in explanation of a further control action of the power conversion device according to the present invention.

FIG. 42 shows the operating waveform when operation is conducted with the converter power factor at 1 in single pulse mode. This is shown for the R phase; for convenience in description, the input current Ir is depicted as a sine wave and the ripple component is omitted. In the Figure, Isu1 to Isu4 represent the currents of the self-turn-off elements Su1, Su4 of the R phase; IDu1 to IDu6 represent the currents of the high-speed diodes Du1 to Du6; and IPD1, IPD4 represent the current waveforms of the power diodes PD1, PD4 respectively.

FIG. 42 shows the waveform during power running operation; the fundamental wave of the AC output voltage Vcr of the converter lags the power source voltage Vs by a phase angle ø. The input current Ir is in phase with the AC output voltage Vcr of the converter and lags the power source voltage Vr with a phase angle ø.

If the crest value of the input current Ir is Ism, the maximum current Imax that can be interrupted by self-turn-off elements Su1 to Su4 is, if ø=0°, $$I\max = Ism \times \sin(\delta)$$

With a single-pulse pattern, $\delta = \theta 1$. If for example $\theta 1 = 10°$, $$I\max = 0.1736 \times Ism$$

The same applies in the case of regenerative operation. That is, by operating with a converter power factor=1, the interruption current of the self-turn-off elements that constitute the NPC converter can be made very small, and it thus becomes possible to greatly reduce the cost of the converter.

<Twenty-Eighth Embodiment>

Figure 43:
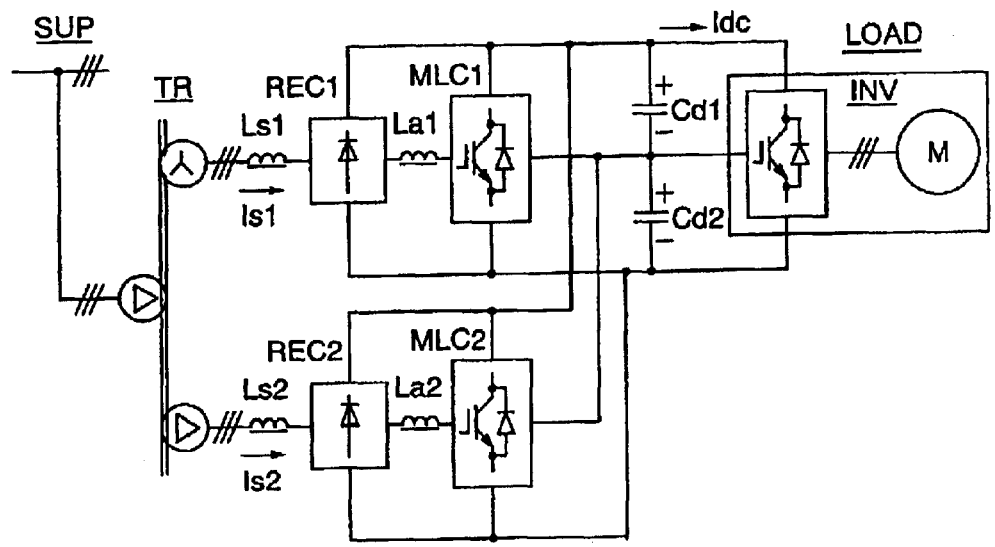
FIG. 43 is a main circuit layout diagram illustrating a further embodiment of the power conversion device according to the present invention.

FIG. 43 shows a further embodiment of the power conversion device of the present invention. In this embodiment, two power conversion devices each consisting of a combination of power diode rectifier REC and multi-level output self-commutated power converters MLC are provided, the arrangement being such that parallel multiple operation on the AC side of the power conversion device is performed and parallel connection is effected on the DC side, using a three-phase transformer TR having two sets of secondary windings that supply voltages having a mutual phase difference of 30°. Whether the diode rectifiers REC, multi-level output self-commutated power converters MLC, AC reactors Ls and recovery current suppression reactors La described in FIG. 26 belong to the first or second group is indicated by adding 1 or 2 respectively as a suffix thereto. The transformers TR interposed between the AC power source terminals R, S, T and AC reactors LS1, LS2 comprise two sets of secondary windings, one of these sets of secondary windings being a triangular connection (Δ connection) while the other set is a star connection (Y connection), a phase difference of 30° being provided in the output voltages of these two. The one secondary winding of transformer TR supplies the power conversion device of the first group and the other secondary winding thereof supplies the power conversion device of the second group. Both power converters MLC1, MLC2 are connected in parallel on the DC side, their DC terminals being connected with common DC smoothing capacitors Cd1, Cd2 and load device LOAD. Load device LOAD represents inverter INV and AC motor M.

Figure 44:
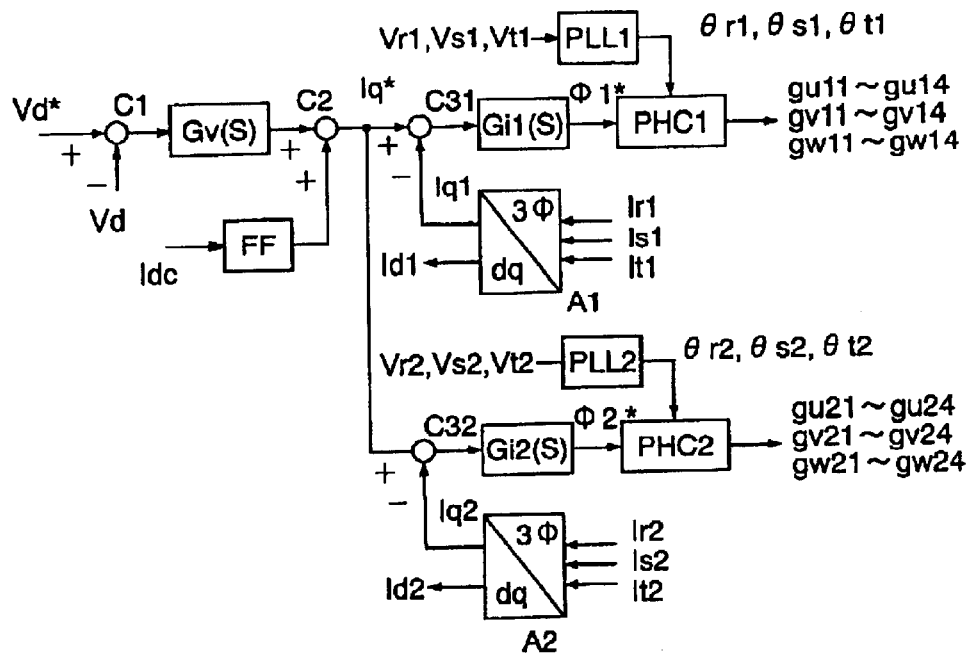
FIG. 44 is a layout diagram illustrating an embodiment of a control circuit of the power conversion device of FIG. 43.

FIG. 44 shows an embodiment of a control device for controlling the power conversion device of FIG. 44; this is employed in common for the two groups up to the point where the active current instruction value Iq* is created; after this point, it is divided into two groups. Just as in the case of FIG. 27, structural elements of each group distinguished by the addition of suffix symbols 1 or 2 for the elements of the first group and the second group. Finally, the control device of the first group outputs gate signals gu11 to gu14, gv11 to gv14 and gw11 to gw14 for the self-turn-off elements of first power converter MLC1 while the control device of the second group outputs gate signals gu21 to gu24, gv21 to gv24 and gw21 to gw24 for the self-turn-off elements of second power converter MLC2.

Voltages Vd1 and Vd2 of the DC smoothing capacitors Cd1, Cd2 are detected and the total voltage Vd(=Vd1+Vd2) thereof is input to comparator C1. Comparator C1 compares the voltage instruction value Vd* and the voltage detection value Vd and the deviation εv thereof is subjected to integration or proportional amplification by the voltage control compensation circuit Gv(S) and the output value of this is input to the first input terminal of adder C2. In addition, the DC current I dc consumed by the load LOAD is detected and input to the second input terminal of adder C2 through feed forward compensator FF. The output Iq* of adder C2 is the common instruction value of the current supplied from power source SUP. The subsequent signal processing for each group is as described with reference to FIG. 27.

Although the input currents (secondary currents of transformers TR) Ir1 and Ir2 of for example the R phase of the two sets of power conversion device are independently controlled, since the instruction values Iq* of these two are the same, they are controlled to practically the same values. As a result, the harmonics of the primary currents of the transformers TR cancel each other out, so operation with little ripple can be achieved. If parallel multiple operation is performed with a combination of three or more sets of power conversion devices, the primary current ripple of the transformers TR can be further reduced.

With the present device, increased capacity of the conversion device and reduction of the harmonic components of the input current Is that is supplied from the AC power source can be achieved; in this way, a large capacity power conversion device can be provided which is of high efficiency and low cost and which has excellent ability to withstand overloading and which is capable of power regeneration.

As the multi-level output converter, the example was described above of a three-level output power converter (NPC converter); however, a combination of a four-level or more output power converter and power diodes could of course be implemented in the same way as described above.

Figure 45:
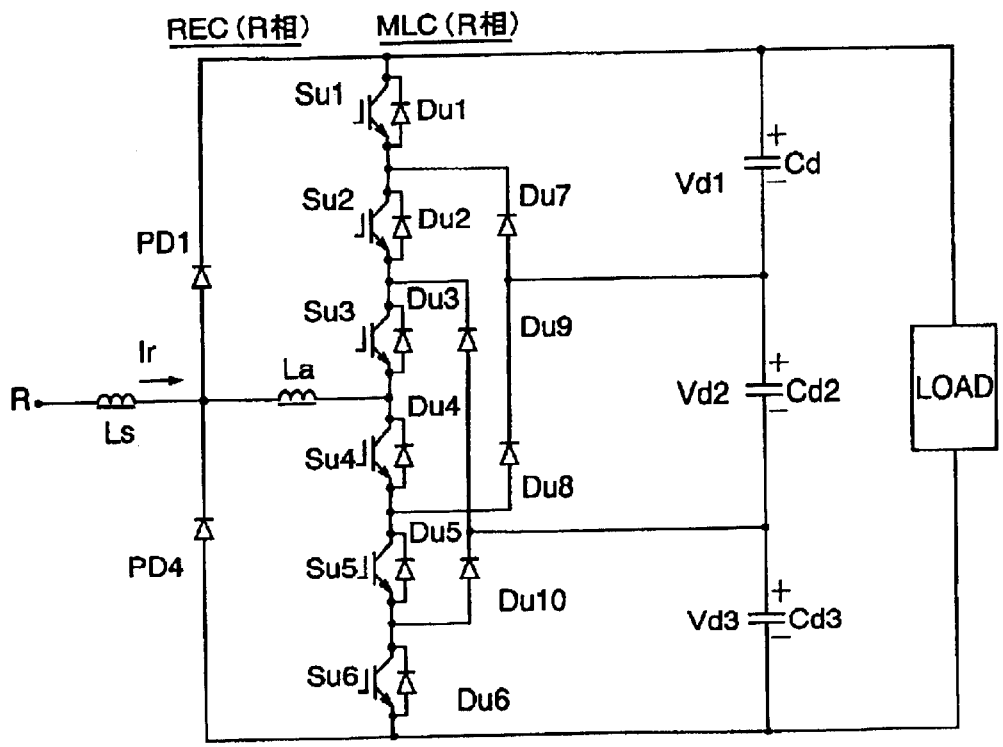
FIG. 45 is a main circuit layout diagram illustrating yet a further embodiment of the power conversion device according to the present invention.

FIG. 45 illustrates an embodiment of a power conversion device constituting a combination of a four-level output self-commutated power converter and power diode rectifier. A single phase (R phase) is illustrated. In this Figure, R is an R phase incoming terminal of the AC power source, Ls is an AC reactor, La is a recovery current suppression reactor, REC (R phase) is a power diode rectifier comprising power diodes PD1 and PD4 and MLC (R phase) is a four-level output self-commutated converter. This four-level output self-commutated converter MLC (R phase) comprises self-turn-off elements Su1 to Su6, high-speed diodes Du1 to Du6 connected in anti-parallel with these, clamping high-speed diodes Du7 to Du10 and three series-connected DC smoothing capacitors Cd1 to Cd3. Load LOAD is connected with both terminals of the DC smoothing capacitors Cd1 to Cd3. The positive and negative arms of the converter respectively comprise three elements; clamping diodes Du7, Du8 are series-connected between the connection point of elements Su1, Su2 and the connection point of elements Su4, Su5 and clamping diodes Du9 and Du10 are series-connected between the connection point of elements Su2, Su3 and the connection point of elements Su5, Su6. The connection point of clamping diodes Du7, Du8 is connected with the connection point of DC smoothing capacitors Cd1, Cd2 and the connection point of clamping diodes Du9, Du10 is connected with the connection point of DC smoothing capacitors Cd2, Cd3.

The operation of the four-level output self-commutated converter MLC (R phase) is as follows. In more detail, it will be assumed that the respective voltages applied to the DC smoothing capacitors Cd1 to Cd3 are Vd1 to Vd3 and, in respect of the total voltage Vd=Vd1+Vd2+Vd3, Vd1=Vd2=Vd3=Vd/3 is maintained.

Three in each case of the self-turn-off elements Su1 to Su6 are made to conduct. Specifically, when elements Su1 to Su3 are ON, the AC side output voltage of the converter is Vcr=+(½) Vd with respect to the virtual mid-point potential; when elements Su2 to Su4 are ON, the AC side output voltage of the converter is Vcr=+(⅙) Vd; when elements Su3 to Su5 are ON, the AC side output voltage of the converter is Vcr=−(⅙) Vd; and when elements Su4 to Su6 are ON, the AC side output voltage of the converter is Vcr=−(½) Vd. In this way, four-level output voltage Vcr is obtained.

When the input current Ir is flowing in the direction of the arrows in the Figure, for example when elements Su2 to Su4 are ON, current Ir flows through the path→Ls→La→Su4→Du8. When, at this point, it element Su4 is turned OFF and Su1 is turned ON, due to the action of recovery current suppression reactor La, first of all, current flows through high-speed diodes Du3→Du2→Du1. However, since the forward voltage drop of VPDF of power diode PD1 is smaller than the forward voltage drop VFD of the high-speed diodes, due to this voltage difference, current Ir shifts to power diode PD1. If, from this condition, element Su1 is turned OFF and element Su4 is turned ON, current Ir flows through the path R→Ls→La→Su4→Du8. Furthermore, when, from this condition, element Su2 is turned OFF and element Su5 is turned on, current Ir flows through the path R→Ls→La→Su4→Su5→Du10. At this point, current cannot flow into the power diode. When, from this condition, element Su3 is turned OFF and element Su6 is turned ON, the current Ir flows through the path R→Ls→La→Su4→Su5→Su6.

Likewise, when input current Ir flows in the opposite direction to the arrows in the drawing, for example when elements Su3 to Su5 are turned ON, current Ir flows through the path Du9→Su3→La→Ls→R. When, at this point, element Su3 is turned OFF and element Su6 is turned on, due to the action of recovery current suppression reactor La, current Ir first of all flows through high-speed diodes Du6→Du5→Du4→La, but, since the forward voltage drop VPDF of power diode PD1 is smaller than the forward voltage drop VFD of high-speed diodes Du6, Du5 and Du4, due to this voltage difference, the current Ir shifts to power diode PD4. If, from this condition, element Su6 is turned OFF, and element Su3 is turned ON, current Ir again flows through the path Du9→Su3→La→Ls→R. Furthermore, when, from this condition, element Su5 is turned OFF and element Su2 is turned ON, current Ir flows through the path Du7→Su2→Su3→La→Ls→R. At this point, current cannot flow to the power diode. When, from this condition, element Su4 is turned OFF and element Su1 is turned ON, current Ir flows through the path Su1→Su2→Su3→La→Ls→R.

By increasing the number of output levels of self-commutated power converter MLC, the harmonics of the input current can be decreased with a smaller number of pulses. Also, since the current interruption capacity of the self-turn-off elements that make up the multi-level output self-commutated power converter MLC can be made smaller, a more economical power conversion device can be provided. Also, since, during power running operation, most of the current flows through the power diodes, a power conversion device can be provided which is of high efficiency and excellent ability to withstand overloading.

<Twenty-Ninth Embodiment>

In this embodiment, in the power conversion device of the twenty-eighth embodiment, n multi-level output self-commutated power converters MLC1 to MLCn are operated with a fixed pulse pattern, the AC input current Is is controlled by adjusting the phase angle ø with respect to the AC power source voltage Vs and the voltage Vd of the DC smoothing capacitors Cd1 to Cd3 is thereby controlled. The multi-level output self-commutated power converters MLC1 to MLCn are operated with a fixed pulse pattern and switching is performed synchronized with the AC power source voltage Vs. If the DC voltage Vd is fixed, the amplitude values of the AC output voltages Vc1 to Vcn of the multi-level output self-commutated power converters MLC1 to MLCn are constant. In this condition, the input current Is can be adjusted by changing the voltage applied to the AC reactors Ls1 to Lsn by changing the phase angle ø of the output voltages Vc1 to Vcn with respect to the power source voltage Vs. The active power Ps supplied from the AC power source is increased by increasing the phase angle ø of the output voltages Vc1 to Vcn of the converters in the lagging direction with respect to power source voltage Vs. Contrariwise, if the phase angle ø is increased in the leading direction, active power Ps is regenerated to the AC power source.

If the multi-level output, self-commutated power converters MLC1 to MLCn are controlled with a fixed pulse pattern, the switching pattern may be determined so as to minimize the harmonic components of the input current Is but, since the converter power factors are close to 1, switching is performed in the vicinity of the zero point of current Is, so the interruption currents of the self-turn-off elements constituting the multi-level output self-commutated converters MLC1 to MLCn can be small. In this way, the harmonic components of the input current Is can be made small and a power conversion device can be provided which is of low cost, high power factor and high efficiency and which is capable of power regeneration.

<Thirtieth Embodiment>

In this embodiment, in the power conversion device of the twenty-eighth embodiment, n multi-level output self-commutated power converters MLC1 to MLCn are operated in single-pulse mode synchronized with the frequency of the AC power source SUP, the AC input current Is is controlled by adjusting the phase angle ø with respect to the AC power source voltage Vs and the voltage Vd of the DC smoothing capacitors Cd1 to Cd3 is thereby controlled.

By operating the multi-level output self-commutated power converters MLC1 to MLCn in single pulse mode, switching losses are reduced and the voltage utilization rate of the self-commutated converters can be improved. Also, since switching of the self-commutated converters is performed in the vicinity of the zero point of the input current Is, the interruption current of the self-turn-off elements can be made small. In this way, a power conversion device which is of high efficiency and large capacity but low cost and of excellent ability to withstand overloading can be provided.

<Thirty-First Embodiment>

Figure 46:
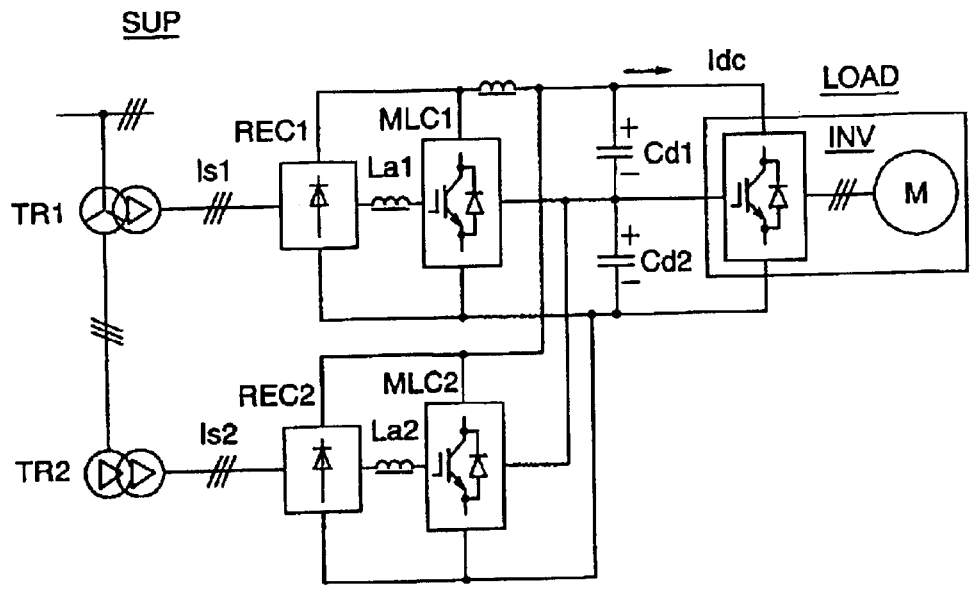
FIG. 46 is a main circuit layout diagram illustrating yet a further embodiment of the power conversion device according to the present invention.

FIG. 46 illustrates yet a further embodiment of a device according to the present invention. A characteristic feature of this embodiment is that a construction is adopted wherein DC multiple operation is performed by connecting the primary windings of two transformers TR1, TR2 in series. Other particulars of the construction are the same as in the case of FIG. 33. In this case, AC reactors Ls1, Ls2 can be dispensed with by utilizing the leakage inductance of the two transformers. Of course, this is in principle the same as if independent AC reactors were provided.

Figure 47:
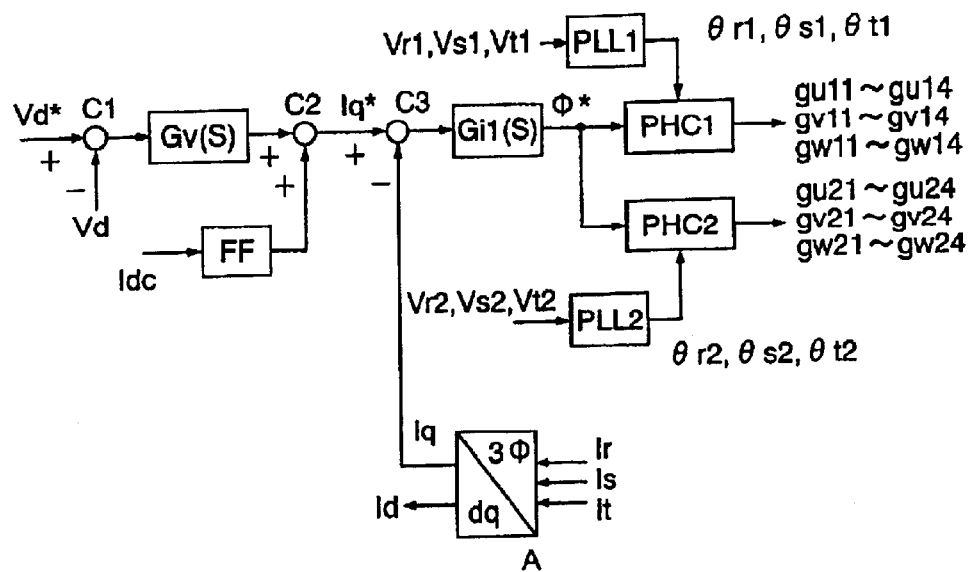
FIG. 47 is a layout diagram of an embodiment of a control circuit of the power conversion device of FIG. 46.

FIG. 47 shows an embodiment of the control device of the device of FIG. 46. In this control device, the two converters MLC1 and MLC2 are provided in common from comparator C1 up to current control compensation circuit Gi(S), but, after generation of phase angle instruction value ø*, the gate signals gu11 to gu14, gv11 to gv14 and gw11 to gw14 and gate signals gu21 to gu24, gv21 to gv24 and gw21 to gw24 are separately generated by separate phase control circuits PHC1 and PHC2.

With the three-level output self-commutated power converters MLC1, MLC2, input currents Ir, Is and It are controlled by controlling the phase angle ø with respect to the power source voltage with a fixed pulse pattern (single pulse, 3-pulse, or 5-pulse etc) synchronized with the power source voltage. Since, in this device, two transformers TR1 and TR2 are connected in series on their primary sides, the input currents of the two power conversion devices (REC1+MLC1 and REC2+MLC2) are the same, so current with little harmonics is produced.

While a three-level output power converter (NPC converter) has been described above as an example of a multi-level output converter, the same action and benefits could be obtained by combination of power converters and power diodes to provide four or more level output. Also, while an example was illustrated in which two power conversion devices (power diode rectifier REC+multi-level output power converter MLC) were employed, series multiple operation could be achieved on the primary side by using three or more power conversion devices.

This embodiment makes it possible to increase the capacity of the conversion device and to lower the amount of harmonic components of the input current Is that is supplied from the AC power source. In particular, thanks to the series multiple operation, the advantages are obtained that the harmonic components of the AC side input current flowing to the converters can be reduced and the number of control pulses of the self-commutated power converters MLC1 to MLCn can be reduced. Also, the AC reactors which were conventionally necessary can be dispensed with by making use of the leakage inductance of the three-phase transformers. In this way, a large capacity power conversion device can be provided which is of high efficiency and low cost and capable of power regeneration and of excellent ability to withstand overloading.

<Thirty-Second Embodiment>

A characteristic feature of this embodiment is that, in the power conversion device of the thirty-first embodiment, n multi-level output self-commutated power converters MLC1 to MLCn are operated with a fixed pulse pattern, the AC input current Is is controlled by adjusting the phase angle ø with respect to the AC power source voltage Vs and the voltages Vd1 to Vdn of the DC smoothing capacitors Cd1 to Cdn are thereby controlled.

The multi-level output self-commutated power converters MLC1 to MLCn perform switching with a fixed pulse pattern synchronized with the AC power source voltage Vs. If the DC voltage Vd is fixed, the amplitude values of the AC output voltages Vc1 to Vcn of the self-commutated converters MLC1 to MLCn are fixed. In this condition, by changing the phase angle ø of the output voltages Vc1 to Vcn with respect to the power source voltage Vs, the voltage applied to the AC reactors Ls1 to Lsn is changed, and the input currents of the multi-level output self-commutated power converters MLC1 to MLCn can thereby be adjusted. If the self-commutating converters MLC1 to MLCn are controlled with a fixed pulse pattern, a switching pattern may be determined such that the harmonic components of input current Is are minimized, but by performing operation with a converter power factor close to 1, switching is performed in the vicinity of the zero-point of the current Is, and the interruption current of the self-turn-off elements constituting self-commutating converters MLC1 to MLCn can be kept small.

The active power Ps supplied from the AC power source is increased by increasing the phase angle ø of output voltages Vc1 to Vcn of the converters with respect to the power source voltage Vs in the lagging direction. Contrariwise, if the phase angle ø is increased in the leading direction, active power Ps is regenerated to the AC power source. The input current Is of the self-commutated converters MLC1 to MLCn is controlled so as to make the voltages Vd1 to Vdn of the DC smoothing capacitors Cd1 to Cdn practically fixed. In this way, a power conversion device can be provided which is of high power factor and high efficiency and low cost and in which power regeneration is possible and wherein the harmonic components of the input current Is can be made small.

<Thirty-Third Embodiment>

A characteristic feature of this embodiment, in the power conversion device of the thirty-first embodiment, is that n multi-level output self-commutated power converters MLC1 to MLCn are operated in single-pulse mode synchronized with the frequency of the AC power source SUP and their AC input currents are controlled by adjusting the phase angle ø with respect to the AC power source voltage Vs, thereby controlling the total voltage Vd applied to the DC smoothing capacitors Cd1 to Cdn.

The multi-level output self-commutated power converters MLC1 to MLCn are operated with a fixed pulse pattern, but the number of pulses is made a single pulse. Of course, if the DC voltage Vd is fixed, the amplitude values of the AC side output voltages Vc1 to Vcn of the multi-level output self-commutated power converters MLC1 to MLCn are fixed. The input current Is is controlled by adjusting the phase angle ø of the total voltage of the AC side output voltages Vc1 to Vcn of the multi-level output self-commutated power converters MLC1 to MLCn with respect to the power source voltage Vs, but in order to make Is=0 when phase angle ø=0, it is necessary that the crest value of the power source voltage Vs and the fundamental crest value of the total voltage of the converter output voltages Vc1 to Vcn should be made the same. Since the DC voltage Vd is determined by demand etc on the load side, the secondary side voltage of the three-phase transformers TR1 to TRn is matched in value so as to be for same as the fundamental component of the AC side output voltages Vc1 to Vcn of the multi-level output self-commutated power converters MLC1 to MLCn.

By operating multi-level output self-commutated power converters MLC1 to MLCn with a single pulse, the number of times of switching can be minimized and converter efficiency even further increased. Also, the fundamental component of AC side output voltages Vc1 to Vcn becomes large and the voltage utilization rate of multi-level output self-commutated converters MLC1 to MLCn is improved. Also, since operation is performed with a converter power factor of practically 1, switching is performed once only, in the vicinity of the zero-point of the input current Is; thus, whether during power running operation or during regenerative operation, the interruption current of the self-turn-off elements becomes very small. As a result, a power conversion device of low cost and high efficiency can be provided. This therefore approximates to soft switching in that no large current is interrupted; thus EMI noise is small and a power conversion device can be provided that is environment-friendly.

<Thirty-Fourth Embodiment>
<Seventeenth Embodiment>

In the power conversion device of the twenty-eighth to thirty-third embodiments, the present embodiment comprises a saturable reactor wherein the recovery current suppression reactors La1 to Lan are saturated.

In the multi-level output self-commutated power converters MLC1 to MLCn, each arm is constituted by a self-turn-off element and a high-speed diode connected in anti-parallel therewith and a clamping high-speed diode; for example when current flows in the any self-turn-off element and this element is turned OFF, the current first of all shifts to the corresponding high-speed diode. Since the forward voltage drop of the high-speed diode is larger than that of the power diode, this current gradually shifts to the corresponding power diode of power diode rectifiers REC1 to RECn. This commutation time is inversely proportional to the inductance value of recovery current suppression reactors La1 to Lan. By making these La1 to La saturable reactors, the inductance value thereof becomes small when the current flowing therein is large, with the result that the current that was flowing in the high-speed diodes shifts more rapidly to the power diodes, decreasing converter losses.

<Thirty-Fifth Embodiment>

In this embodiment, in the power conversion device of the twenty-eighth to the thirty-fourth embodiments, when the voltage Vs of the AC power source of n multi-level output self-commutated power converters MLC1 to MLCn fluctuates, control is performed by altering the instruction value of the voltage Vd applied to the DC smoothing capacitor Cd, matching the change of this power source voltage Vs.

When the n multi-level output self-commutated power converters MLC1 to MLCn are operated with a single pulse or a fixed pulse pattern, the amplitude value of the AC side output voltage Vc of these self-commutated power converters MLC1 to MLCn is fixed; if the power source voltage Vs becomes high, multi-level output self-commutated power converters MLC1 to MLCn assume an operating condition with lagging power factor and if the power source voltage Vs becomes low, assume an operating condition with leading power factor. Also, with a fall in the power factor, the phase difference between the AC side output voltage Vc of the multi-level output self-commutated power converters MLC1 to MLCn and the input current Is becomes large, causing the interruption current of the self-turn-off elements that make up the self-commutated power converters to become large. Control is therefore performed such that |Vs| always=|Vc|, by adjustment and control of the total voltage Vd that is applied to the DC smoothing capacitor Cd so as to match the amplitude value of the power source voltage Vs. In this way, it is possible to prevent extreme drops of the power source power factor or converter power factor and so prevent increase of the interruption current of the self-turn-off elements.

<Thirty-Sixth Embodiment>

In this embodiment, in the power conversion device of the twenty-eighth to thirty-fifth embodiment, control of the voltage Vd that is applied to the DC smoothing capacitor Cd by the n multi-level output self-commutated power converters MLC1 to MLCn is performed such that:

$$Vd = k \cdot \sqrt{\{Vs^2 + (\omega \cdot Ls \cdot Is)^2\}}$$

where the angular frequency of the AC power source SUP is ω, the power source voltage is Vs, the input current is Is, the inductance value of the AC reactor is Ls and the constant of proportionality is k.

By adjustment of the voltage Vd that is applied to the DC smoothing capacitor Cd by the n multi-level output self-commutated power converters MLC1 to MLCn such that:

$$Vd = k \cdot \sqrt{\{Vs^2 + (\omega \cdot Ls \cdot Is)^2\}}$$

the phase of the input current Is can be made to match the phase of the power source voltage Vs so operation with a power source power factor=1 can be achieved. This benefit also applies likewise to regenerative operation. In this way, a power conversion device of excellent ability to withstand overloading and of low cost and high power factor can be provided.

<Thirty-Seventh Embodiment>

In this embodiment, in the power conversion device of the twenty-eighth to thirty-fifth embodiment, control of the voltage Vd that is applied to the DC smoothing capacitor Cd by the n multi-level output self-commutated power converters MLC1 to MLCn is performed such that:

$$Vd = k \cdot \sqrt{\{Vs^2 - (\omega \cdot Ls \cdot Is)^2\}}$$

where the angular frequency of the AC power source SUP is ω, the power source voltage is Vs, the input current is Is, the inductance value of the AC reactor is Ls and the constant of proportionality is k.

By adjustment of the voltage Vd that is applied to the DC smoothing capacitor Cd by the n multi-level output self-commutated power converters MLC1 to MLCn such that:

$$Vd = k \cdot \sqrt{\{Vs^2 - (\omega \cdot Ls \cdot Is)^2\}}$$

the phase angle ø of the input current Is with respect to the power source voltage Vs can be made to practically match the phase angle ø of the AC side output voltage Vc of the self-commutating power converters CNV1 to CNVn. That is, by matching the phases of the input current Is and the converter output voltage Vc, operation with converter power factor=1 can be achieved. As a result, the interruption current of the self-turn-off elements constituting the multi-level output self-commutated power converters MLC1 to MLCn can be made small and the converter capacity can be reduced. This benefit also applies in the same way in the case of regenerative operation. In this way, a power conversion device of high efficiency and low cost with excellent ability to withstand overloading can be provided.

As described in detail above, with the power conversion device according to the present invention, a power conversion device of high efficiency and low cost with excellent ability to withstand overloading and which is capable of power regeneration can be provided.

What is claimed is:

1. A power conversion device comprising:
   a power diode rectifier having an AC terminal connected through an AC reactor with an AC power source;
   a voltage-type self-commutated power converter having an AC terminal connected with said AC terminal of said power diode rectifier through a recovery current suppression reactor; and
   a DC smoothing capacitor connected to a DC common terminal of said voltage type self-commutated power converter and said power diode rectifier, with a load device connected in parallel therewith.

2. The power conversion device according to claim 1, wherein said recovery current suppression reactor comprises a saturable reactor.

3. The power conversion device according to claim 1 or 2, wherein said voltage type self-commutated power converter is operated with a fixed pulse pattern and an input current of said voltage type self-commutated power converter is controlled by adjusting a phase angle with respect to a voltage of said AC power source.

4. The power conversion device according to claim 1 or 2, wherein said voltage type self-commutated power converter is operated in a single pulse mode synchronized with a frequency of said AC power source and an input current of said voltage type self-commutated power converter is controlled by adjusting a phase angle with respect to a voltage of said AC power source.

5. The power conversion device according to claim 1 or 2, wherein, in an event of a fluctuation of a voltage of said AC power source, said voltage type self-commutated power converter performs control operation by altering an instruction value of a voltage applied to said DC smoothing capacitor so as to match said fluctuation of said voltage of said AC power source.

6. The power conversion device according to claim 1 or 2, wherein said voltage type self-commutated power converter controls a voltage Vd applied to said DC smoothing capacitor such that $$Vd = k \cdot \sqrt{\{Vs^2 + (\omega \cdot Ls \cdot Is)^2\}}$$

where an angular frequency of said AC power source is $\omega$, a power source voltage is Vs, an input current is Is, an inductance value of said AC reactor is Ls and a constant of proportionality is k.

7. The power conversion device according to claim 1 or 2, wherein said voltage type self-commutated power converter controls a voltage applied to said DC smoothing capacitor such that $$Vd = k \cdot \sqrt{\{Vs^2 - (\omega \cdot Ls \cdot Is)^2\}}$$

where an angular frequency of said AC power source is $\omega$, a power source voltage is Vs, an input current is ls, an inductance value of said AC reactor is Ls and a constant of proportionality is k.

8. A power conversion device comprising:
   a three-phase transformer having n sets of secondary windings given a prescribed phase difference and primary windings connected to a three-phase AC power source;
   n power diode rectifiers having AC terminals connected through AC reactors with secondary windings of said three-phase transformer;
   n voltage type self-commutated power converters having AC side terminals connected through recovery current suppression reactors with AC terminals of said n power diode rectifiers; and
   a DC smoothing capacitor connected with DC common terminals of said n voltage type self-commutated power converters and said n power diode rectifiers and with which a load device is connected in parallel.

9. The power conversion device according to claim 8, wherein said n voltage type self-commutated power converters are operated with a fixed pulse pattern and control a voltage applied to said DC smoothing capacitor by controlling an AC input current by adjusting a phase angle with respect to said AC power source voltage.

10. The power conversion device according to claim 8, wherein said n voltage type self-commutated power converts are operated in a single pulse mode synchronized with a frequency of said AC power source and control a voltage applied to said DC smoothing capacitor by controlling an AC input current by adjusting a phase angle with respect to said AC power source voltage.

11. A power conversion device comprising:
    a three-phase transformer having n sets of secondary windings given a prescribed phase difference and primary windings connected to a three-phase AC power source;
    n power diode rectifiers having AC terminals connected through AC reactors with said secondary windings of said three-phase transformer;
    n voltage type self-commutated power converters having AC terminals connected through recovery current suppression reactors with AC terminals of said n power diode rectifiers; and
    n DC smoothing capacitors respectively connected with DC common terminals of said n voltage type self-commutated power converters and said power diode rectifiers, said n DC smoothing capacitors being connected in series and a load device being connected to both terminals of a series connection.

12. The power conversion device according to claim 11, wherein said n voltage type self-commutated power converters are operated with a fixed pulse pattern and control a voltage applied to said DC smoothing capacitors by controlling an input current of said voltage type self-commutated power converters by adjusting a phase angle with respect to said AC power source voltage.

13. The power conversion device according to claim 11, wherein said n voltage type self-commutated power converters are operated in a single pulse mode synchronized with a frequency of said AC power source and control a voltage applied to said DC smoothing capacitors by controlling an input current of said voltage type self-commutated power converters by adjusting a phase angle with respect to said AC power source voltage.

14. A power conversion device comprising:
    n three-phase transformers configured so that output voltages of secondary windings of said transformers have a prescribed phase difference and primary windings of said transformers are series-connected in each phase to a three-phase AC power source;
    n three-phase bridge-connected power diode rectifiers having AC terminals connected with said secondary windings of said n three-phase transformers;
    n three-phase bridge-connected voltage type self-commutated power converters having AC terminals connected through recovery current suppression reactors with AC terminals of said n power diode rectifiers; and
    DC smoothing capacitors connected with DC common terminals of said n voltage type self-commutated power converters and said power diode rectifiers, a load device being connected in parallel therewith.

15. The power conversion device according to claim 14, wherein said n voltage type self-commutated power converters are operated with a fixed pulse pattern and control a voltage applied to said DC smoothing capacitors by controlling an AC input current by adjusting said phase angle with respect to said AC power source voltage.

16. The power conversion device according to claim 14, wherein said n voltage type self-commutated power converters are operated in a single pulse mode synchronized with a frequency of said AC power source and control a voltage applied to said DC smoothing capacitors by controlling an AC input current by adjusting a phase angle with respect to said AC power source voltage.

17. The power conversion device according to any of claims 8 to 16, wherein said recovery current suppression reactor comprises a saturable reactor.

18. The power conversion device according to any of claims 8 to 16, wherein, in an event of a fluctuation of a voltage of said AC power source, said n voltage type self-commutated power converters perform control by altering an instruction value of a voltage applied to said DC smoothing capacitors so as to match said fluctuation of said power source voltage.

19. The power conversion device according to any of claims 8 to 16, wherein said n voltage type self-commutated power converters perform control such that a voltage Vd that is applied to said DC smoothing capacitors is $$Vd = k \cdot \sqrt{\{Vs^2 + (\omega \cdot Ls \cdot Is)^2\}}$$

where an angular frequency of said AC power source is $\omega$, a power source voltage is Vs, an input current is Is, an inductance value of said AC reactor is Ls and a constant of proportionality is k.

20. The power conversion device according to any of claims 8 to 16, wherein said n voltage type self-commutated power converters perform control such that a voltage Vd that is applied to said DC smoothing capacitors is $$Vd = k \cdot \sqrt{\{Vs^2 - (\omega \cdot Ls \sqrt{Is})^2\}}$$

where an angular frequency of said AC power source is $\omega$, a power source voltage is Vs, an input current is Is, an inductance value of said AC reactor is Ls and a constant of proportionality is k.

21. A power conversion device comprising:
a power diode rectifier having an AC terminal connected through an AC reactor with an AC power source;
multi-level output self-commutated power converters having AC terminals connected through a recovery current suppression reactor with an AC terminal of said power diode rectifier; and
a DC smoothing capacitor connected between DC common terminals of said multi-level output self-commutated power converters and said power diode rectifier, and which has a load device connected in parallel therewith.

22. The power conversion device according to claim 21, wherein said recovery current suppression reactor comprises a saturable reactor.

23. The power conversion device according to claim 21 or 22, wherein said multi-level output self-commutated power converters are operated with a fixed pulse pattern and control an input current by adjusting a phase angle with respect to a voltage of said AC power source.

24. The power conversion device according to claim 21 or 22, wherein said multi-level output self-commutated power converters are operated in a single pulse mode synchronized with a frequency of said AC power source and control an input current by adjusting a phase angle with respect to a voltage of said AC power source.

25. The power conversion device according to claim 21 or 22, wherein, in an event of a fluctuation of a voltage of said AC power source, said multi-level output self-commutated power converters perform control operation by altering an instruction value of a voltage applied to said DC smoothing capacitors so as to match said fluctuation of said power source voltage.

26. The power conversion device according to claim 21 or 22, wherein said multi-level output self-commutated power converters perform control such that a voltage Vd that is applied to said DC smoothing capacitors is $$Vd = k \cdot \sqrt{\{Vs^2 + (\omega \cdot Ls \cdot Is)^2\}}$$

where an angular frequency of said AC power source is $\omega$, a power source voltage is Vs, an input current is Is, an inductance value of said AC reactor is Ls and a constant of proportionality is k.

27. The power conversion device according to claim 21 or 22, wherein said multi-level output self-commutated power converters perform control such that a voltage Vd that is applied to said DC smoothing capacitors is $$Vd = k \cdot \sqrt{\{Vs^2 - (\omega \cdot Ls \cdot Is)^2\}}$$

where an angular frequency of said AC power source is $\omega$, a power source voltage is Vs, an input current is Is, an inductance value of said AC reactor is Ls and a constant of proportionality is k.

28. A power conversion device comprising:
a three-phase transformer having n sets of secondary windings given a prescribed phase difference and primary windings connected to a three-phase AC power source;
n power diode rectifiers having AC terminals connected through AC reactors with said secondary windings of said three-phase transformer;
n multi-level output self-commutated power converters having AC side terminals connected through recovery current suppression reactors with said AC terminals of said n power diode rectifiers; and
DC smoothing capacitors connected with DC common terminals of said n multi-level output self-commutated power converters and said n power diode rectifiers and which has a load device connected in parallel therewith.

29. The power conversion device according to claim 28, wherein said n multi-level output self-commutated power converters are operated with a fixed pulse pattern and control a voltage applied to said DC smoothing capacitors by controlling an AC input current by adjusting a phase angle with respect to said AC power source voltage.

30. The power conversion device according to claim 28, wherein said n multi-level output self-commutated power converters are operated in a single pulse mode synchronized with a frequency of said AC power source and control a voltage applied to said DC smoothing capacitors by controlling an AC input current by adjusting a phase angle with respect to said AC power source voltage.

31. A power conversion device comprising:
a three-phase transformer having n sets of secondary windings given a prescribed phase difference and primary windings connected to a three-phase AC power source;
n power diode rectifiers having AC terminals connected through AC reactors with said secondary windings of said three-phase transformer;

n three-phase bridge-connected multi-level output self-commutated power converters having AC terminals connected through recovery current suppression reactors with said AC terminals of said n power diode rectifiers; and n DC smoothing capacitors respectively connected with DC common terminals of said n multi-level output self-commutated power converters and said power diode rectifiers, said n DC smoothing capacitors being connected in series and a load device being connected to both terminals of a series connection.

32. The power conversion device according to claim 31, wherein said n multi-level output self-commutated power converters are operated with a fixed pulse pattern and control a voltage applied to said DC smoothing capacitors by controlling an input current of said voltage type self-commutated power converters by adjusting a phase angle with respect to said AC power source voltage.

33. The power conversion device according to claim 31, wherein said n multi-level output self-commutated power converters are operated in a single pulse mode synchronized with a frequency of said AC power source and control a voltage applied to said DC smoothing capacitors by controlling an input current of said multi-level output self-commutated power converters by adjusting a phase angle with respect to said AC power source voltage.

34. The power conversion device according to any of claims 28 to 33, wherein said recovery current suppression reactor comprises a saturable reactor.

35. The power conversion device according to any of claims 28 to 33, wherein, in an event of a fluctuation of said voltage of said AC power source, said n multi-level output self-commutated power converters perform control by altering an instruction value of a voltage applied to said DC smoothing capacitors so as to match said fluctuation of said power source voltage.

36. The power conversion device according to any of claims 28 to 33, wherein said n multi-level output self-commutated power converters effect control such that a voltage Vd that is applied to said DC smoothing capacitors is $$Vd = k \cdot \sqrt{\{Vs^2 - (\omega \cdot Ls \cdot Is)^2\}}$$

where an angular frequency of said AC power source is $\omega$, a power source voltage is Vs, an input current is Is, an inductance value of said AC reactor is Ls and a constant of proportionality is k.

37. The power conversion device according to any of claims 28 to 33, wherein said n multi-level output self-commutated power converters perform control such that a voltage Vd that is applied to said DC smoothing capacitors is $$Vd = k \cdot \sqrt{\{Vs^2 - (\omega \cdot Ls \cdot Is)^2\}}$$

where an angular frequency of said AC power source is $\omega$, a power source voltage is Vs, an input current is Is, an inductance value of said AC reactor is Ls and a constant of proportionality is k.

* * * * *

UNITED STATES PATENT AND TRADEMARK OFFICE
CERTIFICATE OF CORRECTION

PATENT NO. : 6,741,482 B2
DATED : May 25, 2004
INVENTOR(S) : Yamamoto et al.

It is certified that error appears in the above-identified patent and that said Letters Patent is hereby corrected as shown below:

Column 43,
Line 44, change "$Vd = k \cdot \sqrt{\{Vs^2 - (\omega Ls \cdot Is)^2\}}$" to -- $Vd = k \cdot \sqrt{\{Vs^2 - (\omega \cdot Ls \cdot Is)^2\}}$ --.

Line 47, change "ls," to -- Is, --.

Column 44,
Line 6, change "converts" to -- converters --.

Column 45,
Line 36, change "$Vd = k \cdot \sqrt{\{Vs^2 - (\omega \cdot Ls \sqrt{Is})^2\}}$" to -- $Vd = k \cdot \sqrt{\{Vs^2 - (\omega \cdot Ls \cdot Is)^2\}}$ --.

Column 48,
Line 12, change "$Vd = k \cdot \sqrt{\{Vs^2 - (\omega \cdot Ls \cdot Is)^2\}}$" to -- $Vd = k \cdot \sqrt{\{Vs^2 + (\omega \cdot Ls \cdot Is)^2\}}$ --.

Signed and Sealed this

Twenty-third Day of November, 2004

JON W. DUDAS
*Director of the United States Patent and Trademark Office*